US012603445B2

(12) United States Patent
Neenan et al.

(10) Patent No.: US 12,603,445 B2
(45) Date of Patent: Apr. 14, 2026

(54) ANTENNA SYSTEMS

(71) Applicant: Parsec Technologies, Inc., Plano, TX (US)

(72) Inventors: Michael A. Neenan, Plano, TX (US); Richard Loy Smith, Jr., Dallas, TX (US); Rauhon Ahmed Shaik, Wylie, TX (US); George Alexander Bednekoff, Plano, TX (US)

(73) Assignee: Parsec Technologies, Inc., Plano, TX (US)

(*) Notice: Subject to any disclaimer, the term of this patent is extended or adjusted under 35 U.S.C. 154(b) by 48 days.

(21) Appl. No.: 18/395,134

(22) Filed: Dec. 22, 2023

(65) Prior Publication Data

US 2025/0105530 A1 Mar. 27, 2025

Related U.S. Application Data

(60) Provisional application No. 63/585,192, filed on Sep. 25, 2023.

(51) Int. Cl.

*H01Q 21/29* (2006.01)
*H01Q 1/48* (2006.01)
*H01Q 1/52* (2006.01)

(52) U.S. Cl.

CPC ............ *H01Q 21/293* (2013.01); *H01Q 1/48* (2013.01); *H01Q 1/523* (2013.01)

(58) Field of Classification Search

USPC .......................................................... 343/848
See application file for complete search history.

(56) References Cited

U.S. PATENT DOCUMENTS 5,966,102 A 10/1999 Runyon
6,067,053 A 5/2000 Runyon
(Continued)

FOREIGN PATENT DOCUMENTS

CN 102097674 6/2011
CN 102097674 A * 6/2011
(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

(Continued)

*Primary Examiner* — Crystal L Hammond
*Assistant Examiner* — Brandon Sean Woods
(74) *Attorney, Agent, or Firm* — Knobbe, Martens, Olson & Bear, LLP

(57) ABSTRACT

An antenna assembly can include an internal ground plane, a base PCB, and a plurality of antennas. The base PCB can be positioned above the internal ground plane. The base PCB can include a plurality of individual ground planes spaced circumferentially about a center of the base PCB, with the plurality of individual ground planes being electrically connected to the internal ground plane. Each antenna of the plurality of antennas can be electrically connected to an individual ground plane of the plurality of individual ground planes. The plurality of antennas can include a plurality of multi-band antennas and one or more WiFi antennas.

21 Claims, 40 Drawing Sheets

(56) References Cited

U.S. PATENT DOCUMENTS

| | | | |
|---|---|---|---|
| 6,111,550 A | 8/2000 | Miller et al. | |
| 9,379,453 B2* | 6/2016 | Rentz | H01Q 1/36 |
| 10,224,615 B2* | 3/2019 | Wu | H01Q 5/378 |
| 10,312,583 B2 | 6/2019 | Ng | |
| 11,251,539 B2* | 2/2022 | Hinman | H01Q 3/36 |
| 11,283,149 B2 | 3/2022 | Neenan et al. | |
| 11,329,363 B1 | 5/2022 | Neenan et al. | |
| 11,658,382 B2 | 5/2023 | Neenan et al. | |
| 11,664,574 B2 | 5/2023 | Neenan et al. | |
| 11,909,090 B2 | 2/2024 | Neenan et al. | |
| 11,936,094 B2 | 3/2024 | Neenan et al. | |
| 12,057,641 B2 | 8/2024 | Neenan et al. | |
| 12,212,035 B2 | 1/2025 | Neenan et al. | |
| 12,266,845 B2 | 4/2025 | Neenan et al. | |
| 2010/0253584 A1 | 10/2010 | Yang et al. | |
| 2011/0080323 A1 | 4/2011 | Thiam | |
| 2011/0102278 A1 | 5/2011 | Rozan | |
| 2012/0146872 A1 | 6/2012 | Chainon et al. | |
| 2012/0280882 A1 | 11/2012 | Zimmerman | |
| 2014/0139387 A1 | 5/2014 | Jones et al. | |
| 2014/0375507 A1 | 12/2014 | Lin et al. | |
| 2015/0042521 A1 | 2/2015 | Hazen | |
| 2015/0102974 A1 | 4/2015 | Stoytchev et al. | |
| 2016/0172750 A1 | 6/2016 | Ng | |
| 2016/0248148 A1 | 8/2016 | Hill et al. | |
| 2016/0277062 A1 | 9/2016 | Cheon et al. | |
| 2016/0285161 A1 | 9/2016 | Apaydin et al. | |
| 2017/0062952 A1 | 3/2017 | Sundararajan | |
| 2017/0237158 A1 | 8/2017 | Gibson et al. | |
| 2017/0317428 A1 | 11/2017 | Petropoulos | |
| 2017/0324171 A1 | 11/2017 | Shehan | |
| 2017/0358842 A1 | 12/2017 | Shehan | |
| 2018/0062731 A1 | 3/2018 | Ng et al. | |
| 2018/0083348 A1 | 3/2018 | Thiam et al. | |
| 2018/0109006 A1 | 4/2018 | Ng et al. | |
| 2018/0323513 A1 | 11/2018 | Varnoosfaderani et al. | |
| 2019/0148825 A1 | 5/2019 | Huerta et al. | |
| 2019/0237850 A1 | 8/2019 | Fleischer et al. | |
| 2019/0305406 A1 | 10/2019 | Williams | |
| 2019/0341674 A1 | 11/2019 | Rosenthal et al. | |
| 2019/0356051 A1 | 11/2019 | Barrera et al. | |
| 2020/0112101 A1 | 4/2020 | Yun | |
| 2020/0350664 A1 | 11/2020 | Thill | |
| 2020/0373668 A1 | 11/2020 | Wu | |
| 2020/0411972 A1 | 12/2020 | Hicks et al. | |
| 2021/0098856 A1 | 4/2021 | Neenan et al. | |
| 2021/0305718 A1 | 9/2021 | Li | |
| 2021/0391655 A1 | 12/2021 | Brobston et al. | |
| 2022/0149504 A1 | 5/2022 | Neenan et al. | |
| 2022/0384966 A1 | 12/2022 | Chiang et al. | |
| 2023/0087158 A1 | 3/2023 | Neenan et al. | |
| 2023/0145053 A1 | 5/2023 | Kilbury et al. | |
| 2023/0223709 A1 | 7/2023 | Guntupalli | |
| 2023/0402732 A1 | 12/2023 | Neenan et al. | |
| 2023/0402733 A1 | 12/2023 | Neenan et al. | |
| 2024/0097339 A1 | 3/2024 | Khatua | |
| 2024/0113450 A1 | 4/2024 | Neenan et al. | |
| 2024/0113451 A1 | 4/2024 | Neenan et al. | |
| 2024/0128644 A1 | 4/2024 | Neenan et al. | |
| 2024/0304958 A1* | 9/2024 | Matsumura | H01M 50/536 |
| 2025/0079683 A1 | 3/2025 | Neenan et al. | |
| 2025/0079704 A1 | 3/2025 | Neenan et al. | |
| 2025/0087905 A1 | 3/2025 | Neenan et al. | |
| 2025/0158281 A1 | 5/2025 | Neenan et al. | |
| 2025/0158289 A1 | 5/2025 | Neenan et al. | |
| 2025/0167445 A1 | 5/2025 | Neenan et al. | |
| 2025/0167459 A1 | 5/2025 | Neenan et al. | |
| 2025/0233306 A1 | 7/2025 | Neenan et al. | |
| 2025/0233307 A1 | 7/2025 | Neenan et al. | |

FOREIGN PATENT DOCUMENTS

| | | | |
|---|---|---|---|
| CN | 102468529 | 5/2012 | |
| CN | 102468529 A * | 5/2012 | |
| CN | 203562507 | 4/2014 | |
| CN | 203562507 U * | 4/2014 | |
| CN | 105281049 | 1/2016 | |
| CN | 105281049 A * | 1/2016 | |
| CN | 210806018 | 6/2020 | |
| CN | 210806018 U * | 6/2020 | |
| CN | 212303910 | 1/2021 | |
| CN | 212303910 U * | 1/2021 | |
| CN | 114465021 | 5/2022 | |
| CN | 114465021 A * | 5/2022 | H01Q 1/38 |
| CN | 116151285 | 5/2023 | |
| DE | 202017002307 U1 * | 8/2017 | H01Q 19/10 |
| EP | 0 349 499 | 1/1990 | |
| EP | 0349499 A2 * | 1/1990 | H01Q 5/49 |
| EP | 3 474 376 | 4/2019 | |
| EP | 3 614 491 | 2/2020 | |
| KR | 102260880 | 6/2021 | |
| WO | WO 2005/062422 | 7/2005 | |
| WO | WO 2013/090783 | 6/2013 | |
| WO | WO 2018/140305 | 8/2018 | |
| WO | WO 2020/010039 | 1/2020 | |
| WO | WO 2023/128683 | 7/2023 | |
| WO | WO 2024/035801 | 2/2024 | |
| WO | WO 2024/035805 | 2/2024 | |
| WO | WO 2024/035810 | 2/2024 | |
| WO | WO 2025/072367 | 9/2024 | |
| WO | WO 2025/072213 | 4/2025 | |
| WO | WO 2025/072553 | 4/2025 | |

OTHER PUBLICATIONS

International Search Report and Written Opinion issued in PCT Application No. PCT/US2023/029885, dated Sep. 21, 2023, in 10 pages.

International Search Report and Written Opinion issued in PCT Application No. PCT/US2023/029893, dated Nov. 6, 2023, in 11 pages.

International Search Report and Written Opinion issued in PCT Application No. PCT/US2023/029873, dated Nov. 8, 2023, in 15 pages.

* cited by examiner

ANTENNA SYSTEMS

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, Long Term Evolution (LTE) has become a standard in wireless data communications technology. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennas that are configured to electromagnetically resonate at frequencies within the dedicated bandwidth. As more wireless devices are used on a frequency bandwidth, a communication bottleneck occurs as wireless devices compete for frequency channels within a dedicated bandwidth. Public wireless communication bands include frequency bands from 450 MHz to 6 GHz, however, antennas configured to resonate within this spectrum only resonate within a portion of the full spectrum. To capture a greater portion of this spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems and which can result in systems with poor functionality and/or coverage.

SUMMARY

This disclosure relates to antennas that cover multiple frequency bands that are prolific in today's telecommunication wireless spectrum. The advances of telecommunications wireless devices have expanded the number of frequency bands that a radio can support for prolific coverage. For example, there are over 30 5G and LTE Bands that a radio may be asked to support if the radio is to provide ubiquitous coverage for a mobile device. While some of these bands overlap one another, there are numerous gaps between the bands as well. A multi-band approach to the antenna's frequency response provides a unique and novel radiating structure to support the numerous 5G and LTE bands.

Some traditional methods of antenna design cannot provide antennas and antenna assemblies with an advantageous balance of performance, size, and cost effectiveness and/or incorporate a plurality of antenna elements radiating across different bands. According to some embodiments, antenna systems can include a densely packed antenna configuration that is arranged, configured, and adapted to provide an advantageous balance of performance, size, and cost effectiveness that is superior to some traditional devices, systems, and methods. According to some embodiments, antenna systems can improve isolation and return loss, and/or increase gain to an advantageous level. According to some embodiments, antenna systems can comprise individual ground planes that have conductive blocks underneath them, which can advantageously provide superior performance in some cases over, for example, just a contiguous ground plane on a PCB surface. According to some embodiments, alternating arrangements of antenna elements, and/or flipping the orientation of some antenna elements, can provide advantages to increase isolation, limit interference, improve performance, and/or provide for compact configurations. According to some embodiments, one or more antenna elements can be positioned and/or supported on a first carrier such as an inner ring, and one or more antenna elements can be positioned and/or supported on a second carrier, such as an outer ring. Advantages of first and second carriers can include increasing isolation, limiting interference, improving performance, and/or providing for compact configurations. According to some embodiments, one or more WiFi antenna elements can be arranged, configured, and/or adapted to provide advantages of enhanced performance within a compact space while providing for advantageous isolation and spacing for multiple input-multiple output (MiMo) cellular elements along with one or more WiFi antenna elements.

According to some advantageous embodiments, an antenna assembly can include an internal ground plane, a base PCB, and a plurality of antennas. The base PCB can be positioned above the internal ground plane. The base PCB can include a plurality of individual ground planes spaced circumferentially about a center of the base PCB, with the plurality of individual ground planes being electrically connected to the internal ground plane. Each antenna of the plurality of antennas can be electrically connected to an individual ground plane of the plurality of individual ground planes. The plurality of antennas can include a plurality of multi-band antennas and one or more WiFi antennas. According to some advantageous embodiments, an antenna assembly can include an internal ground plane, a base PCB, and a plurality of antennas. The base PCB can be positioned above the internal ground plane and electrically connected to the internal ground plane. Each antenna of the plurality of antennas can be electrically connected to the base PCB, wherein the plurality of antennas are configured to: generate at least one azimuth radiation pattern and at least one elevation radiation pattern that are above a realized gain for the plurality of antennas, wherein the azimuth radiation pattern and the elevation radiation pattern correspond to a frequency band; and reduce radio frequency interference between the plurality of antennas.

Some advantageous features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present disclosure in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. Accordingly, the claims should be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
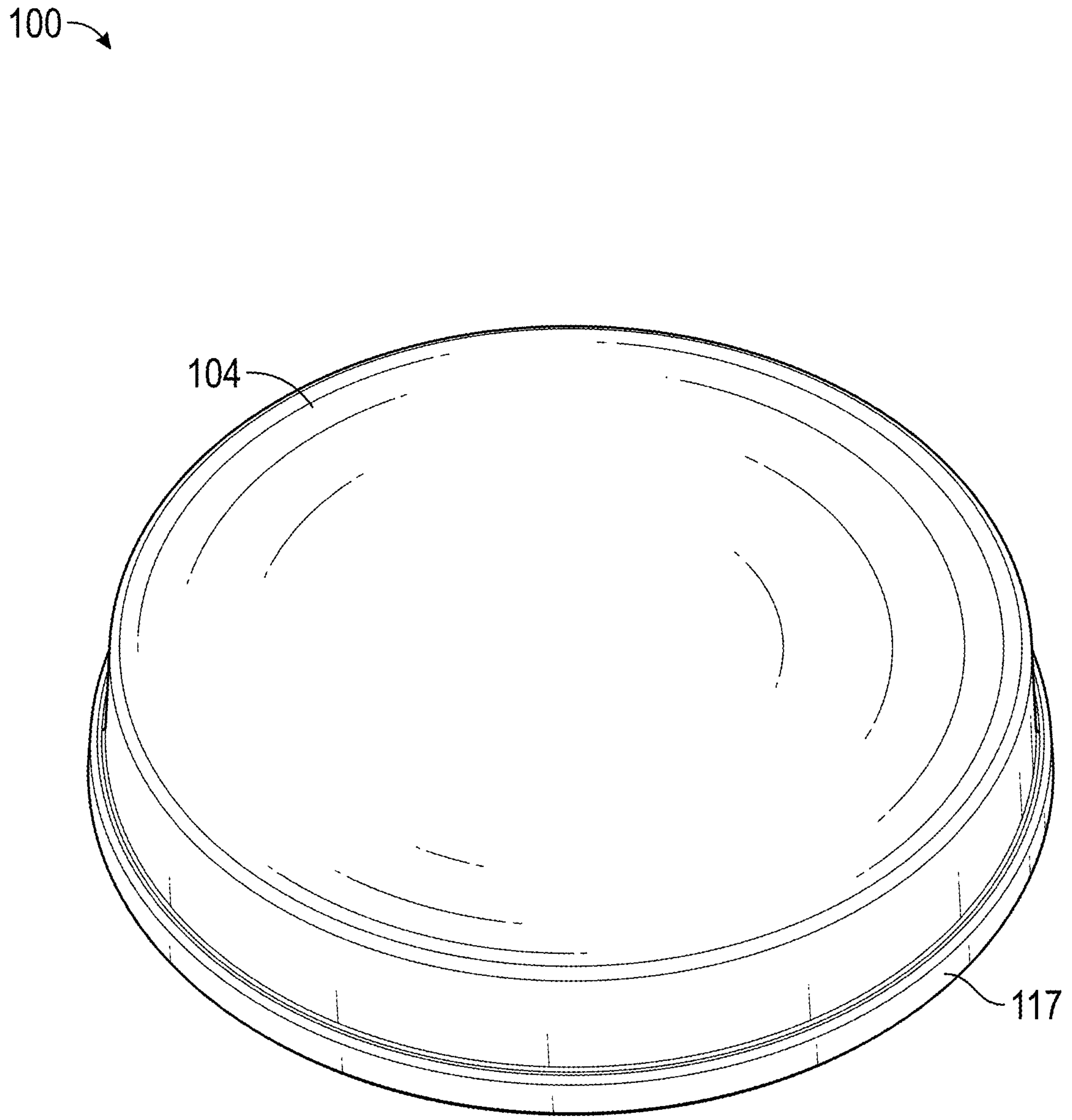
FIG. 1 illustrates a perspective view of an antenna assembly including a multi-element multi-band antenna system enveloped by a non-conductive cover in accordance with some aspects of this disclosure.

While the embodiments and methods of the present application are susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Illustrative implementations of the preferred embodiments are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system and method in accordance with the present disclosure overcomes problems commonly associated with traditional antenna systems. In particular, the system of the present application discloses an antenna assembly having an internal ground plane, a base PCB, and a plurality of antennas. The base PCB can be positioned above the internal ground plane. The base PCB can include a plurality of individual ground planes spaced circumferentially about a center of the base PCB, with the plurality of individual ground planes being electrically connected to the internal ground plane. Each antenna of the plurality of antennas can be electrically connected to an individual ground plane of the plurality of individual ground planes. The plurality of antennas can include a plurality of multi-band antennas and one or more WiFi antennas. In another example, the system of the present application discloses an antenna assembly having an internal ground plane, a base PCB, and a plurality of antennas. The base PCB can be positioned above the internal ground plane and electrically connected to the internal ground plane. Each antenna of the plurality of antennas can be electrically connected to the base PCB, wherein the plurality of antennas are configured to: generate at least one azimuth radiation pattern and at least one elevation radiation pattern that are above a realized gain for the plurality of antennas, wherein the azimuth radiation pattern and the elevation radiation pattern correspond to a frequency band, wherein the realized gain is between −8 decibels with respect to an isotropic radiator (dBi) and −4 dBi; and reduce radio frequency interference between the plurality of antennas. These and other unique features of the system are discussed below and illustrated in the accompanying drawings.

The system and method will be understood, both as to its structure and operation, from the accompanying drawings, taken in conjunction with the accompanying description. Several implementations of the system may be presented herein. It should be understood that various components, parts, and features of the different implementations may be combined together and/or interchanged with one another, all of which are within the scope of the present application, even though not all variations and particular implementations are shown in the drawings. It should also be understood that the mixing and matching of features, elements, and/or functions between various implementations is expressly contemplated herein so that one of ordinary skill in the art would appreciate from this disclosure that the features, elements, and/or functions of one implementation may be incorporated into another implementation as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary implementation, however, alternate implementations having scaled and proportional dimensions of the presented exemplary implementation are also considered. Additional features and functions are illustrated and discussed below.

The following detailed description of certain implementations presents various descriptions of specific implementations. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain implementations can include more elements than illustrated in a drawing and/or a subset of the elements illustrated in a drawing. Further, some implementations can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

With reference to FIG. 1, a perspective view of an antenna assembly 100 is illustrated in accordance with an implementation of the present disclosure. The antenna assembly 100 may include a multi-element multi-band antenna 102. The multi-element multi-band antenna 102 may be configured to provide wireless internet connectivity for a plurality of uses (e.g., data, voice communication, and/or the like). For example, according to some embodiments, the multi-element multi-band antenna 102 may be a "wireless last mile solution" in place of traditional hard line, coaxial, optical, twisted pair, CAT5, and/or the like type of solutions to provide data connectivity between mobile/portable devices and the internet backbone. The multi-element multi-band antenna 102 may have benefits when used in places such as kiosks, vehicles, portable wireless access points, and/or the like, however, the multi-element multi-band antenna 102 may be used in a wide range of applications. The multi-element multi-band antenna 102 may have a smaller volume and profile when compared to other antenna systems. For example, the antenna assembly 100 may have a cubic volume of approximately 202 cubic inches or less, in some implementations.

In some implementations the components of the multi-element multi-band antenna 102 may be concealed and/or secured within and/or between a radome 104 (also referred to herein as "cover" 104 and "non-conducive cover" 104) and a base 117. For example, the radome 104 can be coupled to the base 117 with the multi-element multi-band antenna 102 that is coupled to mounting points that are, for example, features of the internal groundplane 110. In some implementations, the antenna assembly 100 can have an IP67 rating.

As shown in at least FIGS. 1-4, the multi-element multi-band antenna 102 may include one or more of the following: a base PCB 108, an internal ground plane 110, a plurality of individual radiator ground planes 112, one or more cellular radiator portions 116, and/or one or more WiFi radiator portions 121. In some implementations, one or more fasteners can be used to secure the components of the antenna assembly 100 together, such as the radome 104 to the base 117, and can include bolts, screws, and/or the like. In some implementations, the individual radiator components (e.g., the cellular radiator portions 116, the WiFi radiator portions 121, etc.) can be soldered together after being aligned in a tab and slot arrangement. These components and other components that may be included in the antenna assembly 100 are described herein with reference to FIGS. 1-11B. The multi-element multi-band antenna 102 may have an operating frequency range of 500 MHz to 8.0 GHz. In some cases, the multi-element multi-band antenna 102 can have optimal performance when operating at a frequency range of 600 MHz to 6.0 GHz.

Referring back to FIG. 1, the radome 104 may protect and/or provide mechanical support for the multi-element multi-band antenna 102. For example, the multi-element multi-band antenna 102 can be enveloped by the radome 104. The radome 104 may be transparent to radiation from the multi-element multi-band antenna 102 and may serve as an environmental shield for the internal components of the multi-element multi-band antenna 102. The radome 104 may be made of a non-conductive material. In some implementations, the radome 104 may be generally cylindrical or circular prism shaped, with an open bottom. Other suitable shapes can also be used for the radome 104. The radome 104 can be configured to be removably coupled to the base 117. The base 117 can include the internal ground plane 110 on an internal side of the base 117, such that the internal ground plane 110 is also enveloped by the radome 104. In some cases, the shape of the radome 104 can be selected based on the expected operating conditions for the antenna assembly 100. For example, the expected wind-load on the antenna assembly 100 when in use (e.g., when mounted to a vehicle) can impact the design of the radome 104.

Figure 2A:
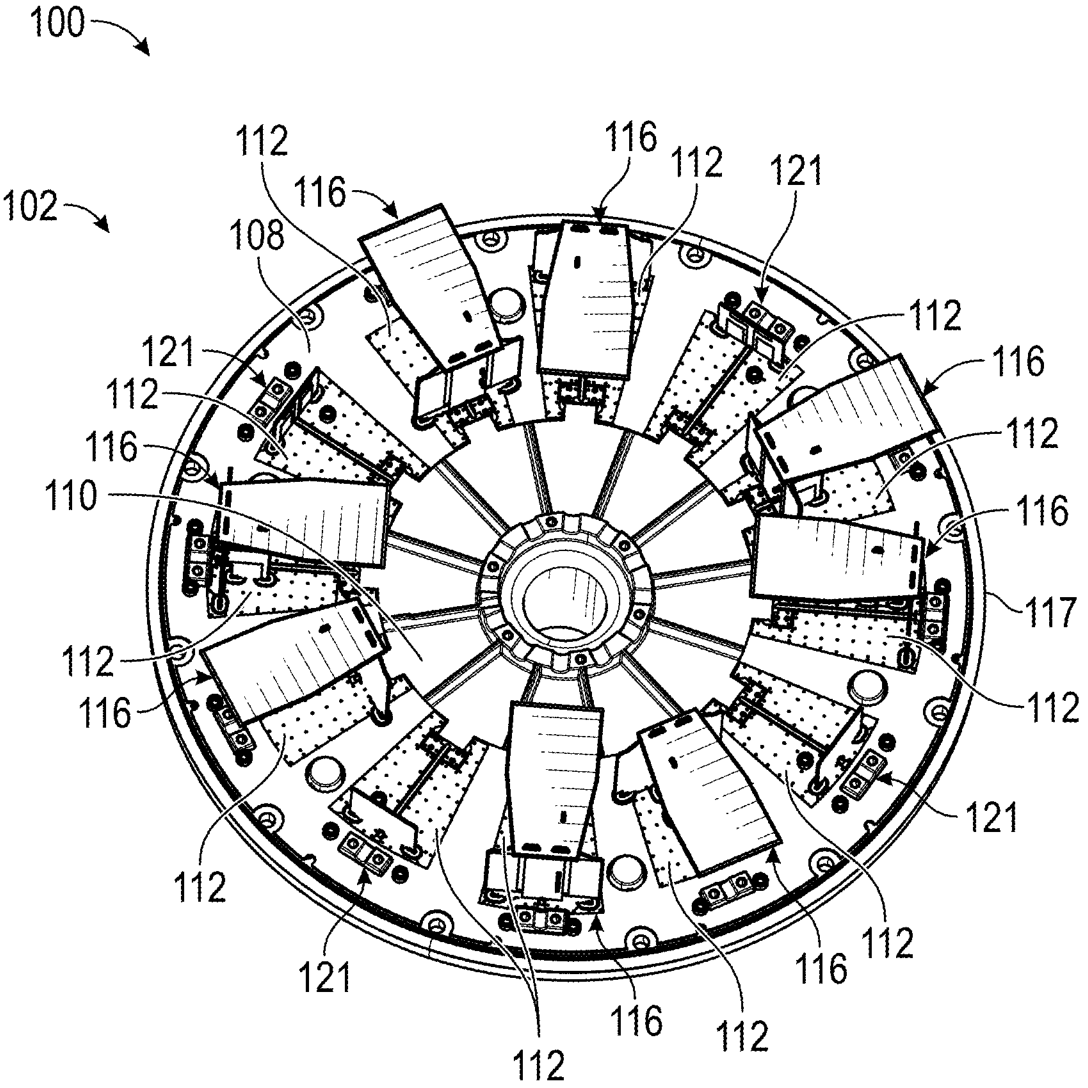
FIGS. 2A and 2B illustrate perspective views of the multi-element multi-band antenna system of FIG. 1, with the non-conductive cover removed, in accordance with some aspects of this disclosure.
Figure 2B:
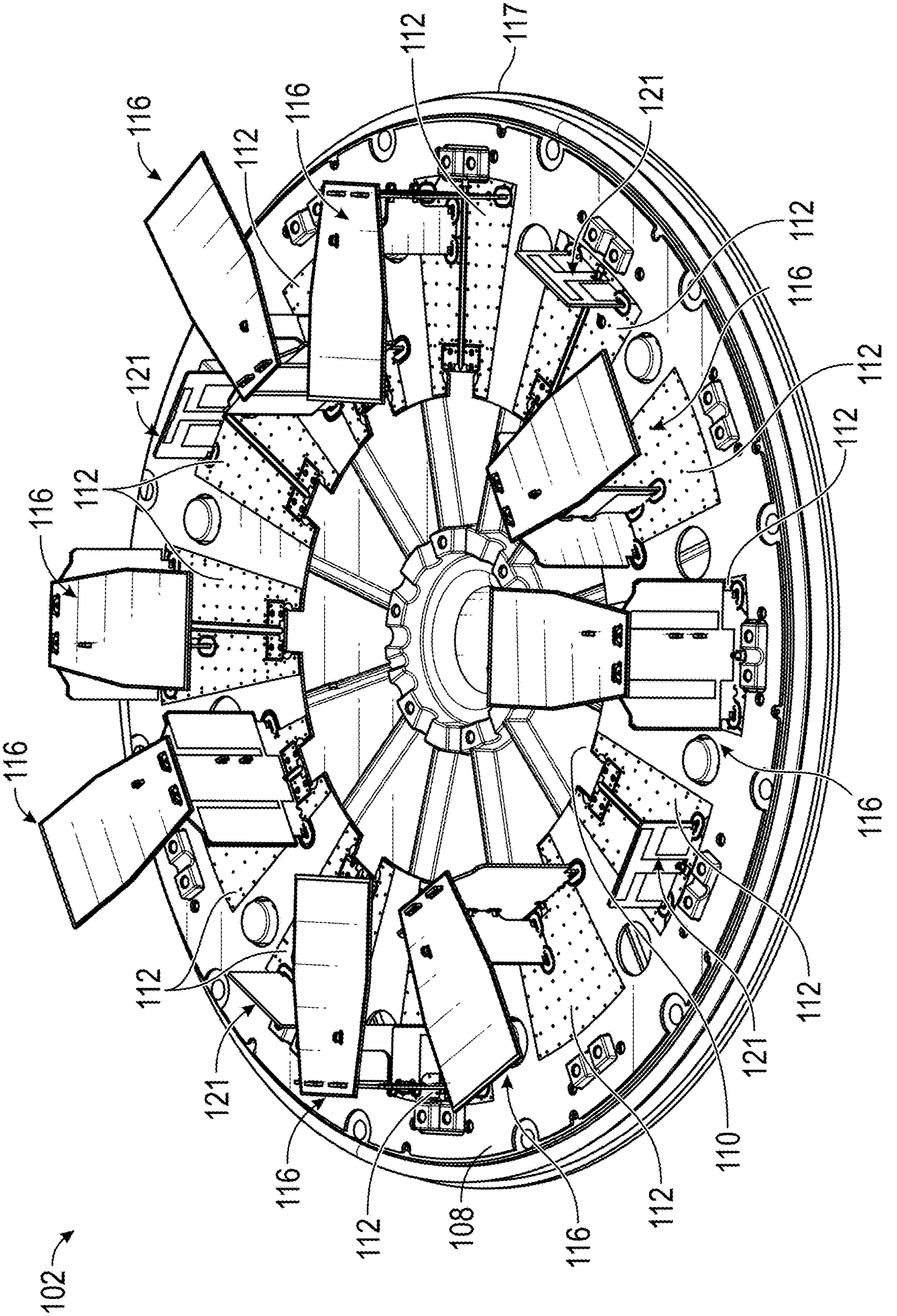
Figure 8:
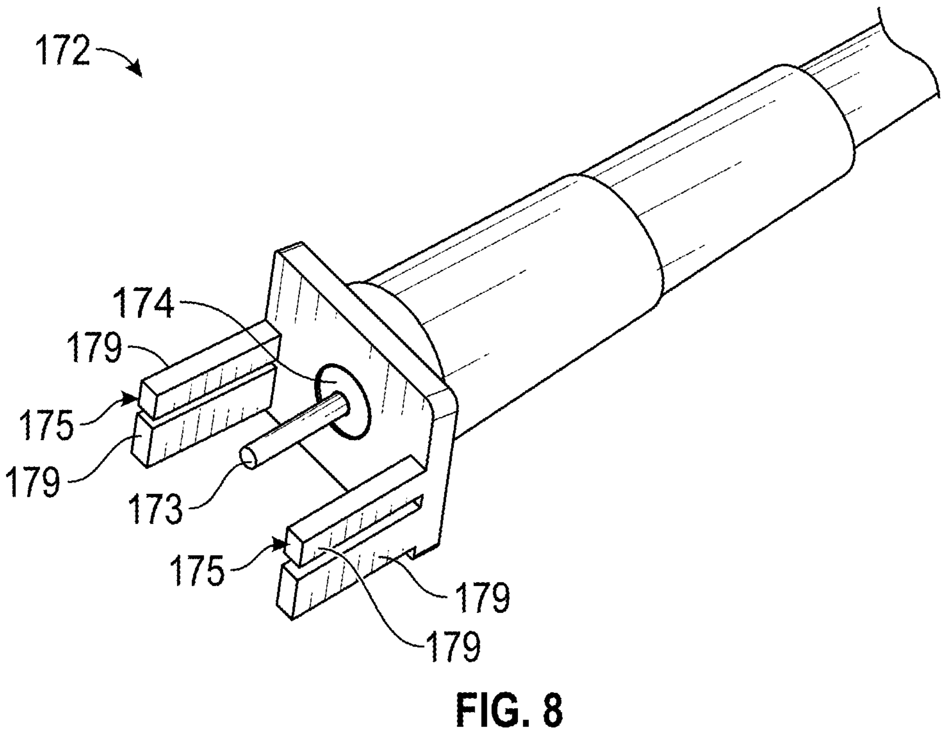
FIG. 8 illustrates a coaxial cable of the multi-element multi-band antenna system of FIG. 1, in accordance with some aspects of this disclosure.

The base 117 can form the bottom side of the antenna assembly 100. In some implementations, the base 117 can include or provide an internal ground plane 110 for the multi-element multi-band antenna 102. For example, as shown in FIG. 8, the internal surface 110 of the base 117 can act as an internal ground plane for the multi-element multi-band antenna 102. In some implementations, the base 117 can be formed from a conductive material, such as a metal. In one example, the base 117 may be made from die-cast aluminum. The base 117 can include an internal ribbing structure 123. The internal ribbing structure 123 can include a plurality of ribs that extend vertically from the internal surface 110 of the base 117. As shown in FIGS. 2A and 2B, the internal ribbing structure 123 can provide support for the base PCB 108 and other components of the multi-element multi-band antenna 102. The internal ribbing structure 123 can provide separation between the internal ground plane 110 and the base PCB 108. In some implementations, the base 117 may be made of non-conductive material and the internal groundplane 110 could be added to the base 117. For example, the internal ground plane 110 could be applied via a spray or sputter on version of a conductive coating or separate electrically conductive component that can be fastened to the base 117 before PCB 108 is attached to the assembly. Other methods of creating the internal ground plane 110 could also be implemented.

With continued reference to FIG. 8, the base 117 can support a plurality of conductive blocks 119. The conductive blocks 119 can be configured to provide an electrical connection between the internal ground plane 110 and groundplane(s) on the base PCB 108 (e.g., the radiator ground planes 112). In one example, the conductive blocks 119 can comprise a non-conductive block material covered by a conductive material (e.g., a conductive fabric). For example, the non-conductive blocks can be a foam material. Any suitable material can be used for the conductive blocks, however, using a lightweight material, such as a foam, can reduce the overall weight of the antenna assembly 100 compared to heavier non-conductive materials. The conductive blocks 119 can provide an electrical connection between the base 117 and other components of the multi-element multi-band antenna 102. For example, a conductive block 119 can be positioned below each radiator ground plane 112. In this arrangement, the individual radiator ground planes 112 for each cellular radiator portion 116 and WiFi radiator portion 121 can be electrically connected to the internal ground plane 110 of the base 117 through the conductive blocks 119. The radiator ground planes 112 can also include conductive openings (e.g., plated slots 192 and plated holes 182 shown in at least FIGS. 9A and 9B) to facilitate an electrical connection between the top radiator ground plane side 112A and the bottom radiator ground plane side 112B. In some implementations, the radiator ground planes 112 can also include a plurality of small holes that extend through both the top and bottom sides 112A, 112B and the base PCB 108. These small holes can further improve the electrical connection between the top radiator ground plane side 112A and the bottom radiator ground plane side 112B.

The base 117 provides mechanical support for the multi-element multi-band antenna 102. The base 117 can be electrically conductive (e.g., be made of a conductive material such as a metal). As such, the base 117 provides the internal ground plane 110 for the multi-element multi-band antenna 102. In some implementations, the internal ground plane 110 can provide an electrical connection with a client ground plane (not shown). A client ground plane may be in the form of conducting surfaces on vehicles, buildings, indoor or outdoor equipment enclosures, a stand-alone electrically conductive surface, and other such customer premise equipment. In some implementations, the internal ground plane 110 includes a plurality of small gaps (not shown) in the surface of the internal ground plane 110, which may facilitate the use of non-conductive weather resistant material. In some implementations, the size and proximity of the internal ground plane 110 may be selected to provide an electromagnetic connection with the client ground plane. The combination of at least the radome 104 and the base 117 provide mechanical and environmental protection for the multi-element multi-band antenna 102 as well as grounding for the electrically active, radiating, portions internal to the antenna assembly 100 to the internal groundplane 110. The internal groundplane 110 is also electrically connected to an external groundplane 125 on the underside of the base 117 (see e.g., FIG. 11A). The external groundplane 125 can facilitate an electrical connection between the internal ground plane 110 and the client groundplane 199 (e.g., in FIG. 11A). In some cases, the internal groundplane 110 may be connected to the external groundplane 125 on the underside of base 117. In some examples, the internal ground plane 110 may provide grounding points for connection to the client ground plane or the internal ground plane 110 may only be electromagnetically coupled to the client groundplane if a client groundplane is required during the installation process of multi-element multi-band antenna 102. While the external groundplane 125 is shown as being approximately the same shape and diameter as the base 117, in some implementations, the external groundplane 125 can be separate from the base 117 and can be larger than the diameter of the base 117. In one example, the external groundplane 125 can be a 24×24 inch plate. An increase in the size of the external groundplane 125 can improve the performance of the multi-element multi-band antenna 102 (up to a limit). In some implementations, a non-conductive element (e.g., an environmental gasket) may be positioned between the underside of the base 117 and the external groundplane 125. In this example, the capacitive or electromagnetic coupling between the underside of the base 117 and the external groundplane 125 can be improved if the base 117 has a conductive underside.

Referring back to FIG. 1, the radome 104 can be positioned on the base 117 to secure the internal components of the antenna assembly 100, including the multi-element multi-band antenna 102. The radome 104 may include a plurality of fastener holes which may extend up the side walls of the radome 104. In some implementations, the fastener holes may be tapered. In some implementations, the fastener holes may be threaded. These plurality of fastener holes may be aligned with fastener holes of the base 117 in the assembled configuration, and fasteners can be positioned within the holes to secure the radome 104 and the internal components of the multi-element multi-band antenna 102 to the base 117. In some cases, the fasteners are electrically isolated from the external groundplane 125, the internal groundplane 110, and/or the radiator groundplanes 112A, 112B. In some cases, the fasteners can serve a dual purpose of fastening the base PCB 108 to the internal ground plane 110 as well as providing a ground connection between groundplanes 112A, 112B on either side the base PCB 108 and the internal ground plane 110. As such, the height of the fasteners relative to the base PCB 108 (e.g., the extension into the radome 104) can be selected to minimize the interference provided by the fasteners. In some implementations, the ground plane 110 can include a base slot. Either or both of fastener holes and the base slot may assist with mechanically coupling the base 117 to the radome 104. For example, a bottom edge of the radome 104 can be received within the base slot of the base 117 when the multi-element multi-band antenna 102 is in the assembled configuration. In some implementations, the assembled antenna assembly 100 may have an approximate diameter of about 10.75 inches and a height of about 2.23 inches. This small profile, particularly the small diameter and height, can significantly improve the aerodynamic properties of the antenna assembly 100 when in operation.

Turning now to FIGS. 2A and 2B, top perspective views of the antenna assembly 100 of FIG. 1 with the radome 104 removed are shown to further illustrate the internal component of the multi-element multi-band antenna 102. Removing the radome 104 also removes all the fasteners to releasably connect the radome 104, the internal ground plane 110, and the base 117. There are a number of suitable ways to connect the major portions of antenna assembly 100.

Figure 6A:
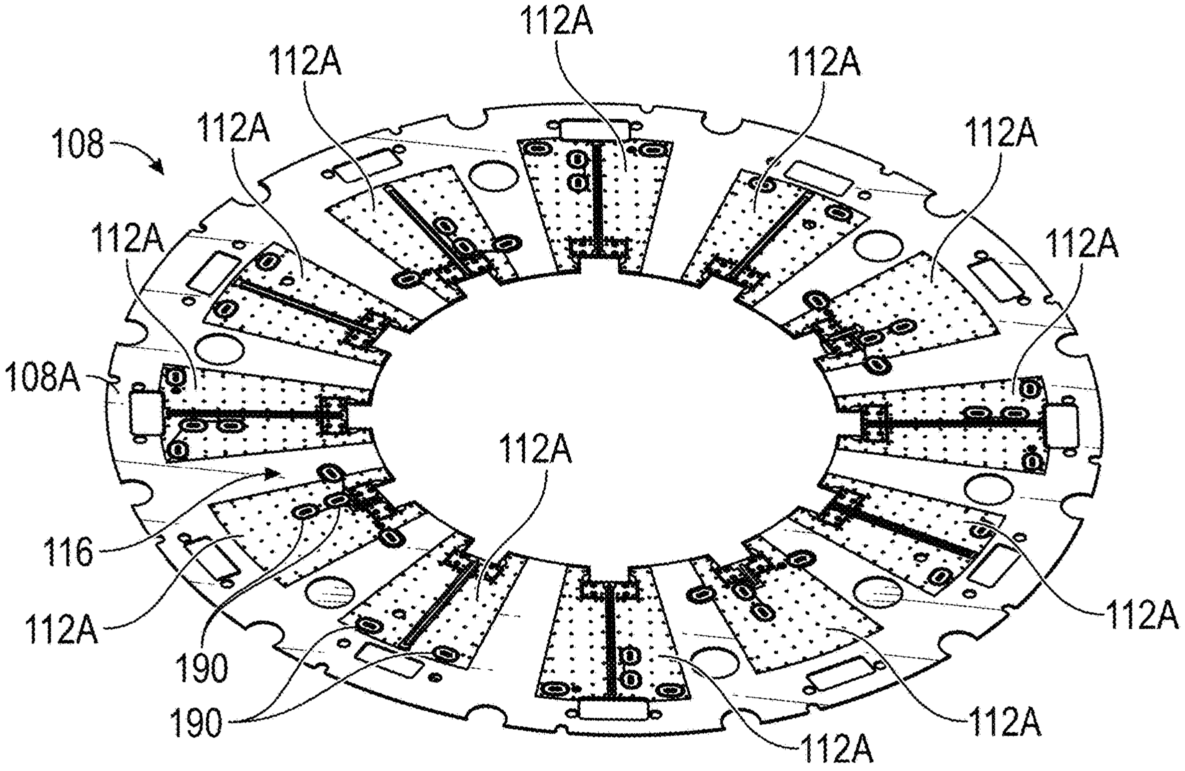
FIGS. 6A and 6B illustrate perspective top and bottom views respectively of a base PCB of the multi-element multi-band antenna system of FIG. 1, in accordance with some aspects of this disclosure.
Figure 6B:
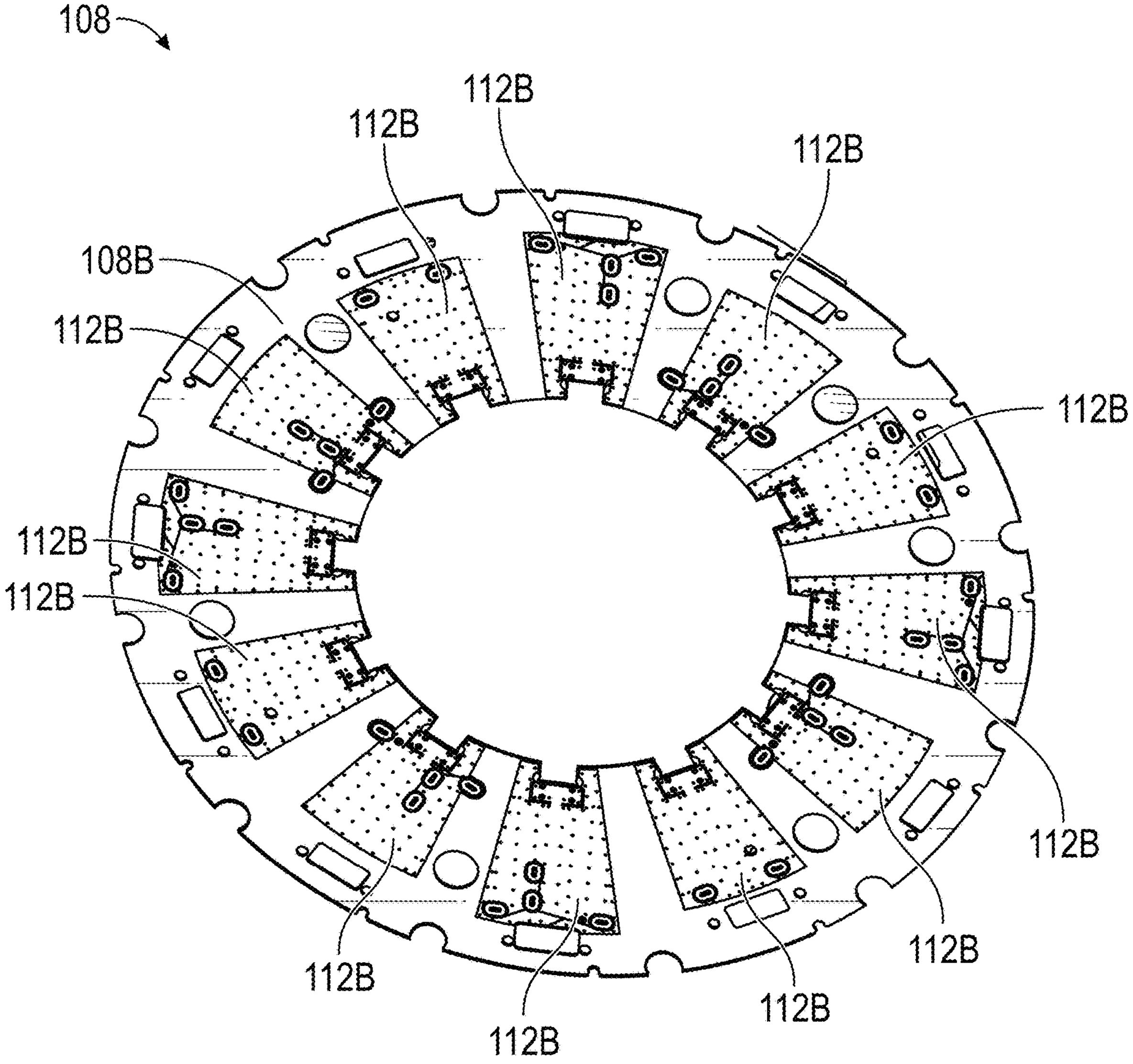
Figure 7:
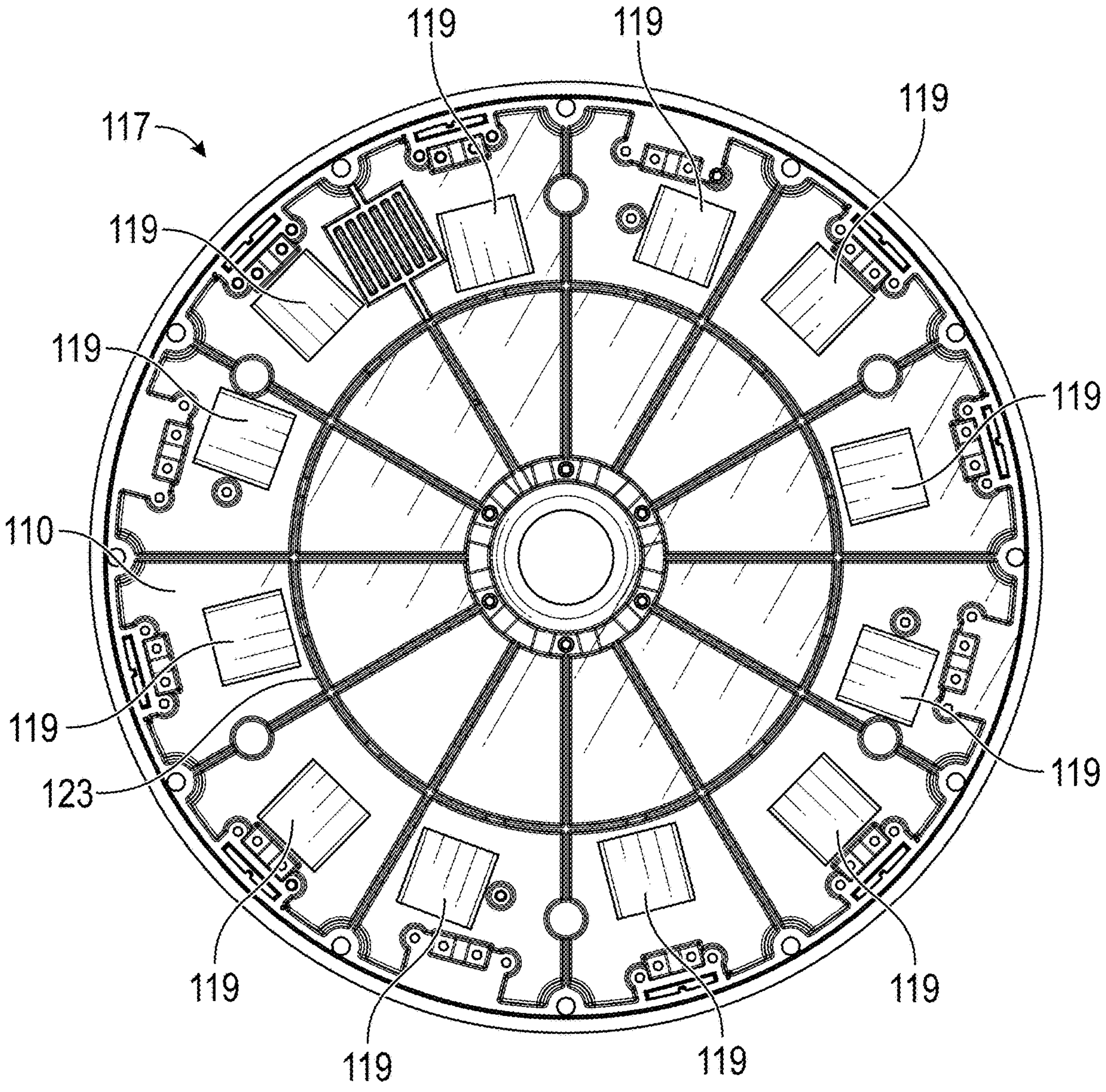
FIG. 7 illustrates a top view of a base and internal ground plane of the multi-element multi-band antenna system of FIG. 1, in accordance with some aspects of this disclosure.

As shown in FIGS. 2A and 2B, the base PCB 108 can be positioned on and supported by the internal ribbing structure 123 of the base 117. The base PCB 108 can support the radiator portions 116, 121 of the multi-element multi-band antenna 102. The base PCB 108 can include a plurality of individual radiator ground planes 112. Each radiator groundplane 112A, 112B can act as an individual ground plane for an individual radiator portion (e.g., radiator portion 116, radiator portion 121, etc.) of the multi-element multi-band antenna 102. As shown in FIGS. 6A and 6B, the base PCB 108 can have a top PCB side 108A and a bottom PCB side 108B. The bottom side 108B can contact the internal ribbing structure 123 and the top PCB side 108A can support the radiator portions of the multi-element multi-band antenna 102. Similarly, the radiator ground planes 112 can include a top radiator ground plane side 112A and a bottom radiator ground plane side 112B (see e.g., FIGS. 9A and 9B respectively). The radiator ground planes 112 may be conductive material formed on or coupled to the base PCB 108. In one example, the radiator ground plane 112 may be conductive material etched into the structure of the base PCB 108. For example, the top radiator ground plane side 112A can be etched onto the top PCB side 108A and the bottom radiator ground plane side 112B can be etched onto the bottom side 108B. In another example, the radiator ground planes 112 may be conductive material mounted to the base PCB 108. For example, the top radiator ground plane side 112A can be mounted to the top PCB side 108A and the bottom radiator ground plane side 112B can be mounted to the bottom side 108B. Other methods could also be utilized.

With continued reference to FIGS. 6A and 6B, the base PCB 108 can include a plurality of plated-through holes 190. The plated slots 192 can be formed in the radiator ground plane 112 or other areas of the base PCB 108. For ease of illustration, not all plated slots 192 are labeled in the drawings. The plated slots 192 can be conductive plates coupled to or formed on the PCB portions with holes/slots that extend through the base PCB 108 (and the radiator ground planes 112). The plated slots 192 can be configured to receive conductive projections (e.g., plated projections 190 shown at least in FIGS. 3A-3C) of the radiator elements and grounding elements of the multi-element multi-band antenna 102. As the plated slots 192 extend through radiator ground plane 112, the plated slots 192 can provide a method of coupling (e.g., mechanical and/or electrical coupling) the top radiator ground plane side 112A to the bottom radiator ground plane side 112B (e.g., via the projections 190). In the assembled multi-element multi-band antenna 102, the internal ground plane 110 can be electrically connected to the radiator ground plane 112 via the conductive blocks 119. The conductive blocks 119 can provide an electrical connection between the bottom radiator ground plane side 112B and the internal ground plane 110.

The internal ground plane 110 (also referred to herein as the ground reference), may serve as the ground reference for at least one or more of the radiator portions of the multi-element multi-band antenna 102 (e.g., radiator portions 116, 125, etc.). The microstrip transmission lines of the multi-element multi-band antenna 102 (e.g., see the plurality of microstrip transmission lines 170 in at least FIGS. 5, 9A and 9B) can use the radiator ground plane 112 (e.g., both the top radiator ground plane side 112A and the bottom radiator ground plane side 112B) as a ground reference. The internal ground plane 110 and/or the base PCB 108 (e.g., including the radiator ground planes 112) can establish a surface for coaxial cables of the multi-element multi-band antenna 102 (e.g., see the coaxial cables 172 of at least FIG. 8) to use as a reference for continuation of the signal from the radio to the radiating elements of the multi-element multi-band antenna 102. As explained herein, in some implementations, the internal ground plane 110 can be the internal surface of the electrically conductive base 117. In other implementations, the internal ground plane 110 may be formed on the bottom side 108B of the base PCB 108. For example, the internal ground plane 110 can be a solderable sheet metal material such as brass, copper, tin plated steel, and/or the like.

Figure 3A:
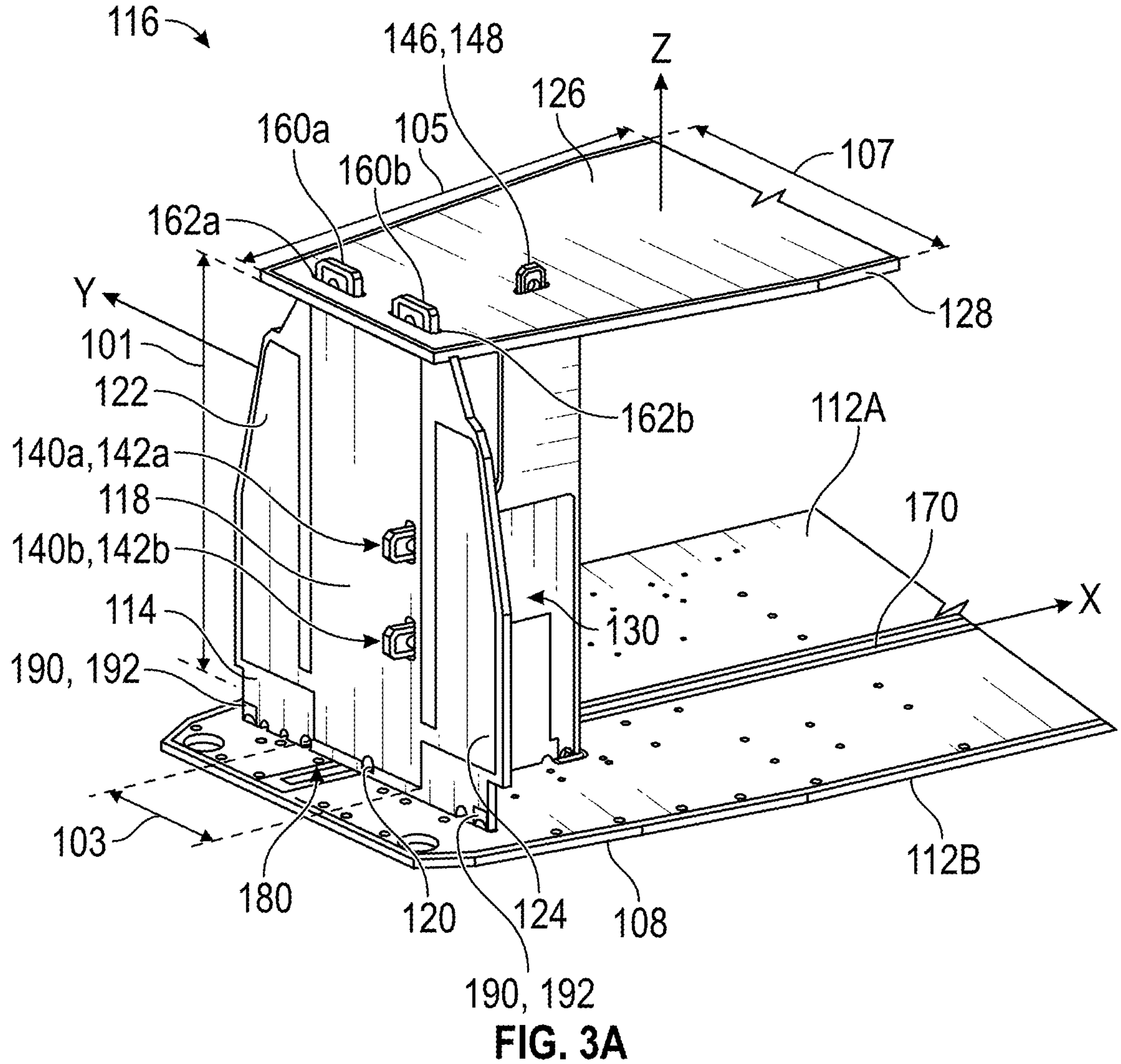
FIGS. 3A and 3B illustrate isolation views of an antenna element, grounding portion, and individual ground plane of the multi-element multi-band antenna system of FIG. 1, in accordance with some aspects of this disclosure.
Figure 3B:
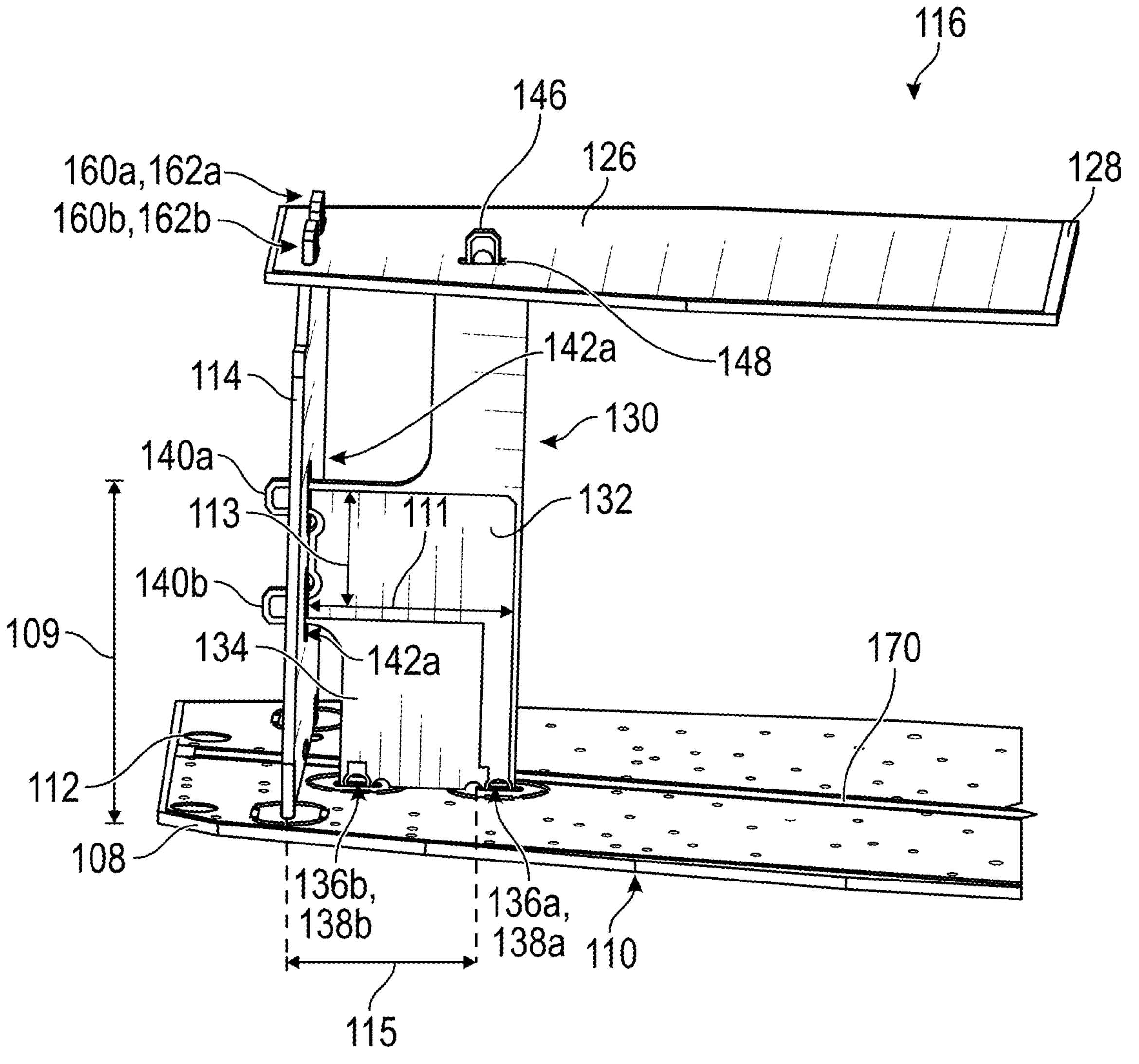
Figure 3C:
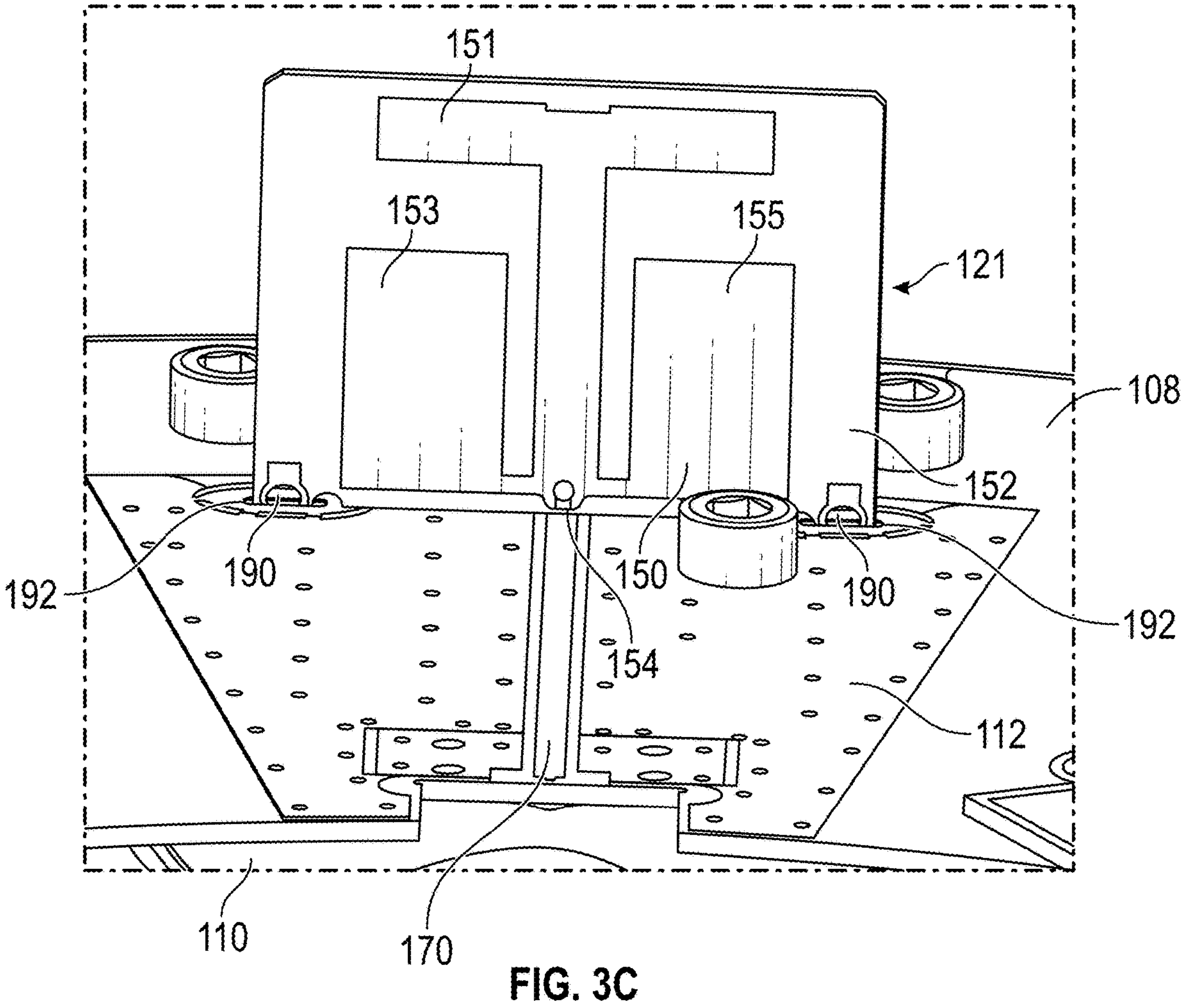
FIG. 3C illustrates an isolation view of a WiFi radiator portion and individual ground plane of the multi-element multi-band antenna system of FIG. 1, in accordance with some aspects of this disclosure.

FIGS. 3A-3C illustrate isolation views of various radiator portions of the multi-element multi-band antenna 102. The radiator portions (e.g., the cellular radiator portions 116, one WiFi radiator portions 121, etc.) and the grounding portion 130 (which can be a matching circuit for the antenna) can include one or more PCB portions (e.g., the cellular radiator portions 116 can include a base PCB 108, an upright PCB portion 114, etc.) The PCB portions may be made of flexible substrate materials (e.g., polyimide). As such, the PCB portions may be a flex circuit. In some cases, the PCB portions may be fiberglass reinforced with epoxy (e.g., FR4). The PCB portions may provide structure for the radiator portions of the multi-element multi-band antenna 102. For example, the various conductive portions of the radiator portions may be etched into the structure of the PCB portions. The PCB portions may also be constructed of high grade RF PCB material, which, compared to FR4, may provide an improved electrical performance. Other PCB materials are also possible. In some cases, the radiator portions of the multi-element multi-band antenna 102 may be made from a conducting material, such as metal. In some implementations, the radiator portions of the multi-element multi-band antenna 102 can be fabricated from sheet metal.

The multi-element multi-band antenna 102 can include a plurality of cellular radiator portions 116 (also referred to herein as "antenna elements 116"). The multi-element multi-band antenna 102 can include any suitable number of cellular radiator portions 116. In one example, the multi-element multi-band antenna 102 may include eight cellular radiator portions 116, as shown in at least FIGS. 2A and 2B. FIGS. 3A and 3B show isolation views of an individual cellular radiator portion 116 coupled to a grounding portion 130 on a radiator ground plane 112. The cellular radiator portions 116 can be configured for low band, mid band, and/or high band operations. The cellular radiator portions 116 can be used for communication between approximately 500 MHz and 8 GHz. The cellular radiator portions 116 may be/function as monopole antennas.

Each cellular radiator portion 116 can include an upright conductive portion 118. The term "upright", as used herein generally refers to elements of the multi-element multi-band antenna 102 that are substantially vertical in relation to the radiator ground planes 112 (and generally the ground reference 110). For example, the upright elements can be perpendicular to the radiator ground plane 112 (e.g., at an angle relative to the radiator ground plane 112 between 85-degrees and 95-degrees). In other implementations, different angles are possible. The upright conductive portion 118 can be supported at least in part by or formed on an upright PCB portion 114. The cellular radiator portion 116 can be electrically coupled to the radiator ground plane 112 on the base PCB 108 and/or the internal ground plane 110 via the grounding portion 130. In some implementations, the upright PCB portion 114 can be mechanically coupled and/or soldered to the radiator ground plane 112.

With continued reference to FIG. 3A, the upright conductive portion 118 can be generally rectangularly shaped. Other shapes are also possible for the upright conductive portion 118. In one example, the upright conductive portion 118 could include a tapered or V-shaped bottom portion. The upright conductive portion 118 can be formed on the upright PCB portion 114. The upright conductive portion 118 can be configured for low band operation (e.g., communications less than approximately 1 GHz). In some implementations, the low band operation of the upright conductive portion 118 can be impacted by the head conductive portion 126, described herein. For example, the length and width of the head conductive portion 126 can impact the low band operation of the upright conductive portion 118. The upright conductive portion 118 can be coupled to a feeding portion 120 at the base of the upright conductive portion 118. The feeding portion 120 is used to electrically excite the cellular radiator portion 116. For example, the feeding portion 120 can be electrically connected to a microstrip transmission line 170 on the radiator ground plane 112. The upright conductive portion 118 can have a height 101 and a width 103, which can impact the low band operation of the upright conductive portion 118, as described herein. In some cases, the width 103 can range between 0.03 inches and 3 inches. However, the width 103 can be selected based on the desired operation of the multi-element multi-band antenna 102 and/or the desired profile of the radome 104, and other sizes are possible. The location and starting point of the upright conductive portion 118 on the upright PCB portion 114 relative to the radiator ground plane 112 can be adjusted to change the overall performance of the multi-element multi-band antenna 102. For example, by changing the position of the upright conductive portion 118, it changes the distance of the upright conductive portion 118 (and the cellular radiator portion 116) to the radiator ground plane 112, the base PCB 108, and the internal ground plane 110. In some cases, changing this position changes the impedance match for each of the different higher order modes that can be served by the combine influence of conductive arm portions 122, 124 of the cellular radiator portion 116, as described below. As such, the location of the starting point of the upright conductive portion 118 on the upright PCB portion 114 can be selected based on the selected compromise of all the higher order modes.

In some implementations, the cellular radiator portion 116 can include only the upright conductive portion 118. In other implementations, the cellular radiator portion 116 can include one or more additional conductive portions, such as a first conductive arm portion 122 and/or a second conductive arm portion 124. The conductive arm portions 122, 124 can be formed on the upright PCB portion 114. As such, the conductive arm portions 122, 124 can be coplanar to the upright conductive portion 118. The conductive arm portions 122, 124 can be coupled to the upright conductive portion 118. For example, the conductive arm portions 122, 124 can be coupled to the upright conductive portion 118 near its base. The conductive arm portions 122, 124 may extend horizontally from the upright conductive portion 118 and then vertically along the edges of the upright PCB portion 114. There can be a gap (e.g., a portion of the upright PCB portion 114 not including conductive material) between the vertical portions of the conductive arm portions 122, 124 and the upright conductive portion 118. In some implementations, the conductive arm portions 122, 124 can have chamfered edges. For example, the conductive arm portions 122, 124 can include a rectangular base portion and a triangular top portion. The triangular top portion can be used to taper the conductive arm portions 122, 124. In some implementations, the conductive arm portions 122, 124 may have a flat top edge, as opposed to a triangular point. In some implementations, the shape of the conductive arm portions 122, 124 are defined by the shape of the upright PCB portion 114. The conductive arm portions 122, 124 can be configured for high band operation. For example, the conductive arm portions 122, 124 may improve the high band operation of the cellular radiator portion 116. The conductive arm portions 122, 124 may assist with the dominate radiation in the high band from the multi-element multi-band antenna 102. Higher even order resonances may radiate from the conductive arm portions 122, 124 of the cellular radiator portion 116 to assist in the multi-band properties of the multi-element multi-band antenna 102. Having the conductive arm portions 122, 124 on the same feeding portion 120 as the upright conductive portion 118 (e.g., in a coplanar arrangement) can provide certain benefits. For example, the size of the antenna assembly 100 can be reduced.

While FIG. 3A illustrates two conductive arm portions 122, 124, it is recognized that each cellular radiator portion 116 can include more or less conductive arm portions. In one example, each cellular radiator portion 116 includes only one conductive arm portion (e.g., either conductive arm portion 122 or conductive arm portion 124). In another example, each cellular radiator portion 116 can include a plurality of conductive arm portions similar to the conductive arm portions 122, 124. For example, each cellular radiator portion 116 can include more than two, more than three, more than four, more than six, more than eight, more than ten, and/or the like conductive arm portions. In some implementations, all of the cellular radiator portions 116 in the multi-element multi-band antenna 102 can include a same number of conductive arm portions 122, 124. In other implementations, the various cellular radiator portions 116 of the multi-element multi-band antenna 102 can include different numbers of conductive arm portions 122, 124.

Similarly, while FIG. 3A illustrates two conductive arm portions 122, 124 that are the same size, this is not a requirement. For example, the conductive arm portion 122 can be a different size and/or shape than the conductive arm portion 124. Further, the conductive arm portions (either the two conductive arm portions 122, 124, a single conductive arm portion 122, or a plurality of conductive arm portions) may not be coplanar with the upright conductive portion 118. In some examples, the various conductive arm portions can be not-coplanar with the upright conductive portion 118.

According to some implementations, including the implementation illustrated in FIGS. 3A and 3B, the cellular radiator portions 116 may include a head conductive portion 126. However, it is recognized that the head conductive portion 126 is not required and some implementations of the cellular radiator portion 116 does not include the head conductive portion 126. The head conductive portion 126 may be coupled to the upright conductive portion 118. The head conductive portion 126 can be formed on a top PCB portion 128. The head conductive portion 126 can have a length 105 and a maximum width 107. The combined total length of the low band conductive portions (e.g., the combined height 101 of the upright conductive portion 118 and the length 105 of the head conductive portion 126) along with the geometry of conductive grounding portion 130 can determine the lowest frequency of operation. In some cases, the balance of the height 101 of the upright conductive portion 118 and the length 105 of the head conductive portion 126 along with the geometry of conductive grounding portion 130 can determine the impedance match of the higher order modes. Generally, the length 105 and maximum width 107 of the head conductive portion 126 can be determined by desired operating range and shape requirements for the radome 104, as described herein. In some cases, length 105 and maximum width 107 of the head conductive portion 126 along with the geometry of conductive grounding portion 130 can be balanced along with the geometry of the grounding portion 130 described herein to optimize the overall impedance match and antenna pattern performance. In some cases, the maximum width 107 can range between 0.03 inches and 3 inches. However, the maximum width 107 can be selected based on the desired operation of the multi-element multi-band antenna 102 and the desired profile of the radome 104, and other sizes are possible.

The top PCB portion 128 can be supported by and/or extend from the top of the upright PCB portion 114. The top PCB portion 128 can be perpendicular to the upright PCB portion 114, such that the top PCB portion 128 extends at approximately a 90-degree angle (e.g., between 85-degrees and 95-degrees) from the upright PCB portion 114. In other implementations, different angles are possible. As such, the cellular radiator portion 116 can be three-dimensional. In some implementations, the top PCB portion 128 can be cantilevered from the first upright PCB portion 114. In some implementations, the head conductive portion 126 can operate in the same frequency range as the upright conductive portion 118. For example, both the upright conductive portion 118 and the head conductive portion 126 can be configured for low band operation. In some cases, the combined length of the head conductive portion 126 and the upright conductive portion 118 along with the geometry of the grounding portion 130 can be a factor in determining the lowest frequency of operation of the grounding portion 130. By including two distinctive portions in the cellular radiator portion 116 that operate at the same frequency range (e.g., the upright conductive portion 118 and the head conductive portion 126), the overall height of the cellular radiator portion 116 can be reduced (e.g., because the head conductive portion 126 extends horizontally and because of the geometry of the grounding portion 130). Having a three-dimensional cellular radiator portions 116 can also reduce the total height and/or total volume of the antenna assembly 100, which can be desirable. For example, having three-dimensional cellular radiator portions 116 can reduce the overall size of the antenna assembly 100 when compared to an antenna assembly that only includes two-dimensional cellular radiator portions, while still maintaining the effectiveness of the multi-element multi-band antenna 102. In some cases, it is desirable to make the multi-element multi-band antenna 102 as compact as possible to conserve space. Having three-dimensional cellular radiator portions 116 can help reduce the overall size of the multi-element multi-band antenna 102, which is desirable in some use cases, particularly when it is not desirable to see the antenna assembly 100. In another example, having two distinct radiator portions on the cellular radiator portions 116 can reduce the total height of the multi-element multi-band antenna 102 to be more compact and conserve space, and allows the multi-element multi-band antenna 102 to be configured to be able to easily cover and provide protection for the antenna assembly 100 in a compact configuration with multi-band coverage.

Various methods of supporting the top PCB portion 128 via the upright PCB portion 114 can be used. In one example, the upright PCB portion 114 can include one or more projections on its top end. The one or more projections can extend through one or more slots or holes in the top PCB portion 128, which can be used to couple the first upright PCB portion 114 and the top PCB portion 128. For example, as shown in FIG. 3A, the upright PCB portion 114 includes a first projection 160*a* and a second projection 160*b* and the top PCB portion 128 includes a first slot 162*a* and a second slot 162*b*. The projections 160*a*, 160*b* can extend through the slots 162*a*, 162*b* to couple the upright PCB portion 114 to the top PCB portion 128. In some cases, the upright PCB portion 114 can be soldered to the top PCB portion 128 at the slots 162*a*, 162*b* and projections 160*a*, 160*b*. In some implementations, the projections 160*a*, 160*b* may include conductive material. For example, the projections 160*a*, 160*b* may be plated projections. Including plated projections 160*a*, 160*b* can allow the head conductive portion 126 to be electrically connected to the first upright PCB portion 114. In some implementations, the projections 160*a*, 160*b* can include holes that extend through the upright PCB portion 114. The holes can improve the soldering process, by allowing the soldering iron to be positioned on one side of the hole and the solder to be placed on the other side of the hole. These holes can reduce the number of soldering locations required and improve the manufacturability of the multi-element multi-band antenna 102. In another example, the first upright PCB portion 114 and the top PCB portion 128 may be formed from a single PCB portion with a bend. In some implementations, the upright portion 114 and the top portion 128 may be formed out one or more pieces of sheet metal instead of PCB substrate.

In some implementations, the head conductive portion 126 may extend along the upright PCB portion 114. For example, the head conductive portion 126 may be coplanar to the upright conductive portion 118 such that the cellular radiator portion 116 includes two distinct conductive portions in the same plane. This arrangement may increase the overall height of the upright PCB portion 114, the multi-element multi-band antenna 102, and/or the antenna assembly 100. Having purely vertical conductive portions for the cellular radiator portion 116 (e.g., where the upright conductive portion 118 is coplanar to the head conductive portion 126) can simplify the assembly of the multi-element multi-band antenna 102 and may be desirable when the size/height of the multi-element multi-band antenna 102 is not an important design consideration. However, including the head conductive portion 126 that extends at an angle relative to the upright PCB portion 114 can provide a benefit of reducing the overall size of the multi-element multi-band antenna 102, which can be desirable.

In some implementations, the cellular radiator portion 116 can include additional conductive portions configured for low band operation in addition to the upright conductive portion 118 and the head conductive portion 126. For example, the cellular radiator portion 116 can include a third conductive portion configured for low band operation. The third conductive portion can be coupled to the head conductive portion 126 and/or the upright conductive portion 118. In yet another example, the cellular radiator portion 116 can include a fourth conductive portion configured for low band operation. The fourth conductive portion can be coupled to the third conductive portion, the head conductive portion 126, and/or the upright conductive portion 118. In some examples, the third conductive portion and the fourth conductive portion can have the same length. In other examples, the third conductive portion and the fourth conductive portion can have different lengths.

FIG. 3B illustrates an isolation view of the cellular radiator portion 116 and it's grounding portion 130 on the radiator ground plane 112. The grounding portion 130 can be a ground conductive portion 132 on a ground PCB portion 134. The grounding portion 130 is configured to provide a conductive path between the cellular radiator portion 116 and the radiator ground plane 112 and/or the internal ground plane 110. The ground conductive portion 132 can have a height 109 relative to the radiator ground plane 112, a width 111 relative to the upright PCB portion 114, a length 113 which defines the height of the actual conductive material, and a clearance 115 which defines the distance between the feeding portion 120 of the first radiator portion 116 and the grounding location (e.g., the location of the first base projection 136*a*). The combination of approximately the height 109 and the clearance 115 of the grounding portion 130 can define the grounding length. In some cases, the height to the base of ground conductive portion 132 relative from the radiator ground plane 112 (e.g., the height 109 minus the length 113) can also impact the grounding length. In some cases, the clearance 115 can be between 0.06 inches and 3 inches, however, other sizes are possible. In some cases, the height to the base of ground conductive portion 132 relative from the radiator ground plane 112 (e.g., the height 109 minus the length 113) can range from 0.06 inches to the height 101 of the upright conductive portion 118.

The grounding portion 130 may be coupled to the cellular radiator portion 116 at one or more points and the base PCB 108/the radiator groundplane 112 at one or more points. The ground PCB portion 134 may be coupled to and extend from the radiator ground plane 112 and/or the base PCB 108, which in turn may be electrically coupled to the internal groundplane 110. For example, the ground PCB portion 134 can be positioned in one or more slots or cut-outs of the radiator ground plane 112 and/or the base PCB 108. In the illustrated example, the ground PCB portion 134 includes two base projections, a first base projection 136*a* and a second base projection 136*b*. Other numbers of projections are possible. The ground conductive portion 132 extends along one or both of the two projections 136*a*, 136*b*. In the illustrated example, the ground conductive portion 132 extends along only the first base projection 136*a*. Similarly, the radiator ground plane 112 and/or the base PCB 108 include two base slots, a first slot 138*a* and a second base slot 138*b*. Other numbers of slots are possible. The slots 138*a*, 138*b* may extend through the radiator ground plane 112 and/or the base PCB 108 to provide access to the internal ground plane 110. This arrangement allows the grounding portion 130 to be electrically connected to the radiator ground plane 112 and/or the internal ground plane 110 (e.g., via the electrical connection between the ground conductive portion 132 and the internal ground plane 110). For further clarity, the grounding portion 130 is electrically connected to the radiator ground plane 112 and/or internal ground plane 110 at the intersection between the ground conductive portion 132 and the radiator ground plane 112 and/or the internal ground plane 110, where the first base projection 136*a* contacts the first slot 138*a*. Those skilled in the art will understand that only one point of electrical connection is required between the grounding portion 130 and the radiator ground plane 112 and/or the internal ground plane 110. The interaction between the second base slot 138*b* and the second base projection 136*b* can provide mechanical stability and support for the ground PCB portion 134. Optionally, in some implementations, the ground conductive portion 132 can extend along the second base projection 136*b* and provide a second electrical connection at the second base slot 138*b*.

The ground PCB portion 134 can be generally perpendicular relative to the radiator ground plane 112 and/or the base PCB 108. For example, the ground PCB portion 134 may extend from the radiator ground plane 112 and/or the base PCB 108 at approximately a 90-degree angle (e.g., between 85-degrees and 95-degrees). In other implementations, different angles are possible. Similarly, the ground PCB portion 134 can be coupled to the first upright PCB portion 114. The ground PCB portion 134 may be generally perpendicular relative to the first upright PCB portion 114. For example, the ground PCB portion 134 may extend from the first upright PCB portion 114 at approximately a 90-degree angle (e.g., between 85-degrees and 95-degrees). In other implementations, different angles are possible.

The ground PCB portion 134 can include one or more side projections that extend through corresponding slots/holes in the first upright PCB portion 114. In the illustrated example, the ground PCB portion 134 includes two side projections, a first side projection 140*a* and a second side projection 140*b*. Other numbers of projections are possible. The ground conductive portion 132 can extend along the two side projections 140*a*, 140*b*. Similarly, the first upright PCB portion 114 can include two slots, a first slot 142*a* and a second slot 142*b*. Other numbers of slots are possible. The slots 142*a*, 142*b* may be formed in the upright conductive portion 118. This arrangement allows the cellular radiator portion 116 to be electrically connected to the grounding portion 130 (e.g., via the electrical connection between the upright conductive portion 118 and the ground conductive portion 132). For further clarity, the cellular radiator portion 116 is electrically connected to the grounding portion 130 at the intersection between the upright conductive portion 118 and the ground conductive portion 132, where the two side projections 140*a*, 140*b* meet and contact the two slots 142*a*, 142*b*. Those skilled in the art will understand that only one point of electrical connection is required. However, having two points of coupling and electrical connection can provide advantages of greater stability and connection between the first upright PCB portion 114 and the ground PCB portion 134 as well as higher order mode performance. In some cases, the grounding portion 130 can be soldered at one or more locations for mechanical stability and/or electrical connection. For example, the grounding portion 130 can be soldered at the locations of the four projections (e.g., at the two side projections 140*a*, 140*b* to the cellular radiator portion 116, and at the two base projections 136*a*, 136*b* to the base PCB portion 112). In some implementations, the projections of the grounding portion 130 (e.g., the two base projections 136*a*, 136*b* and/or the two side projections 140*a*, 140*b*) may include holes that extend through the projections. The holes can improve the soldering process, by allowing the soldering iron to be positioned on one side of the hole and the solder to be placed on the other side of the hole. These holes can reduce the number of soldering locations required and improve the manufacturability of the multi-element multi-band antenna 102.

In some implementations, the ground PCB portion 134 can include a top projection 146. The top projection 146 can be used to mechanically couple the grounding portion 130 to the top PCB portion 128. For example, the top projection 146 can extend through a slot 148 in the top PCB portion 128. The top projection 146 can be soldered to the top PCB portion 128 at the slot 148. The top projection 146 can include a hole for improving the soldering process. While not required, coupling the grounding portion 130 to the top PCB portion 128 can provide additional support for the top PCB portion 128 and/or the grounding portion 130.

The low band operation of the cellular radiator portion 116 can be impacted by several factors. Some non-limiting non-exhaustive factors can include: the height 101 and width 103 of the upright conductive portion 118, the length 105 and maximum width 107 of the head conductive portion 126, the two dimensional shape of head conductive portion 126, the relative angular orientation of the upright conductive portion 118 to the radiator ground plane 112, the relative angular orientation of the upright conductive portion 118 to the head conductive portion 126, the location of the first slot 138*a* (e.g., which can define the electrical connection point for the ground conductive portion 132 and the radiator groundplane 112) relative to the feeding portion 120 of the cellular radiator portion 116, and the shape of the grounding portion 130. In some instances, the location of conductive block 119 relative to feed point 120 that is used to establish the ground connection between the radiator ground plane 112 and internal ground plane 110 can also impact the low band operation of the cellular radiator portion 116. In some implementations, one or more of the height 109, width 111, length 113, and clearance 115 of the ground conductive portion 132 can provide a reactance that can counter-balance the reactance of the low band impedance of the cellular radiator portion 116. This interaction can provide a resonance of a desired impedance match for the desired frequency and bandwidth for the low band radiation of the cellular radiator portion 116. This interaction can also provide the frequency location for the higher odd order resonances in the multi-band nature of the multi-element multi-band antenna 102. In some implementations, the location of the first slot 138*a* (e.g., which can define the electrical connection point for the ground conductive portion 132 and the radiator ground plane 112), the width 111 and length 113 of the ground conductive portion 132, the height 101 of the cellular radiator portion 116, and the length 105 of the head conductive portion 126 can be configured to provide higher odd order resonant harmonics at the desired locations to cover a portion of the frequency band of the multi-band performance of the multi-element multi-band antenna 102.

Referring back to FIGS. 2A and 2B, the multi-element multi-band antenna 102 can include one or more radiator portions 121. The radiator portions 121 can be configured for multi-band WiFi radios. For example, the radiator portions 121 can be multi-band WiFi antenna devices. As such, the radiator portions 121 can be configured for mid band and high band operation. In some cases, the radiator portions 121 can have an operating range of approximately 1.7 GHz to 8 GHz. The radiator portions 121 can also be referred to herein as "multi-band/dual-band WiFi antennas 121" and "WiFi radiator portions 121".

FIG. 3C shows an isolation view of one radiator portion 121 of the multi-element multi-band antenna 102 on a radiator ground plane 112. The radiator portions 121 can include a conductive portion 150 formed on an upright PCB portion 152. The conductive portion 150 can be coupled to a feeding portion 154 at the base of the conductive portion 150. The feeding portion 154 is used to electrically excite the radiator portion 121. For example, the feeding portion 154 can be electrically connected to the microstrip transmission line 170 on the radiator ground plane 112. In some cases, the conductive portion 150 can include a central conductive portion 151 and a first arm 153 and a second arm 155, all etched into the PCB portion 152. The central conductive portion 151 can be generally T-shaped. In some cases, the central conductive portion 151 can be used for the 2.4 GHz to 2.5 GHz portion of the WiFi band. In some cases, the height and width of the conductive portion between the central conductive portion 151 (e.g., between the two arms of the "T") and the height and width of the arms 153, 155 along with spacing of the gap between base of the arms 153, 155 and the radiator ground plane 112 can be selected for the impedance matching of the two bands.

As shown in at least FIGS. 2A, 2B, and 3C, each radiator portion 121 can be positioned on an individual radiator ground plane 112. The upright PCB portion 152 can be positioned near an edge of the radiator ground plane 112 such that the upright PCB portion 152 is coupled to and extends from the radiator ground plane 112. The upright PCB portion 152 can be generally perpendicular to the radiator ground plane 112. For example, the upright PCB portion 152 can extend at approximately a 90-degree angle (e.g., between 85-degrees and 95-degrees) from the radiator ground plane 112. In other implementations, different angles are possible. In some cases, the position of the radiator portions 121 about the base PCB 108 can be selected to provide isolation between the different radiator portions 121 of the multi-element multi-band antenna 102 as well as isolation between the radiator portions 121 and the cellular antennas (e.g., cellular radiator portions 116). Additionally, these positions can be chosen with a goal of not disturbing the impedance match of the cellular radiator portions 116, while still maintaining reasonable antenna patterns for both the radiator portions 121 and the cellular radiator portions 116. In other instances, the radiator portions 121 are electrically coupled to cellular radiator portions 116 by use of connection between the radiator ground plane 112 to the internal ground plane 110 via the conductive blocks 119.

Figure 5:
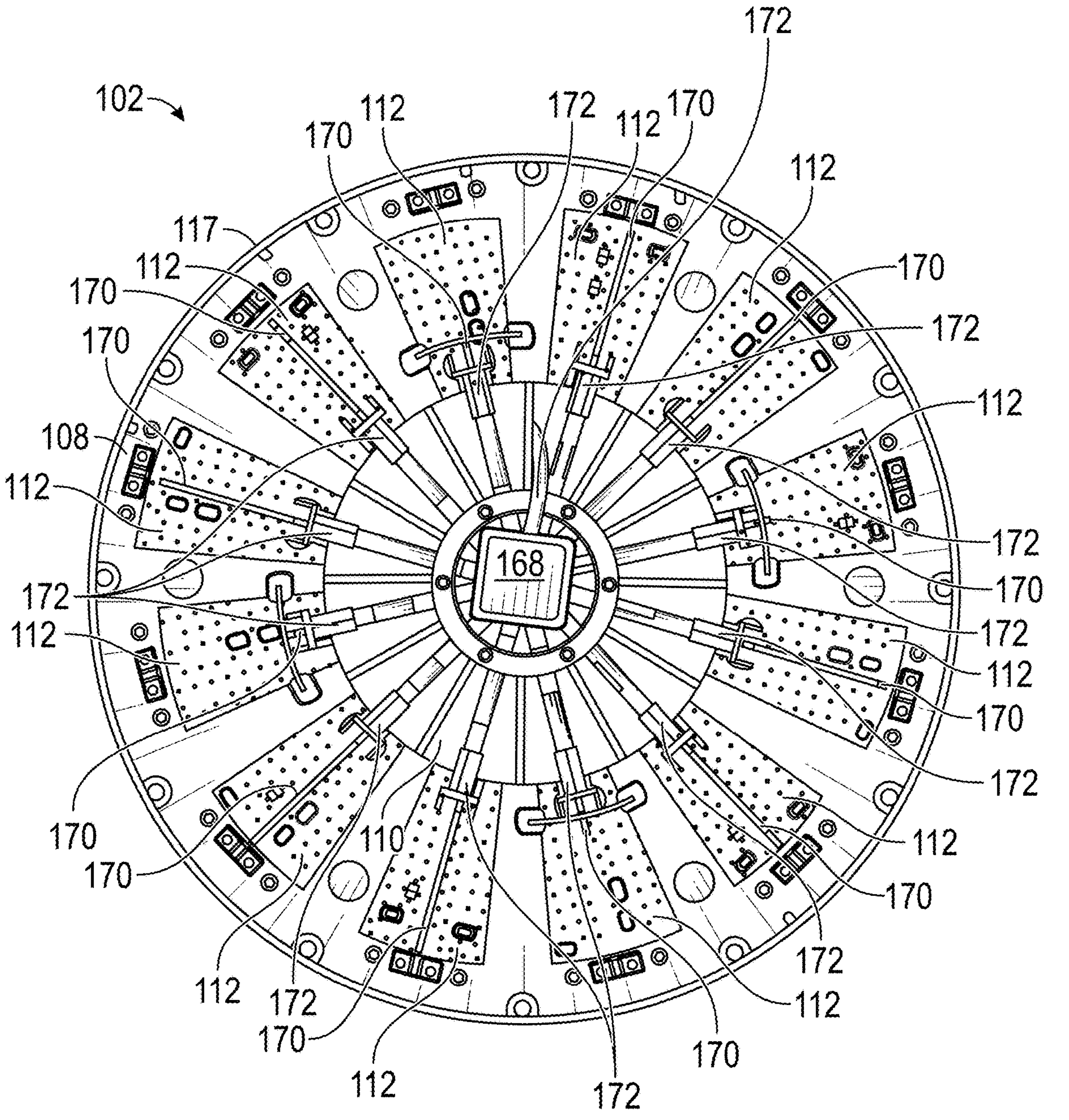
FIG. 5 illustrates a top view of a base PCB and a base of the multi-element multi-band antenna system of FIG. 1, in accordance with some aspects of this disclosure.

In some implementations, the multi-element multi-band antenna 102 can optionally include one or more GPS radiating portions. As shown in FIG. 5, the multi-element multi-band antenna 102 can include a GPS radiating portion 168 (also referred to herein as a "GPS radiating device"). The GPS radiating portion 168 can be used to collect signal(s) from geosynchronous satellites so that the GPS function of a radio including the multi-element multi-band antenna 102 can determine where the multi-element multi-band antenna 102 is positioned relative to a global coordinate system. The GPS 168 may be positioned within and extend through a hole in the base PCB 108 in the assembled multi-element multi-band antenna 102, so the GPS 168 is positioned at a center of the internal ground plane 110. In the assembled multi-element multi-band antenna 102, the GPS radiating portion 168 may be electrically and/or mechanically coupled to the internal ground plane 110.

Any of the PCB portions that conductive portions are formed on (e.g., the cellular radiator portions 116, the radiator portions 121, the grounding portion 130, etc.) can include one or more plated projections. The plated projections can include through holes. The plated projections can be conductive plates coupled to or formed on the PCB portions with through holes that extend through the PCB portion and the plates. For example, the cellular radiator portion 116 shown in FIG. 3A includes two plated projections 190 on the bottom corners of the upright PCB portion 114. Similarly, as shown in FIG. 3C, the radiator portion 121 includes two plated projections 190 on the bottom corners of the upright PCB portion 152. The plated projections 190 can be formed on projections extending from the bottom edges of the PCB portions in some cases (e.g., similar to the projections 136*a*, 136*b* of the grounding portion 130). The plated projections 190 can be aligned and extend into plated slots 192 in the radiator ground plane 112 and/or the base PCB 108. The plated slots 192 can be conductive plates coupled to or formed on the radiator ground plane 112 and/or the base PCB 108 with through holes or slots that extend through the radiator ground plane 112, the base PCB 108, and the plates. Including various PCB portions of the antenna assembly 100 with plated projections 190 for aligning with plated slots 192 in the radiator ground plane 112 and/or the base PCB 108 can provide certain benefits. For example, the PCB portions can be soldered to the radiator ground planes 112 and/or the base PCB 108 at where the plated projections with through holes 190 extend through the plated slots 192. For example, the solder can be placed on one side of the plated projection 190 and the soldering iron can be placed on the opposite side of the plated projection 190. This arrangement can improve the manufacturability of the antenna assembly 100. For example, this arrangement can reduce the total amount of time required to solder the various PCB portions to the radiator ground planes 112 and/or the base PCB 108, which can be time consuming where the plated projections 190 and the plated slots 192 are not included. While only some of the PCB portions include labeled plated projections 190, it is understood that any of the PCB portions in the antenna assembly 100 can include plated projections 190. Similarly, while only certain portions of the radiator ground planes 112 and/or the base PCB 108 include labeled plated slots 192, it is understood that the radiator ground plane 112 and the base PCB 108 can include plated slots 192 at any location.

While various portions of the multi-element multi-band antenna 102 are shown and described as being at least partially constructed of PCB, in other implementations, different materials can be used. For example, the conductive structures of the multi-element multi-band antenna 102 (e.g., the cellular radiator portions 116, the radiator portions 121, the grounding portion 130, etc.) can be formed from metalized plastic, metal, and/or the like.

FIG. 5 illustrates a top view of the base PCB 108, the radiator ground planes 112, the internal ground plane 110 of the multi-element multi-band antenna 102 and a plurality of coaxial cables 172 (also referred to herein as "coaxial transmission lines"). FIGS. 6A and 6B illustrate a top side view and a bottom side view respectively of the base PCB 108. The radiator ground planes 112 can be coupled to the base PCB 108 or the radiator ground planes 112 can be integrated in the base PCB 108 (e.g., with the top radiator ground plane side 112A on the top PCB side 108A and the bottom radiator ground plane side 112B on the bottom side 108B).

The base PCB 108 can include a plurality of microstrip transmission lines 170. The microstrip transmission lines 170 can be formed on the radiator ground plane 112. The number of microstrip transmission lines 170 included in the multi-element multi-band antenna 102 can be determined by the number of radiating structures included in the multi-element multi-band antenna 102. In the illustrated example, the multi-element multi-band antenna 102 includes twelve radiating structures (e.g., eight cellular radiator portions 116, and four WiFi radiator portions 121). As such, the multi-element multi-band antenna 102 includes twelve microstrip transmission lines, collectively referred to as the plurality of microstrip transmission lines 170. In other implementations of the multi-element multi-band antenna 102, the multi-element multi-band antenna 102 can include more or less microstrip transmission lines 170. Each microstrip transmission line of the plurality of microstrip transmission lines 170 extends between the feeding portion of individual radiator portions (e.g., the feeding portion 120 of the cellular radiator portion 116) and to an individual coaxial cable 172, described further with reference to FIG. 8. The microstrip transmission lines 170 are used to electrically excite the various radiator portions of the multi-element multi-band antenna 102. In some implementations, the microstrip transmission lines 170 provide a benefit of an economical use of space to route microwave energy from a location near the center of the PCB 108 and base 117 and connecting to various radiator portions dispersed on the base PCB 108 around the center of the internal ground plane 110. While in some cases, it may be preferable to connect the radiator portions to the center of the internal ground plane 110 via the plurality of groundplane portion of the microstrip transmission lines 170 and the outer conductors of the coaxial cables 172, other suitable ways to transport the microwave energy from the radios to the radiator portions are also within the scope of the present disclosure. Economics, environmental, and volumetric space constraints allow for engineering alternatives to the final packaging solution in some implementations. Generally, it is desirable for the spacing between the plurality of groundplanes of the microstrip transmission lines 170 and the internal ground plane 112*b* to be less than 1 mm, which can allow the multi-element multi-band antenna 102 to operate effectively up to ranges of at least 6 GHz. For example, the non-conductive portion of the base PCB 108 can be less than 1 mm thick.

FIG. 8 illustrates a perspective view of the connector end of a coaxial cable 172. The coaxial cables 172 are the transmission lines that allow for the radio frequency "RF" signal to travel from the output of the radio used to establish the wireless link from the base station to the mobile radio of the users of the wireless network. The coaxial cables 172 may require proper connection to the particular components of the multi-element multi-band antenna 102 so that it can function properly.

The number of coaxial cables 172 included in the multi-element multi-band antenna 102 can be determined by the number of radiator portions included in the multi-element multi-band antenna 102. In the illustrated example, the multi-element multi-band antenna 102 includes thirteen radiator portions (e.g., eight cellular radiator portions 116, four WiFi radiator portions 121, and the GPS radiating portion 168). As such, the multi-element multi-band antenna 102 includes thirteen coaxial cables 172. In other implementations, the multi-element multi-band antenna 102 may include more of less coaxial cables 172 when the multi-element multi-band antenna 102 includes a different number of radiator portions.

Figure 9A:
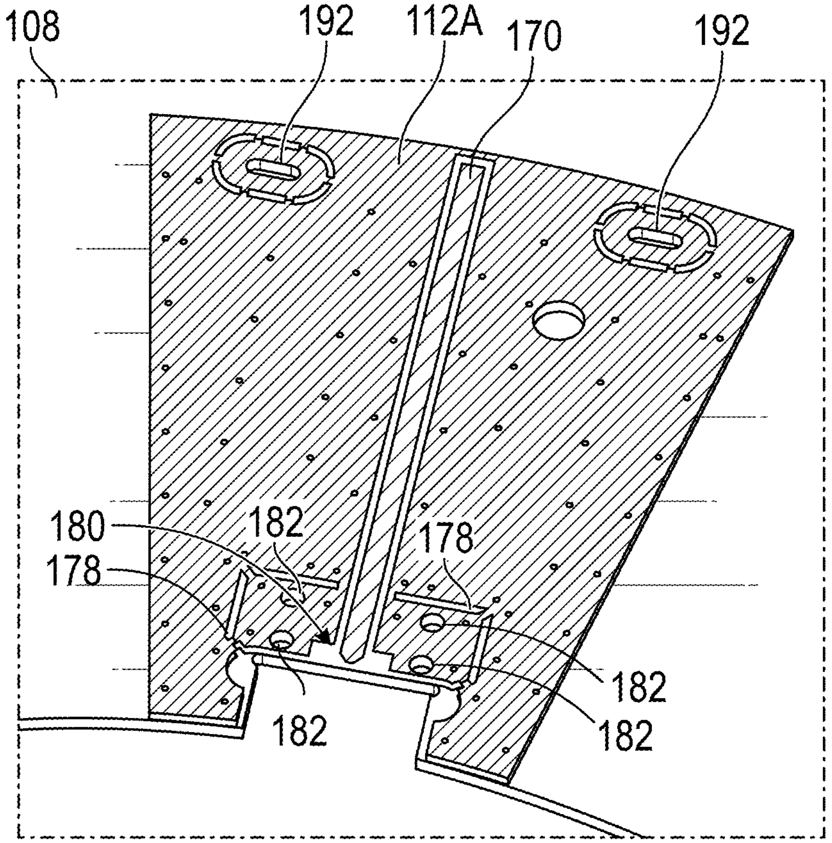
FIGS. 9A and 9B illustrate perspective top and bottom views respectively of an individual radiator ground plane of the multi-element multi-band antenna system of FIG. 1, in accordance with some aspects of this disclosure.
Figure 9B:
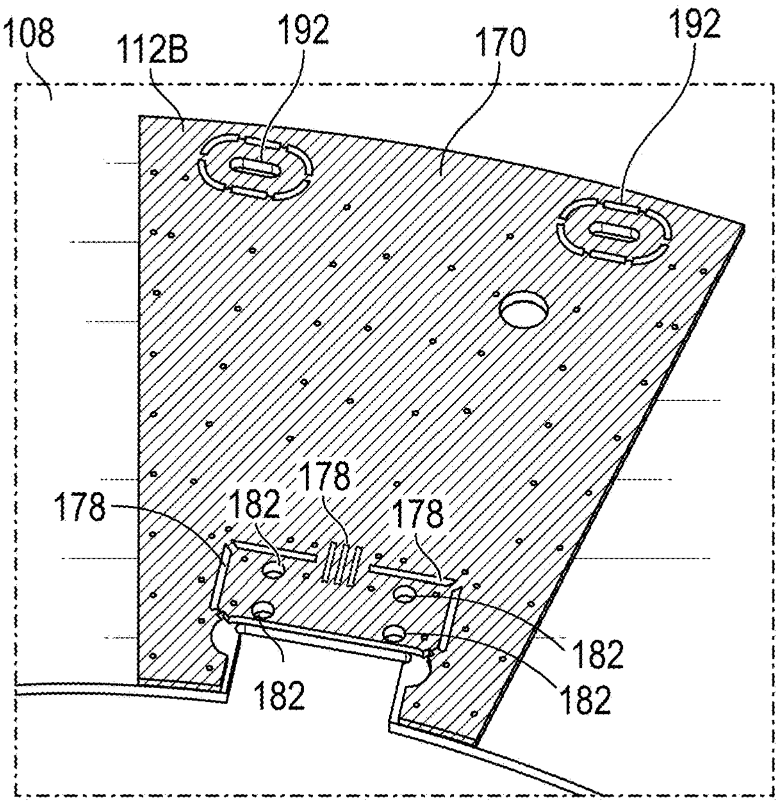

The coaxial cables 172 may each include a center conductor 173 positioned within an outer conductor 174. In some implementation at least some of the outer conductors 174 of coaxial cables 172 can be coupled to the radiator ground planes 112 and/or the base PCB 108. The center conductors 174 of coaxial cables 172 can be coupled to the center strip of the microstrip transmission line 170. For example, the ground pins 179 of coaxial cables 172 can be soldered to the radiator ground plane 112 and/or the base PCB 108. In some implementations, a coaxial cable 172 can be coupled to the GPS radiating portion 168 so the coaxial cables 172 extends from the GPS radiating portion 168 (see e.g., FIG. 5). In some cases, the coaxial cables 172 coupled to the radiator ground plane 112 and/or the base PCB 108 can each include a connector 175. For example, as shown in FIG. 9 each coaxial cable 172 can include a connector 175 with ground pins 179. The connector 175 can be used to solder the coaxial cables 172 to the radiator ground plane 112 and/or the base PCB 108. For example, as shown in FIGS. 9A and 9B, the radiator ground plane 112 can include one or more plated holes 182. The plated holes 182 can extend through the top radiator ground plane side 112A, the base PCB 108, and the bottom radiator ground plane side 112B. The one or more plated holes 182 can include a conductive coating, similar to the plated slots 192. The coaxial cables 172 can be soldered to the radiator ground plane 112 and/or the base PCB 108 while still maintaining good RF connection. The solder and connector 175 may be used to establish a soldered connection between the outer conductors 174 and the radiator ground plane 112. For example, the ground pins 179 can be soldered at the plated holes 182. Including plated holes 182 for connecting the connector 175 can allow for an efficient soldering process whereby eight surfaces are soldered with one application. As shown in FIG. 5, twelve coaxial cables 172 are soldered onto the twelve radiator ground planes 112, with the center conductor 173 of each coaxial cable extending towards the center strip microstrip transmission line 170 of each radiator ground plane 112.

In the multi-element multi-band antenna 102, the center conductors 173 of are electrically connected to the center strip of microstrip transmission lines 170 at coaxial inputs 180 (shown in FIG. 9A). In some cases, the center conductors 173 of the coaxial cables 172 can be soldered to the coaxial inputs 180, which results in the coaxial cables 172 being electrically coupled to the plurality of microstrip transmission lines 170 and the radiating structures of the multi-element multi-band antenna 102.

In some implementations, other techniques can be employed to establish the electrical connection. For example, mechanical clamps with threaded fasteners can be used, spring loaded contacts can be used, electromagnetic coupling can be used, and/or the like. In the electromagnetic coupling example, the two conducting surfaces (e.g., the center conductor 173 and the center strip of microstrip transmission lines 170) do not physically touch but are in sufficiently close proximity to one another by a non-conductive material (e.g., the base PCB 108) that provides a stable and consistent mechanical alignment. While soldering is used to establish the electrical connection between the outer conductors 174 of the coaxial cables 172 in the illustrated implementation, in other implementations, the same types of connection discussed for the center conductor can be used to electrically coupled the outer conductor 174 and the radiator ground plane 112 and/or the base PCB 108 of the multi-element multi-band antenna 102. In some implementations, the coaxial cables 172 can be located near the center of the internal ground plane 110 and/or the base 117.

Referring back to FIGS. 2A and 2B, in some implementations, the radiator portions of the multi-element multi-band antenna 102 can be positioned on the base PCB 108 around the center of the internal ground plane 110 (i.e., the base 117). The radiator portions can be positioned radially outward from the center of the base PCB 108. The cellular radiator portions 116 can be positioned in any orientation about the base PCB 108. In the illustrated example, some of the cellular radiator portions 116 are in a first orientation, with the upright conductive portions 118 facing towards the center of the base PCB 108, and some of the cellular radiator portions 116 are in a second orientation, with the upright conductive portion 118 facing away from the center of the base PCB 108. Cellular radiator portions 116 in the first orientation can be staggered evenly about the base PCB 108 (e.g., at 90-degrees relative to each other). Similarly, cellular radiator portions 116 in the second orientation can also be staggered evenly about the base PCB 108 (e.g., at 90-degrees relative to each other). In other implementations, where more or less cellular radiator portions 116 are included in the multi-element multi-band antenna 102, the relative angles between the cellular radiator portions 116 may differ. Because of the different orientations, the distance from the center of the base PCB 108 to the upright conductive portions 118 of the cellular radiator portions 116 can also vary based on orientation. For example, the cellular radiator portions 116 in the first orientation have their upright conductive portions 118 located radially inward of the upright conductive portions 118 of the cellular radiator portions 116 in the second orientation. Arranging the cellular radiator portions 116 in these orientations can provide certain benefits. For example, this arrangement can improve the isolation between the various cellular radiator portions 116. For example, the cellular radiator portions 116 can radiate individually instead of coupling energy with each other. Additionally, the use of individual radiator ground planes 112 for each cellular radiator portions 116 can also improve the isolation of the cellular radiator portions 116.

The cellular radiator portions 116 can be arranged in groups around the center of the base PCB 108, with each group including one cellular radiator portions 116 in the first orientation and one cellular radiator portions 116 in the second orientation. In some cases, the radiator portions 121 can be positioned between groups of cellular radiator portions 116. For example, each radiator portion 121 can be positioned between four cellular radiator portions 116, with two cellular radiator portions 116 on one side of the radiator portions 121 and two cellular radiator portions 116 on the other side of the radiator portions 121. In this arrangement, each radiator portion 116, 121 can be spaced approximately 30 degrees from each other radiator portion 116, 121 about the center of the base PCB 108. In other examples, alternative positioning and/or spacing can be implemented. As noted above, the positioning and orientation of the radiator portions 116, 121 about the center of the base PCB 108 can reduce mutual coupling and enhance realized antenna gain.

As shown in FIGS. 9A and 9B, base PCB 108 and/or the radiator ground planes 112 can include one or more heat relief portions 178 (also referred to herein as "reliefs"). The one or more heat relief portions 178 can be formed on the top radiator ground plane side 112A and/or the bottom radiator ground plane side 112B. The reliefs 178 can be slits or cutouts in the radiator ground planes 112, exposing the non-conductive base PCB 108. In some examples, each outer conductor 174 of the coaxial cables 172 can be positioned between one or more reliefs 178. The outer conductors 174 of the coaxial cables 172 may be soldered to the radiator ground plane 112 and/or the base PCB 108 to electrically connect each outer conductor 174 to the radiator ground plane 112, (e.g., via the plated holes 182 as described herein). The plurality of reliefs 178 may serve as a stopping point or dam to restrict the flow of heat through the base radiator ground planes 112, while allowing the unobstructed flow of heat through the PCB 108. For example, the one or more reliefs 178 can provide thermal management, such as inhibiting the conduction of heat in its flow into the groundplanes 112 during the assembly (e.g., soldering) process. During the soldering process, a solder mask can be used to contain the placement of the solder.

Figure 4:
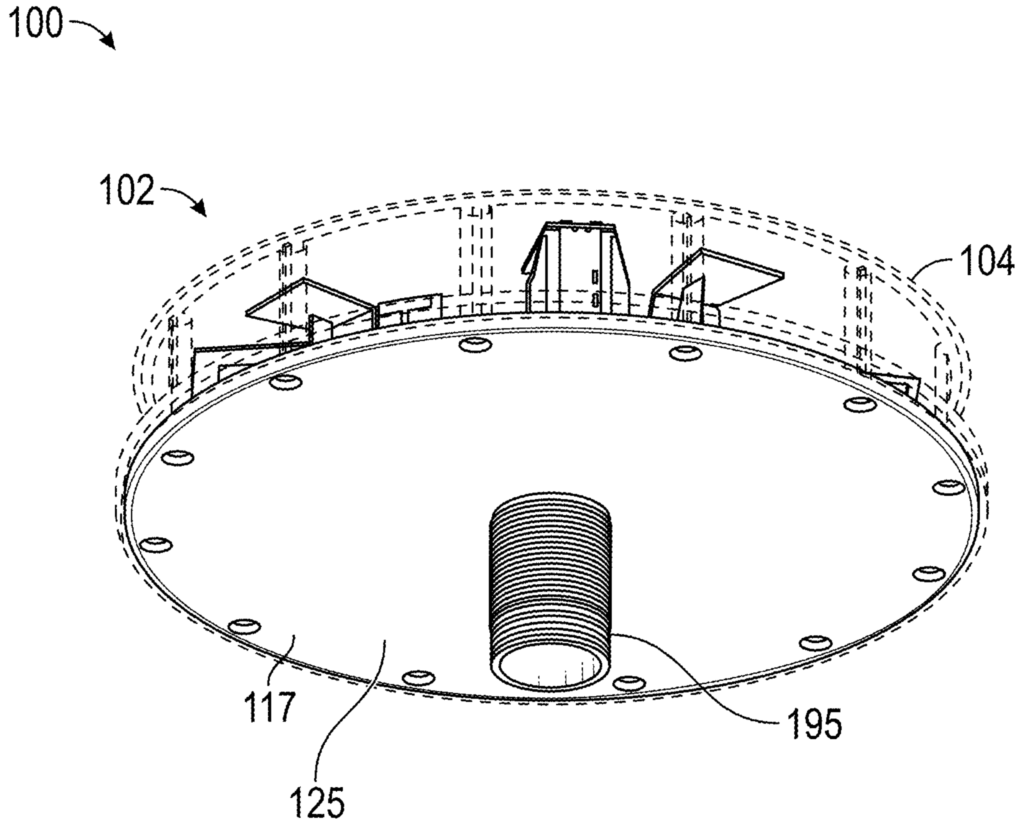
FIG. 4 illustrates a bottom perspective view the multi-element multi-band antenna system of FIG. 1 with the non-conductive cover shown as transparent for illustrative purposes, in accordance with some aspects of this disclosure.

With reference to FIG. 4, the base 117 can include a coupling portion 195. The coupling portion 195 can include a threading. The coupling portion 195 can extend from a bottom of the base 117 so the coupling portion 195 extends through an opening in the client groundplane when the multi-element multi-band antenna 102 is positioned on the client groundplane. The coupling portion 195 can be positioned in the center of the base 117. A washer, a nut (e.g., a hex nut), and/or any other fastener can be coupled to the threading of the coupling portion 195 to secure the multi-element multi-band antenna 102 to the client groundplane.

Figure 10:
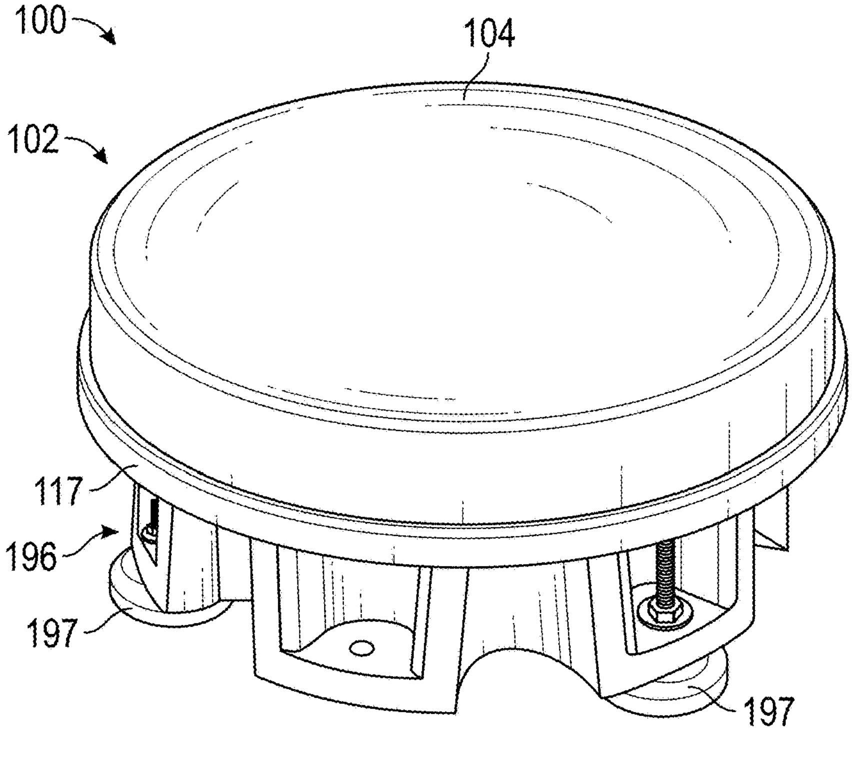
FIG. 10 illustrates a perspective view of the antenna assembly of FIG. 1, showing the multi-element multi-band antenna system with a magnetic coupling portion, in accordance with some aspects of this disclosure.

FIG. 10 illustrates the antenna assembly 100 with a magnetic coupling portion 196. The magnetic coupling portion 196 can include magnets 197 positioned at a bottom of the magnetic coupling portion 196. The magnetic coupling portion 196 may be coupled to the base 117 via one or more fasteners. In some implementations, the magnets 197 can be threadably coupled to the magnetic coupling portion 196. Accordingly, the magnets 197 can be rotated to move the magnets 197 in a direction towards and/or away from the base 117 so one or more of the magnets 197 are positioned a different distance from the base 117 than the rest of the magnets 197 to allow the multi-element multi-band antenna 102 and/or the magnetic coupling portion 196 to be coupled to a curved client surface.

Figure 11B:
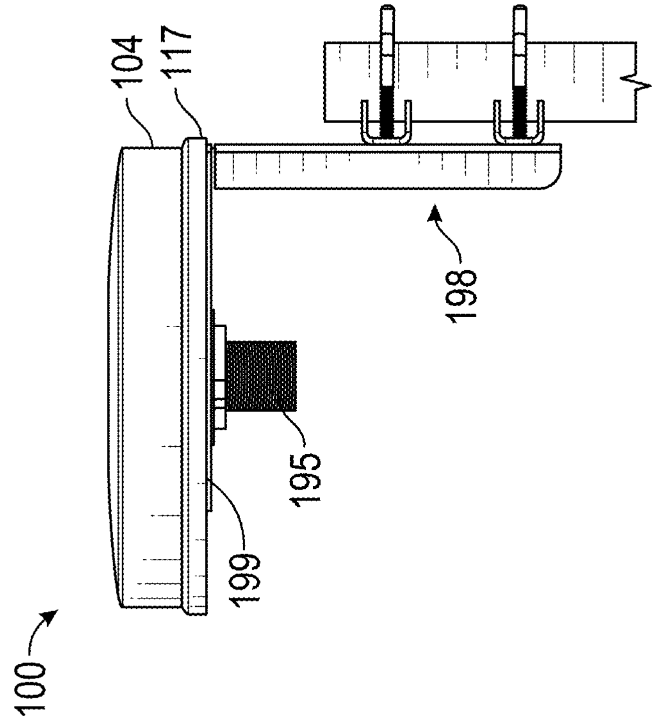
FIGS. 11A and 11B illustrate the antenna assembly of FIG. 1, showing the multi-element multi-band antenna system with a mounting bracket, in accordance with some aspects of this disclosure.
Figure 11A:
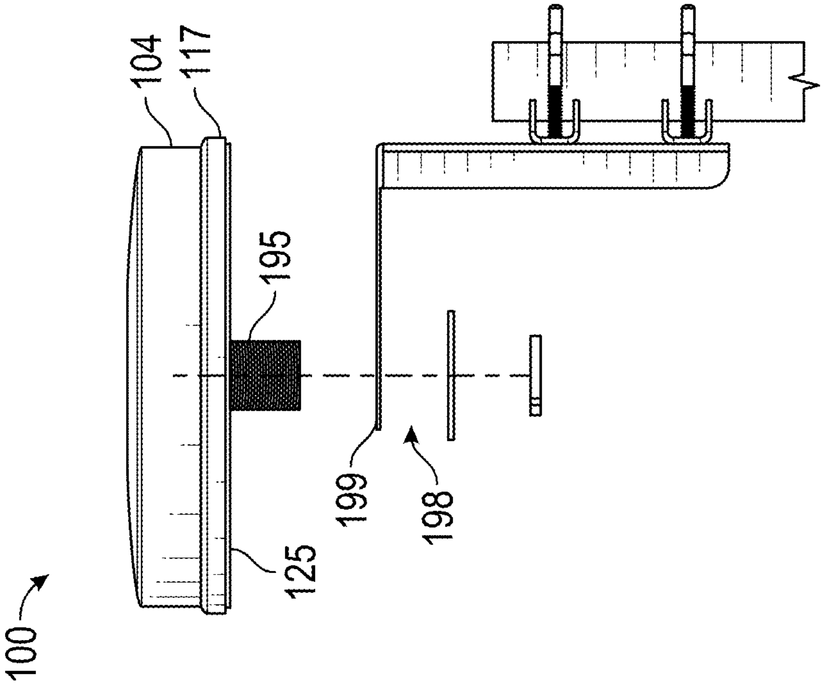

FIGS. 11A and 11B illustrate the antenna assembly 100 with a mounting bracket 198. The mounting bracket 198 may be removably coupled to a pole and/or any other elongated structure. The mounting bracket 198 may include a mounting groundplane 199 that includes an opening. The multi-element multi-band antenna 102 may be coupled to the mounting groundplane 199 so the coupling portion 195 extends through the opening in the mounting plane 199. A washer, a nut (e.g., a hex nut), and/or any other fastener can be coupled to the threading of the coupling portion 195 to secure the multi-element multi-band antenna 102 to the mounting groundplane 199.

The particular implementations disclosed above are illustrative only, as the application may be modified and practiced in different but equivalent manners apparent to those skilled in the art having the benefit of the teachings herein. It is therefore evident that the particular implementations disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

Figure 12A:
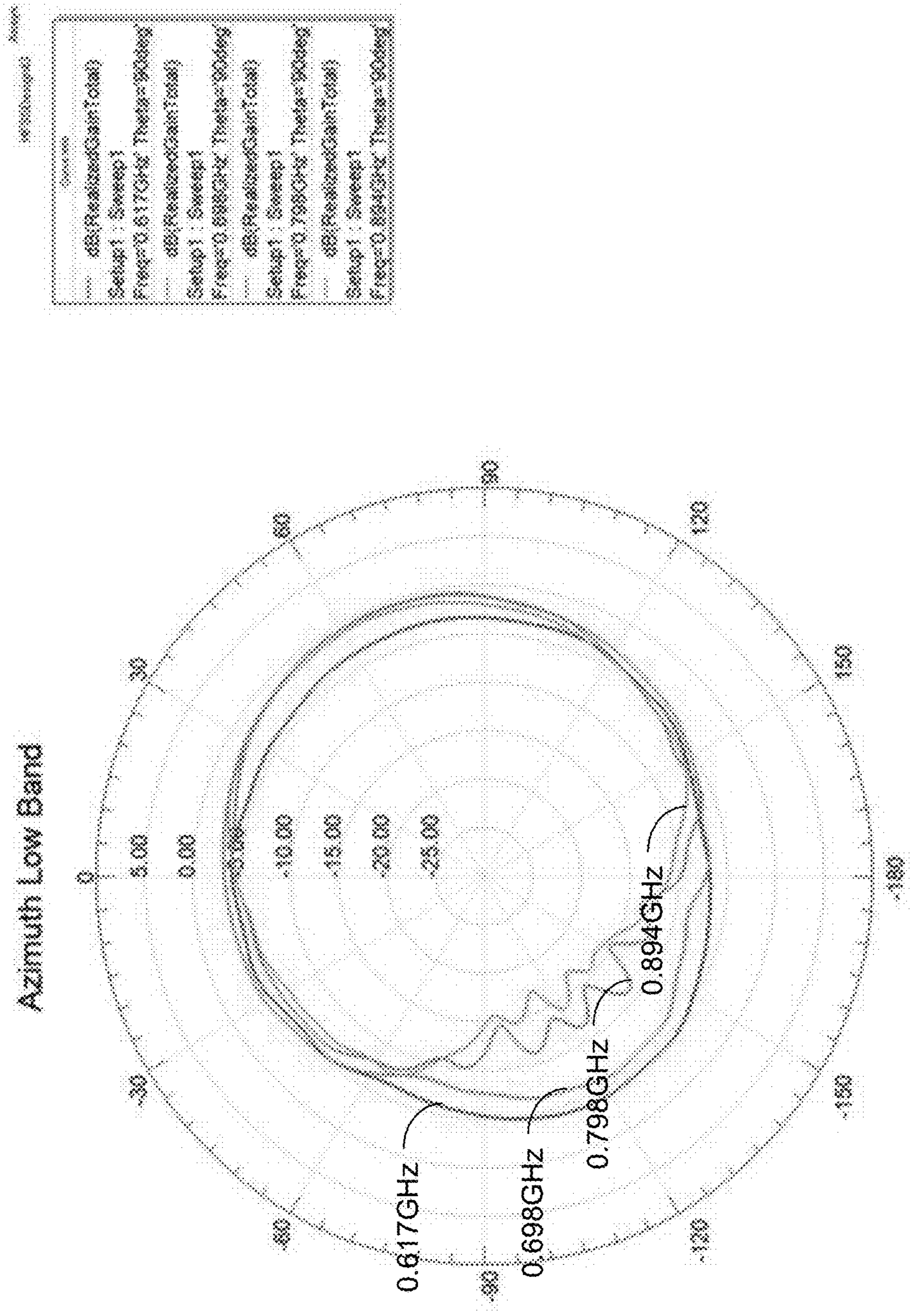
FIGS. 12A-12I illustrate representative radiation patterns for a plurality of antennas, in accordance with some aspects of this disclosure.
Figure 12B:
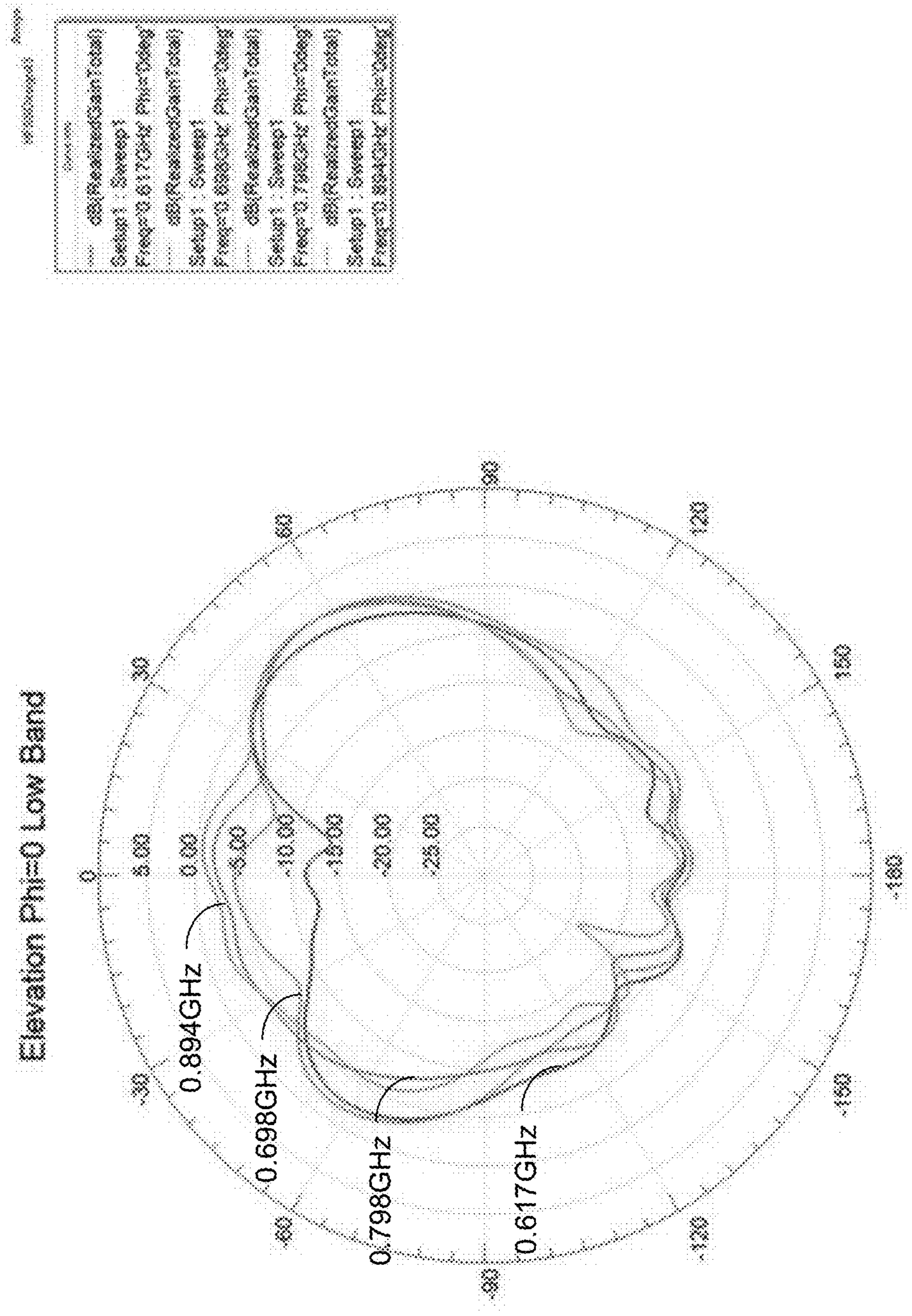
Figure 12C:
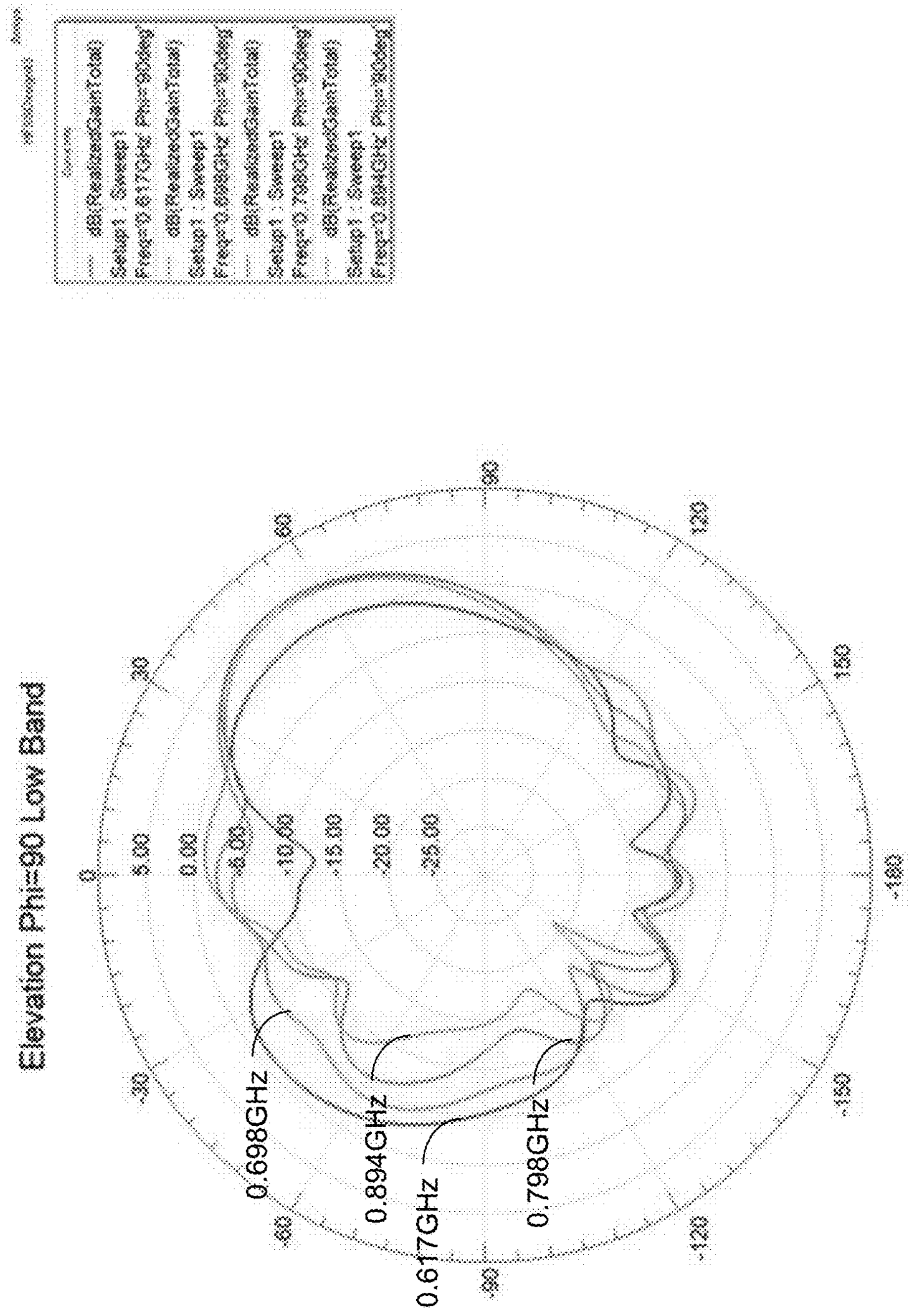

FIGS. 12A-12I illustrate representative radiation patterns for a plurality of antennas (e.g., antenna elements of the multi-element multi-band antenna 102 in FIGS. 2A and 2B). FIGS. 12A-12C illustrate at least one of the antennas producing radiation patterns across a low frequency band oriented at an angle (e.g., 0-degrees). In some examples, the remaining antennas can have the same or similar radiation patterns, oriented at different angles (e.g., 90-degrees, 180-degrees, 270-degrees). The low frequency band can include frequencies between 0.617 gigahertz (GHz) and 0.894 GHz.

As shown in FIG. 12A, for example, the plurality of antennas can include a first set of antenna elements, a second set of antenna elements, or both the first set and the second set. In this example, the first set of antenna elements can include a set of multiple-input multiple-output (MIMO) antennas. In some examples, the first set of antenna elements can produce radio frequency signals for a first radio frequency carrier. The second set of antenna elements can include another set of MIMO antennas. In some examples, the second set of antenna elements can produce radio frequency signals for a second radio frequency carrier. In some examples, the radiation patterns can include an azimuth radiation pattern and an elevation radiation pattern. For example, the azimuth radiation pattern can include measured transmitting characteristics of the first set of antennas across the low frequency band. In this example, the azimuth radiation pattern can include transmitting characteristics at a theta of 90-degrees. The azimuth radiation pattern can be a graphical depiction of the performance of the first set of antennas across the low frequency band. In some examples, the azimuth radiation pattern of the first set of antennas across the low frequency band can include a measurement of a realized gain above −10 decibels with respect to an isotropic radiator (dBi). In this manner, the first set of antennas operating simultaneously can achieve the realized gain above −10 dBi.

As shown in FIGS. 12B and 12C, for example, the plurality of antennas can include the first set, the second set of antenna elements, or both the first set and the second set of antenna elements. In some examples, the radiation patterns can include an elevation radiation pattern. The elevation radiation patterns disclosed herein are made in individual coordinate systems for each antenna. The elevation radiation pattern can include measured transmitting characteristics of the first set of antennas across the low frequency band. In this example, the elevation radiation pattern can include transmitting characteristics at a phi of 0-degrees (e.g., in FIG. 12B) and 90-degrees (e.g., in FIG. 12C). The elevation radiation pattern can be a graphical depiction of the performance of the first set of antennas across the low frequency band. In some examples, the elevation radiation pattern of the first set of antennas across the low frequency band can include a measurement of a realized gain above −15 dBi. In this manner, the first set of antennas operating simultaneously can achieve the realized gain above −15 dBi.

Figure 12D:
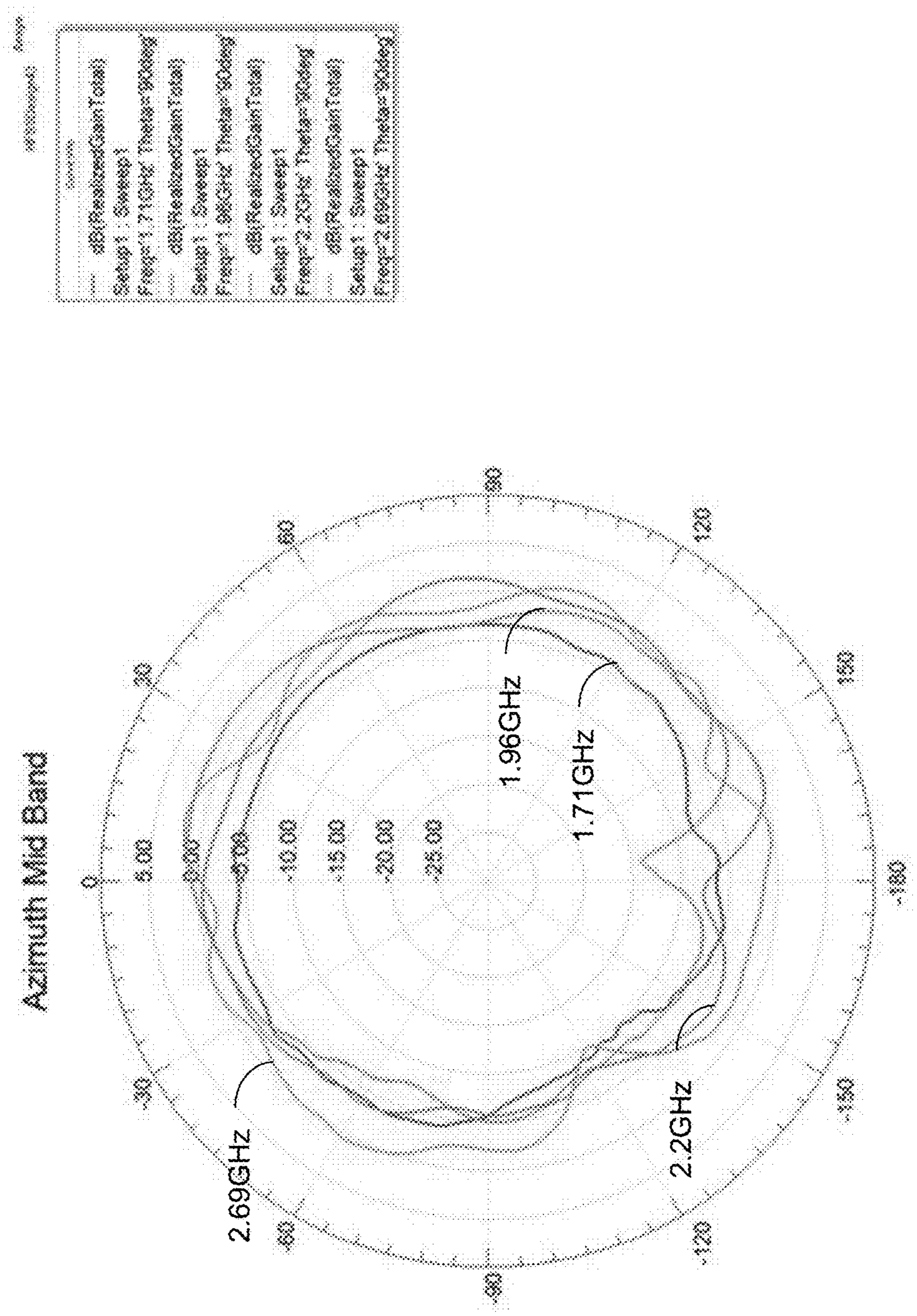
Figure 12E:
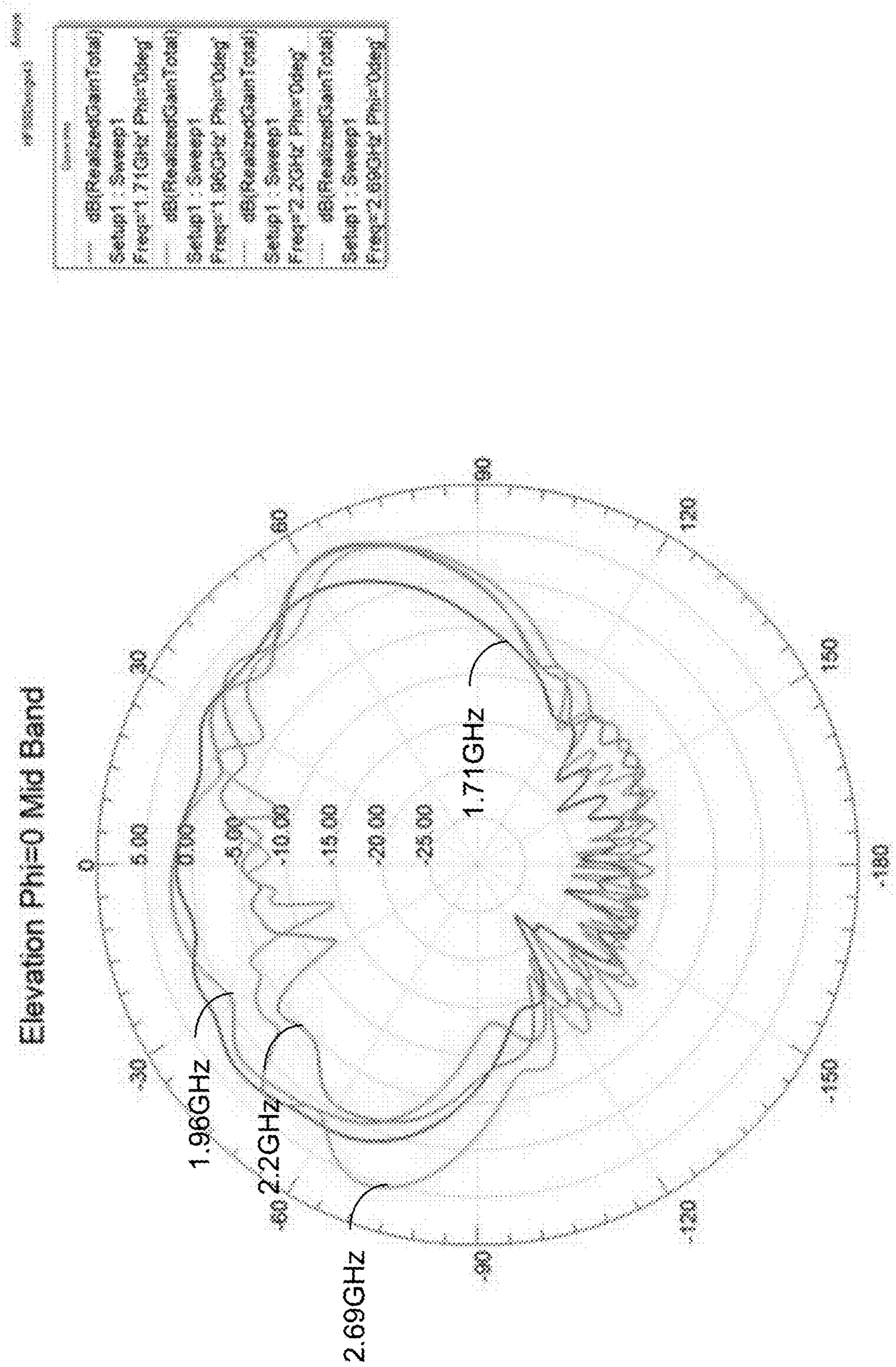
Figure 12F:
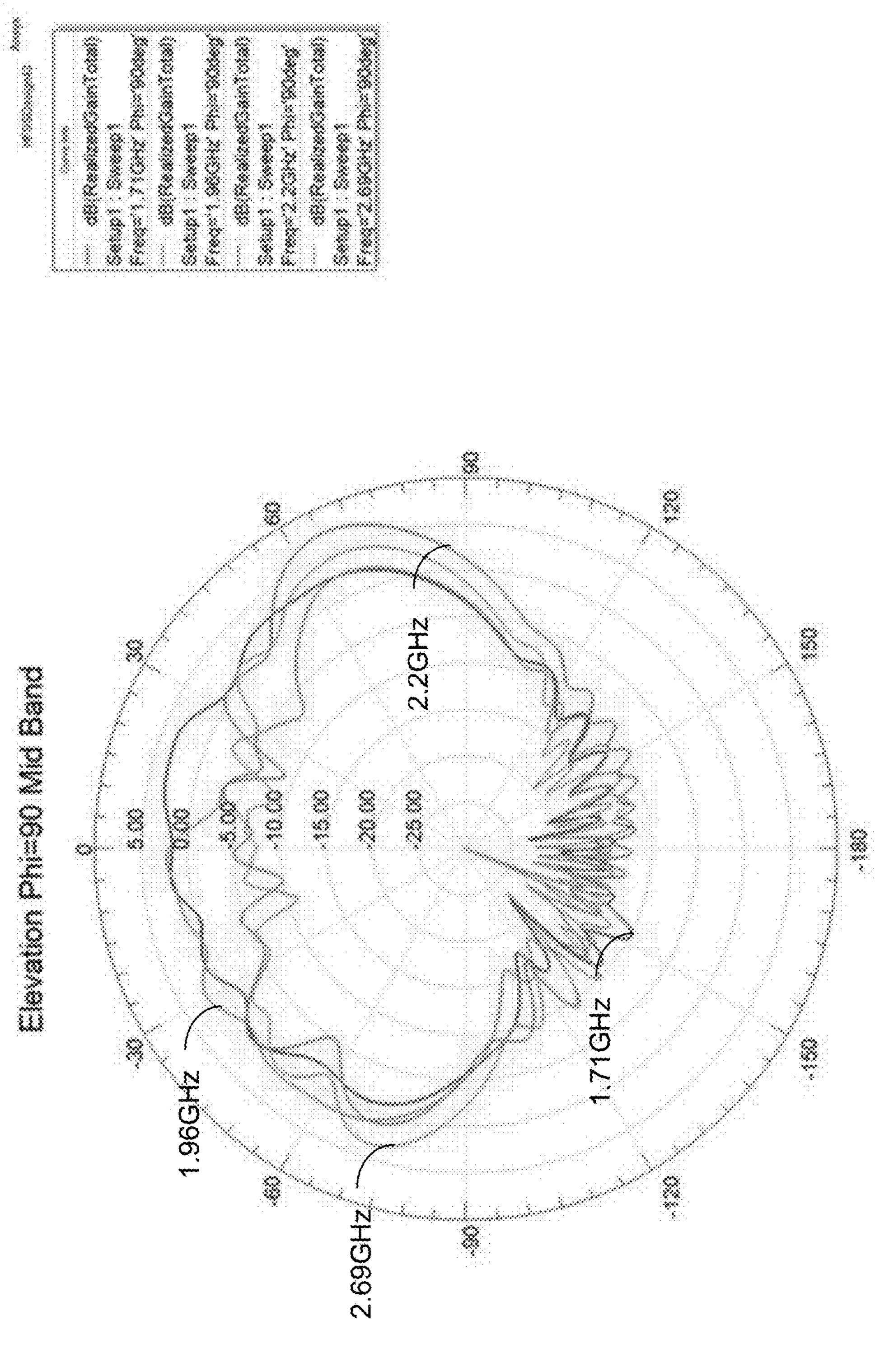

FIGS. 12D-12F illustrate at least one of the antennas producing radiation patterns across a mid frequency band oriented at an angle (e.g., 0-degrees). In some examples, the remaining antennas can have the same or similar radiation patterns, oriented at a different angle. The mid frequency band can include frequencies between 1.71 GHz and 2.69 GHz. As shown in FIG. 12D, for example, the plurality of antennas can include the first set of antenna elements, the second set of antenna elements, or both the first set and the second set. In some examples, the radiation patterns can include an azimuth radiation pattern and an elevation radiation pattern. For example, the azimuth radiation pattern can include measured transmitting characteristics of the first set of antennas across the mid frequency band. In this example, the azimuth radiation pattern can include transmitting characteristics at a theta of 90-degrees. The azimuth radiation pattern can be a graphical depiction of the performance of the first set of antennas across the mid frequency band. In some examples, the azimuth radiation pattern of the first set of antennas across the mid frequency band can include a measurement of a realized gain above −10 dBi. In this manner, the first set of antennas operating simultaneously can achieve the realized gain above −10 dBi.

As shown in FIGS. 12E and 12F, for example, the plurality of antennas can include the first set, the second set of antenna elements, or both the first set and the second set of antenna elements. In some examples, the radiation patterns can include an elevation radiation pattern. The elevation radiation patterns disclosed herein are made in individual coordinate systems for each antenna. The elevation radiation pattern can include measured transmitting characteristics of the first set of antennas across the mid frequency band. In this example, the elevation radiation pattern can include transmitting characteristics at a phi of 0-degrees (e.g., in FIG. 12E) and 90-degrees (e.g., in FIG. 12F). The elevation radiation pattern can be a graphical depiction of the performance of the first set of antennas across the mid frequency band. In some examples, the elevation radiation pattern of the first set of antennas across the mid frequency band can include a measurement of a realized gain above −15 dBi. In this manner, the first set of antennas operating simultaneously can achieve the realized gain above −15 dBi.

Figure 12G:
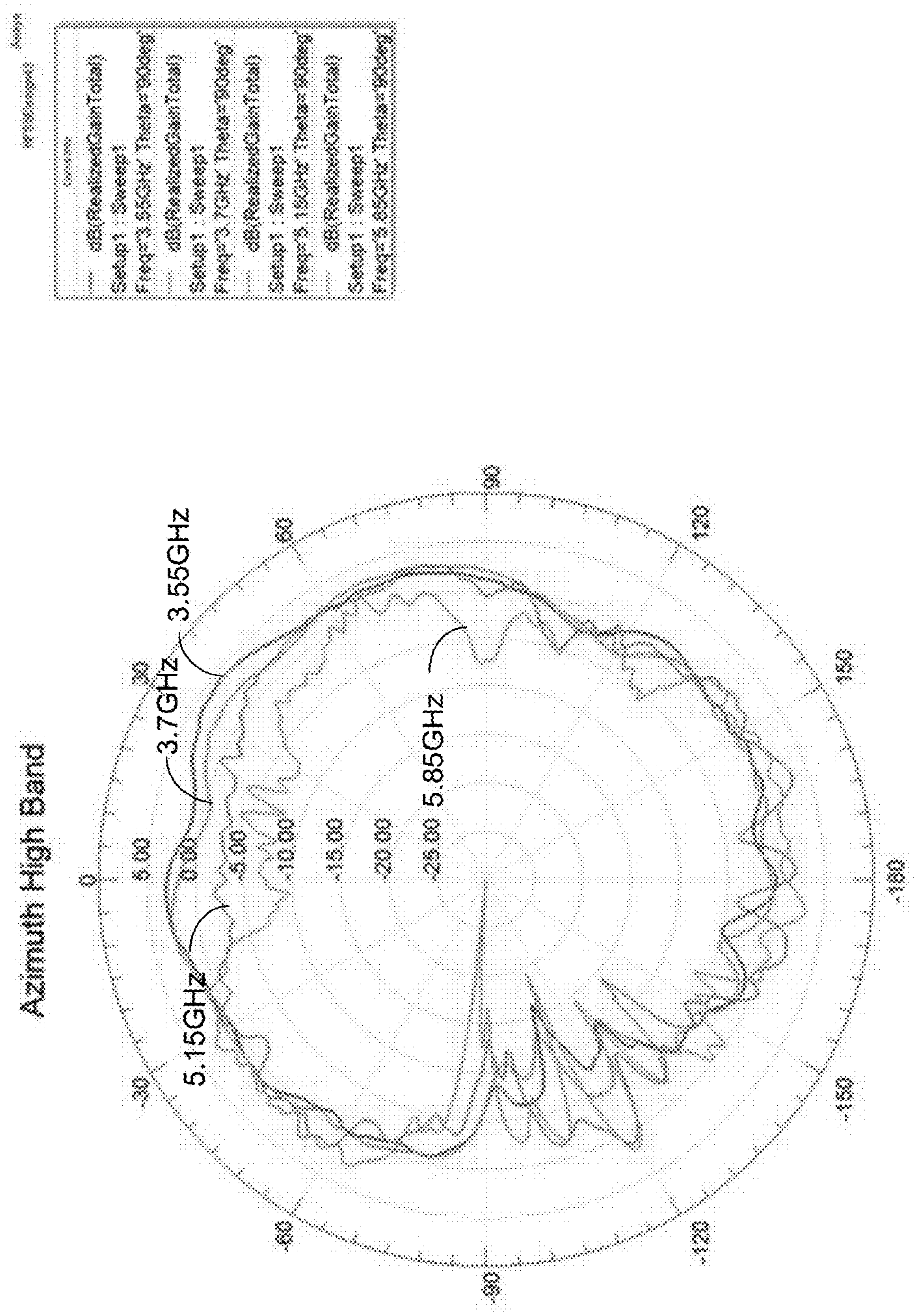
Figure 12H:
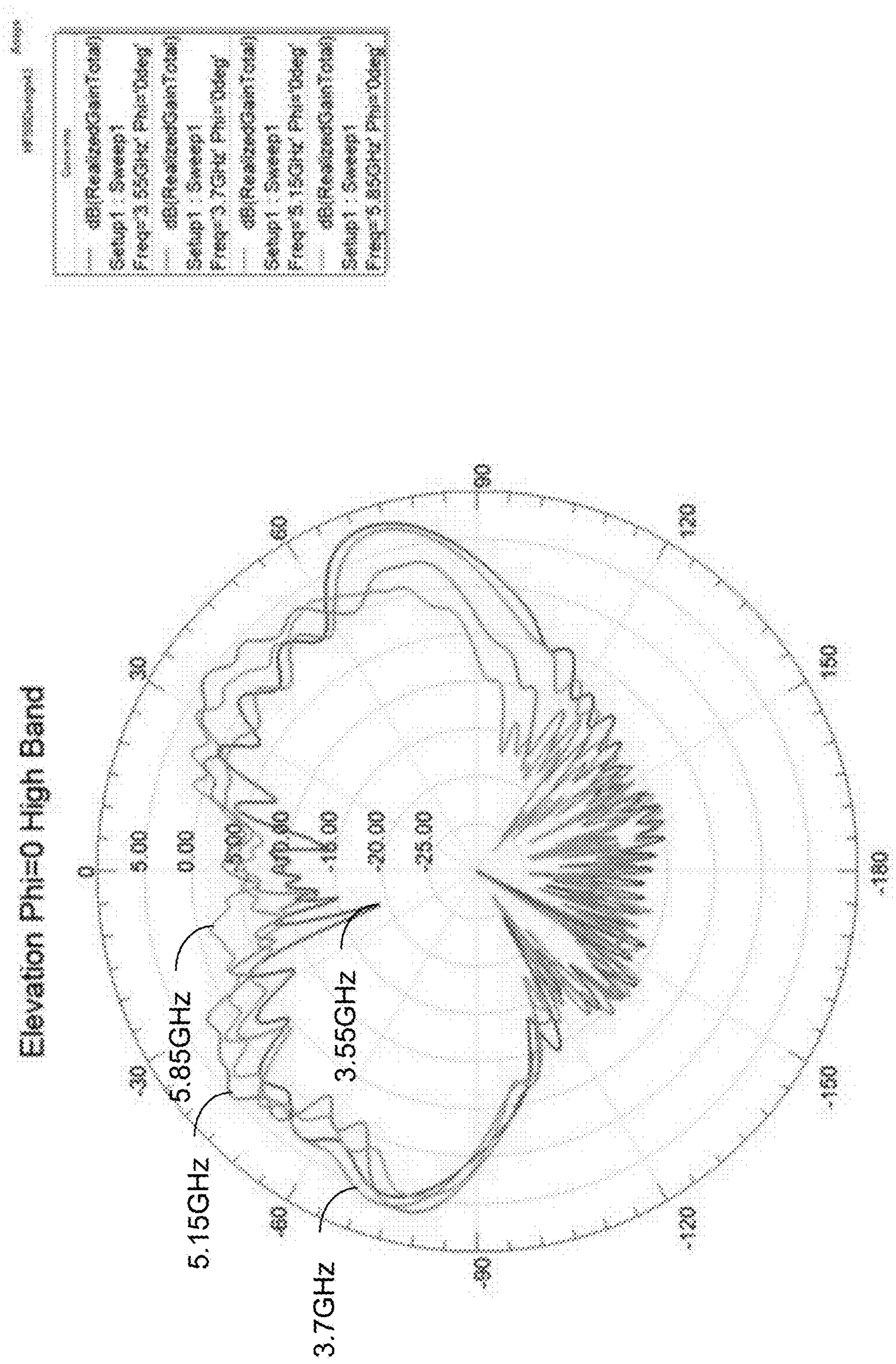
Figure 12I:
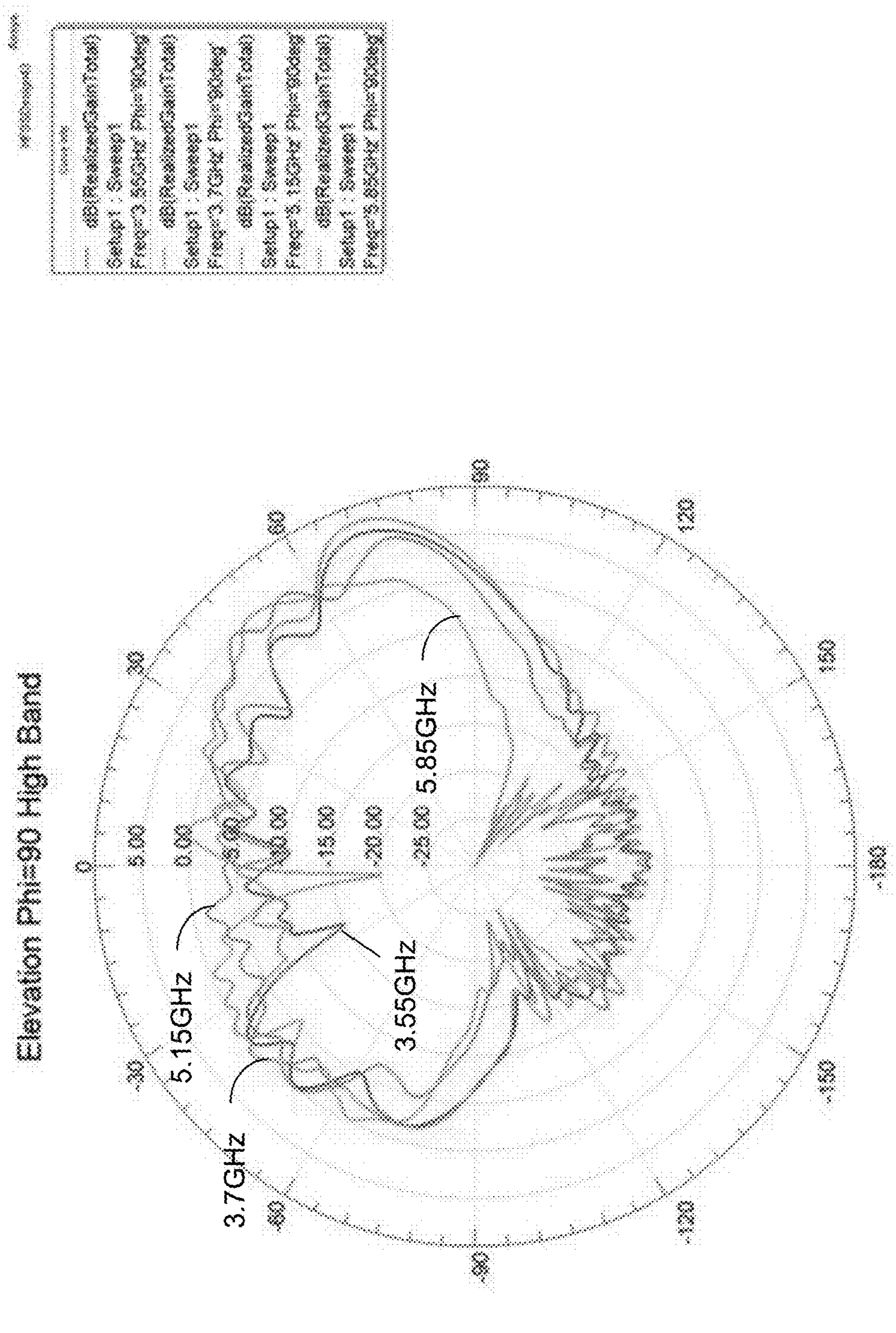

FIGS. 12G-12I illustrate at least one of the antennas producing radiation patterns across a high frequency band oriented at oriented at an angle (e.g., 0-degrees). In some examples, the remaining antennas can have the same or similar radiation patterns, oriented at a different angle. The high frequency band can include frequencies between 3.55 GHz and 5.85 GHz. As shown in FIG. 12G, for example, the plurality of antennas can include the first set of antenna elements, the second set of antenna elements, or both the first set and the second set. In some examples, the radiation patterns can include an azimuth radiation pattern and an elevation radiation pattern. For example, the azimuth radiation pattern can include measured transmitting characteristics of the first set of antennas across the high frequency band. In this example, the azimuth radiation pattern can include transmitting characteristics at a theta of 90-degrees. The azimuth radiation pattern can be a graphical depiction of the performance of the first set of antennas across the high frequency band. In some examples, the azimuth radiation pattern of the first set of antennas across the high frequency band can include a measurement of a realized gain above −10 dBi. In this manner, the first set of antennas operating simultaneously can achieve the realized gain above −10 dBi.

As shown in FIGS. 12H and 12I, for example, the plurality of antennas can include the first set, the second set of antenna elements, or both the first set and the second set of antenna elements. In some examples, the radiation patterns can include an elevation radiation pattern. The elevation radiation patterns disclosed herein are made in individual coordinate systems for each antenna. The elevation radiation pattern can include measured transmitting characteristics of the first set of antennas across the high frequency band. In this example, the elevation radiation pattern can include transmitting characteristics at a phi of 0-degrees (e.g., in FIG. 12H) and 90-degrees (e.g., in FIG. 12I). The elevation radiation pattern can be a graphical depiction of the performance of the first set of antennas across the high frequency band. In some examples, the elevation radiation pattern of the first set of antennas across the high frequency band can include a measurement of a realized gain above −15 dBi. In this manner, the first set of antennas operating simultaneously can achieve the realized gain above −15 dBi.

Figure 13A:
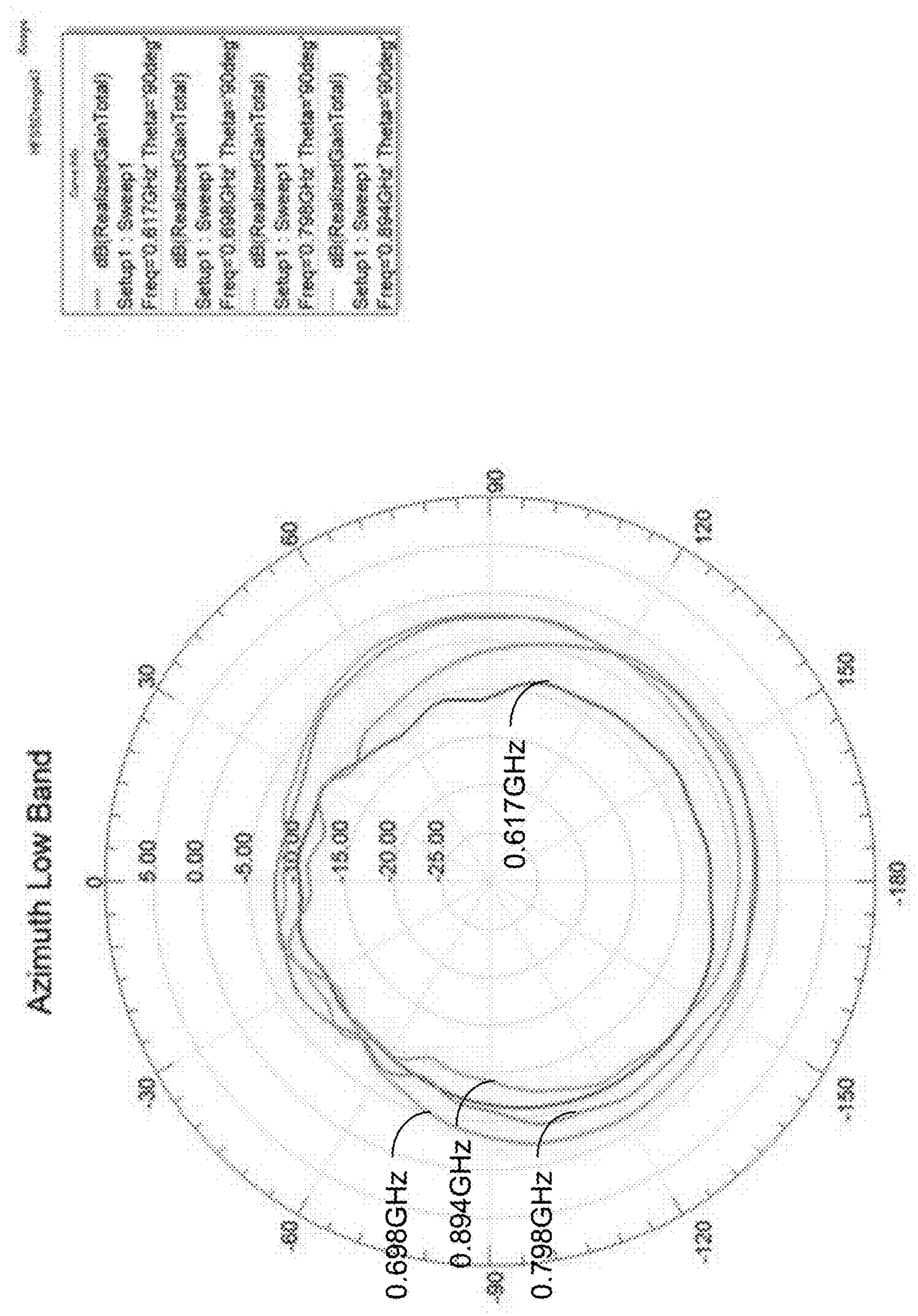
FIGS. 13A-13I illustrate representative radiation patterns for a plurality of antennas, in accordance with some aspects of this disclosure.
Figure 13B:
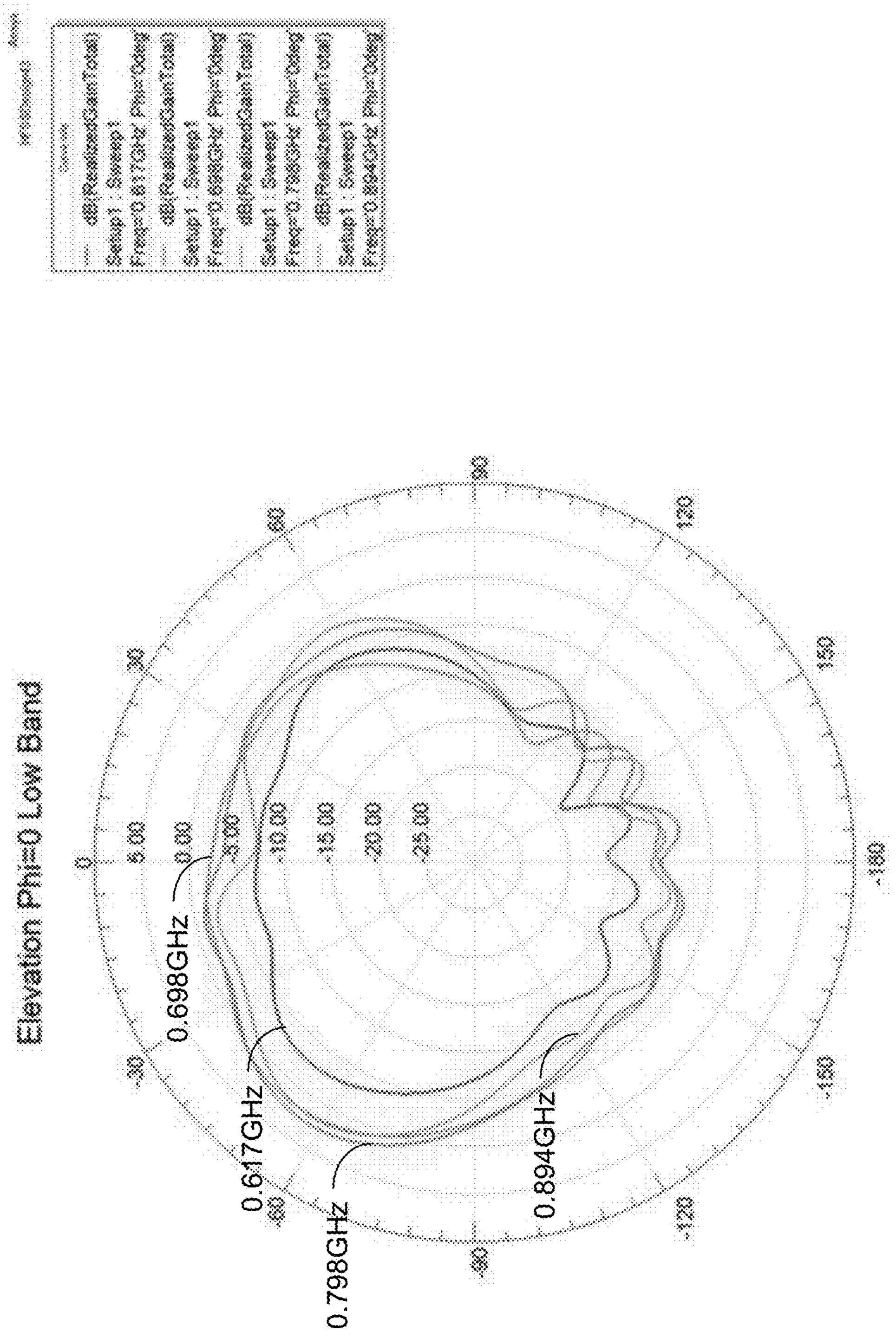
Figure 13C:
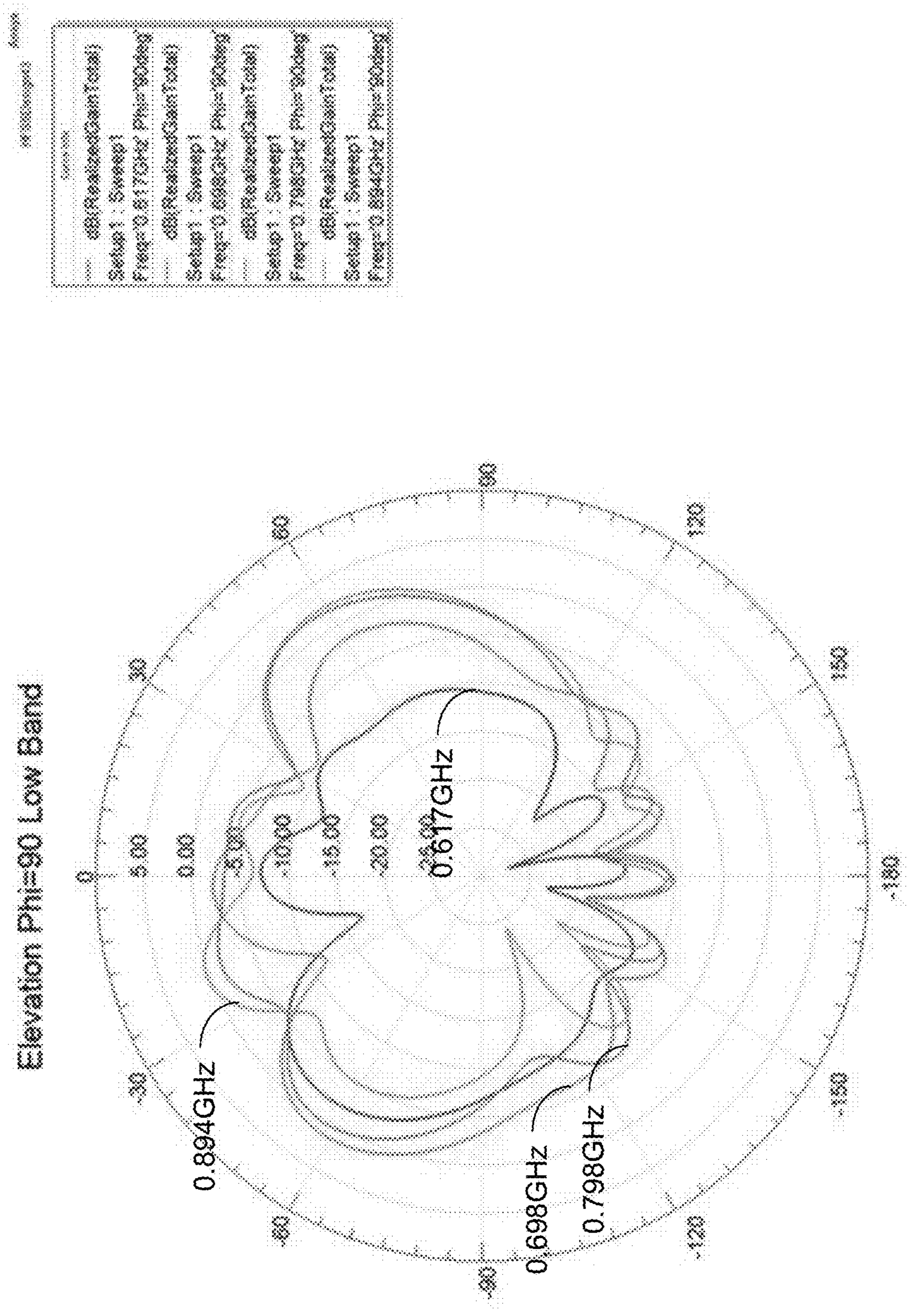

FIGS. 13A-13I illustrate representative radiation patterns for a plurality of antennas (e.g., antenna elements of the multi-element multi-band antenna 102 in FIGS. 2A and 2B). FIGS. 13A-13C illustrate the antenna elements producing radiation patterns across a low frequency band. The low frequency band can include frequencies between 0.617 GHz and 0.894 GHz.

As shown in FIG. 13A, for example, the plurality of antennas can include a first set of antenna elements, a second set of antenna elements, or both the first set and the second set. In this example, the first set of antenna elements can include a set of MIMO antennas. In some examples, the first set of antenna elements can produce radio frequency signals for a first radio frequency carrier. The second set of antenna elements can include another set of MIMO antennas. In some examples, the second set of antenna elements can produce radio frequency signals for a second radio frequency carrier. In some examples, the radiation patterns can include an azimuth radiation pattern and an elevation radiation pattern. For example, the azimuth radiation pattern can include measured transmitting characteristics of the second set of antennas across the low frequency band. In this example, the azimuth radiation pattern can include transmitting characteristics at a theta of 90-degrees. The azimuth radiation pattern can be a graphical depiction of the performance of the second set of antennas across the low frequency band. In some examples, the azimuth radiation pattern of the second set of antennas across the low frequency band can include a measurement of a realized gain above −10 dBi. In this manner, the second set of antennas operating simultaneously can achieve the realized gain above −10 dBi.

As shown in FIGS. 13B and 13C, for example, the plurality of antennas can include the first set, the second set of antenna elements, or both the first set and the second set of antenna elements. In some examples, the radiation patterns can include an elevation radiation pattern. The elevation radiation patterns disclosed herein are made in individual coordinate systems for each antenna. The elevation radiation pattern can include measured transmitting characteristics of the second set of antennas across the low frequency band. In this example, the elevation radiation pattern can include transmitting characteristics at a phi of 0-degrees (e.g., in FIG. 13B) and 90-degrees (e.g., in FIG. 13C). The elevation radiation pattern can be a graphical depiction of the performance of the second set of antennas across the low frequency band. In some examples, the elevation radiation pattern of the second set of antennas across the low frequency band can include a measurement of a realized gain above −15 dBi. In this manner, the second set of antennas operating simultaneously can achieve the realized gain above −15 dBi.

Figure 13D:
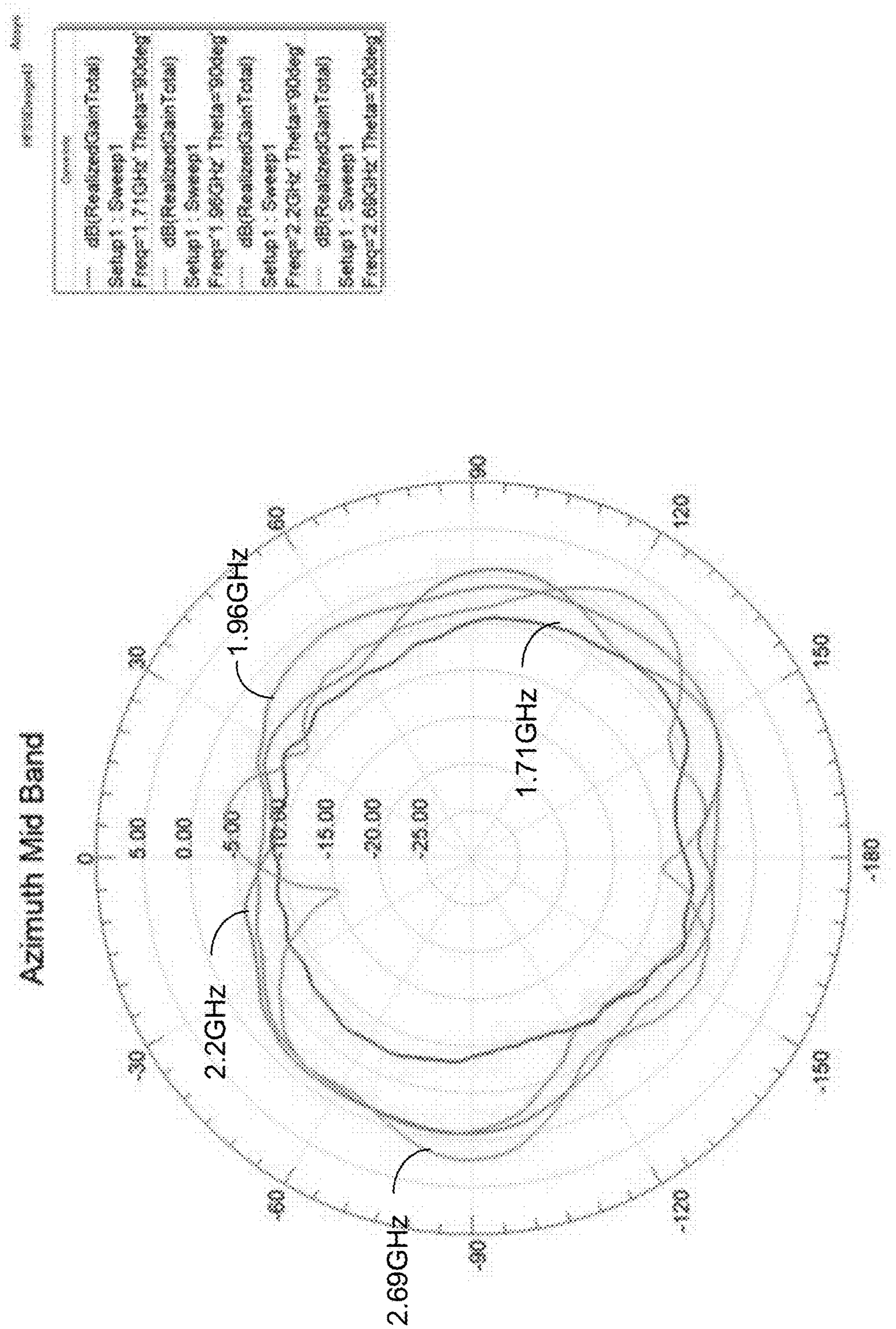
Figure 13E:
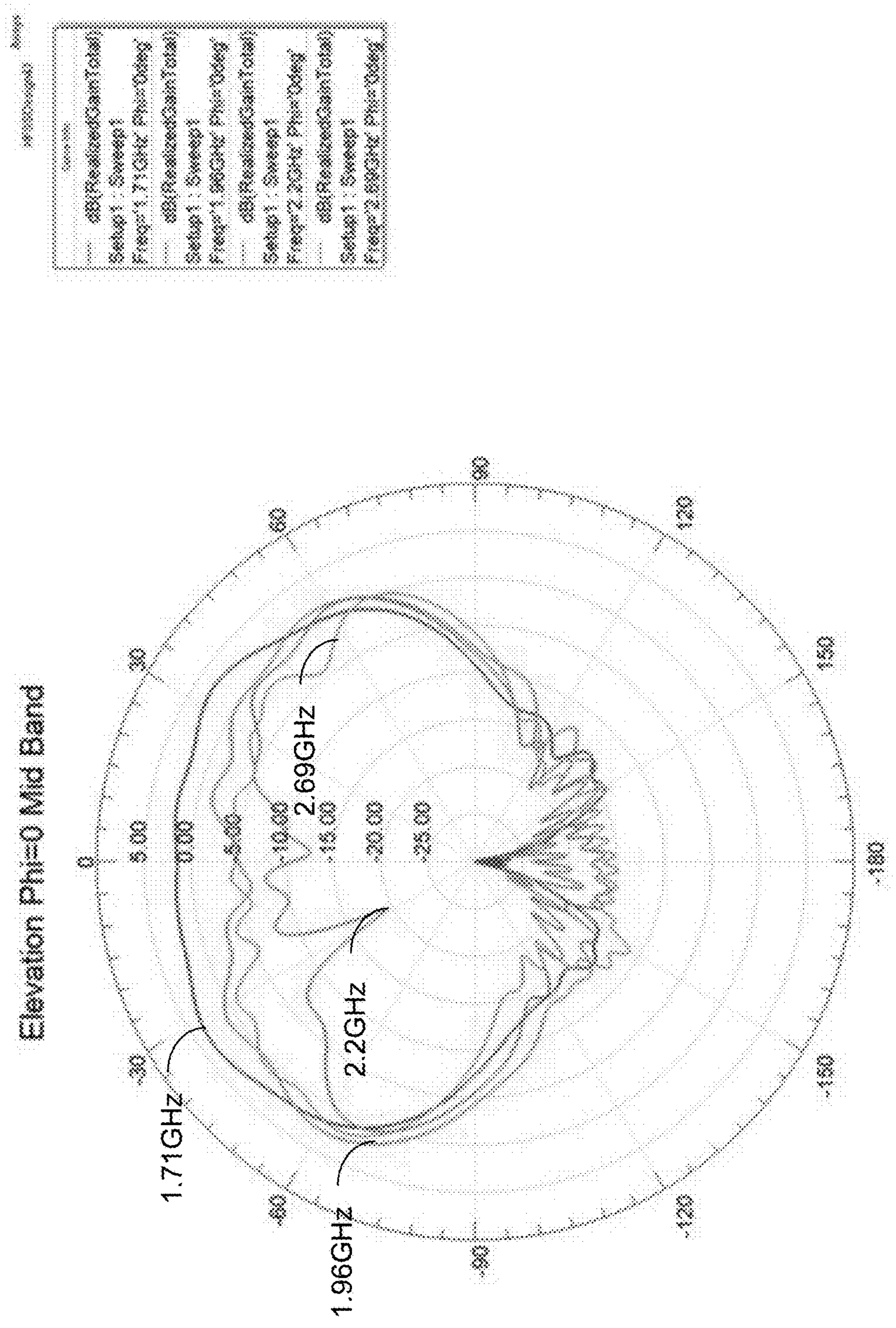
Figure 13F:
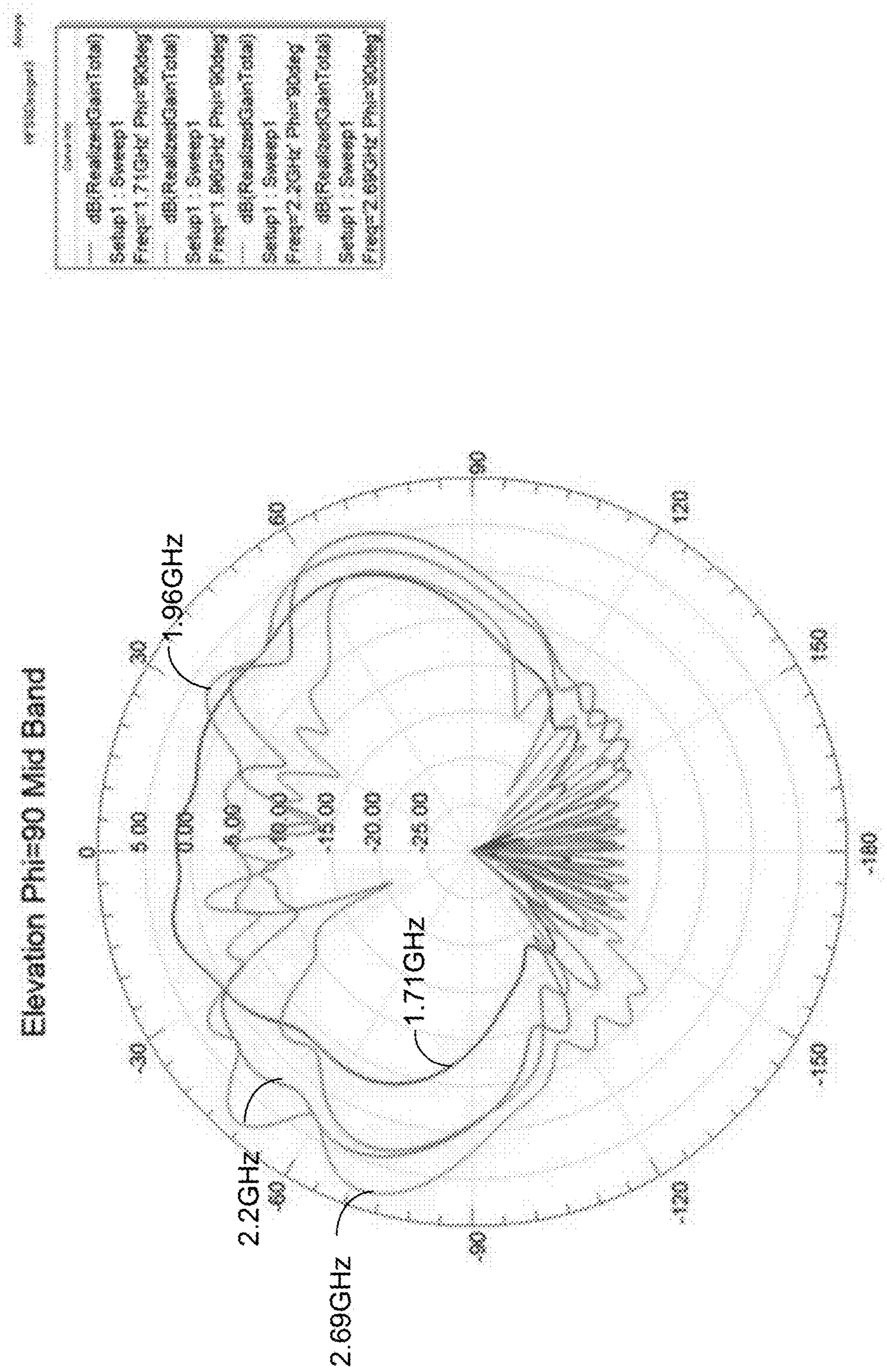

FIGS. 13D-13F illustrate the antenna elements producing radiation patterns across a mid frequency band. The mid frequency band can include frequencies between 1.71 GHz and 2.69 GHz. As shown in FIG. 13D, for example, the plurality of antennas can include the first set of antenna elements, the second set of antenna elements, or both the first set and the second set. In some examples, the radiation patterns can include an azimuth radiation pattern and an elevation radiation pattern. For example, the azimuth radiation pattern can include measured transmitting characteristics of the second set of antennas across the mid frequency band. In this example, the azimuth radiation pattern can include transmitting characteristics at a theta of 90-degrees. The azimuth radiation pattern can be a graphical depiction of the performance of the second set of antennas across the mid frequency band. In some examples, the azimuth radiation pattern of the second set of antennas across the mid frequency band can include a measurement of a realized gain above −10 dBi. In this manner, the second set of antennas operating simultaneously can achieve the realized gain above −10 dBi.

As shown in FIGS. 13E and 13F, for example, the plurality of antennas can include the first set, the second set of antenna elements, or both the first set and the second set of antenna elements. In some examples, the radiation patterns can include an elevation radiation pattern. The elevation radiation patterns disclosed herein are made in individual coordinate systems for each antenna. The elevation radiation pattern can include measured transmitting characteristics of the second set of antennas across the mid frequency band. In this example, the elevation radiation pattern can include transmitting characteristics at a phi of 0-degrees (e.g., in FIG. 13E) and 90-degrees (e.g., in FIG. 13F). The elevation radiation pattern can be a graphical depiction of the performance of the second set of antennas across the mid frequency band. In some examples, the elevation radiation pattern of the second set of antennas across the mid frequency band can include a measurement of a realized gain above −20 dBi. In this manner, the second set of antennas operating simultaneously can achieve the realized gain above −20 dBi.

Figure 13G:
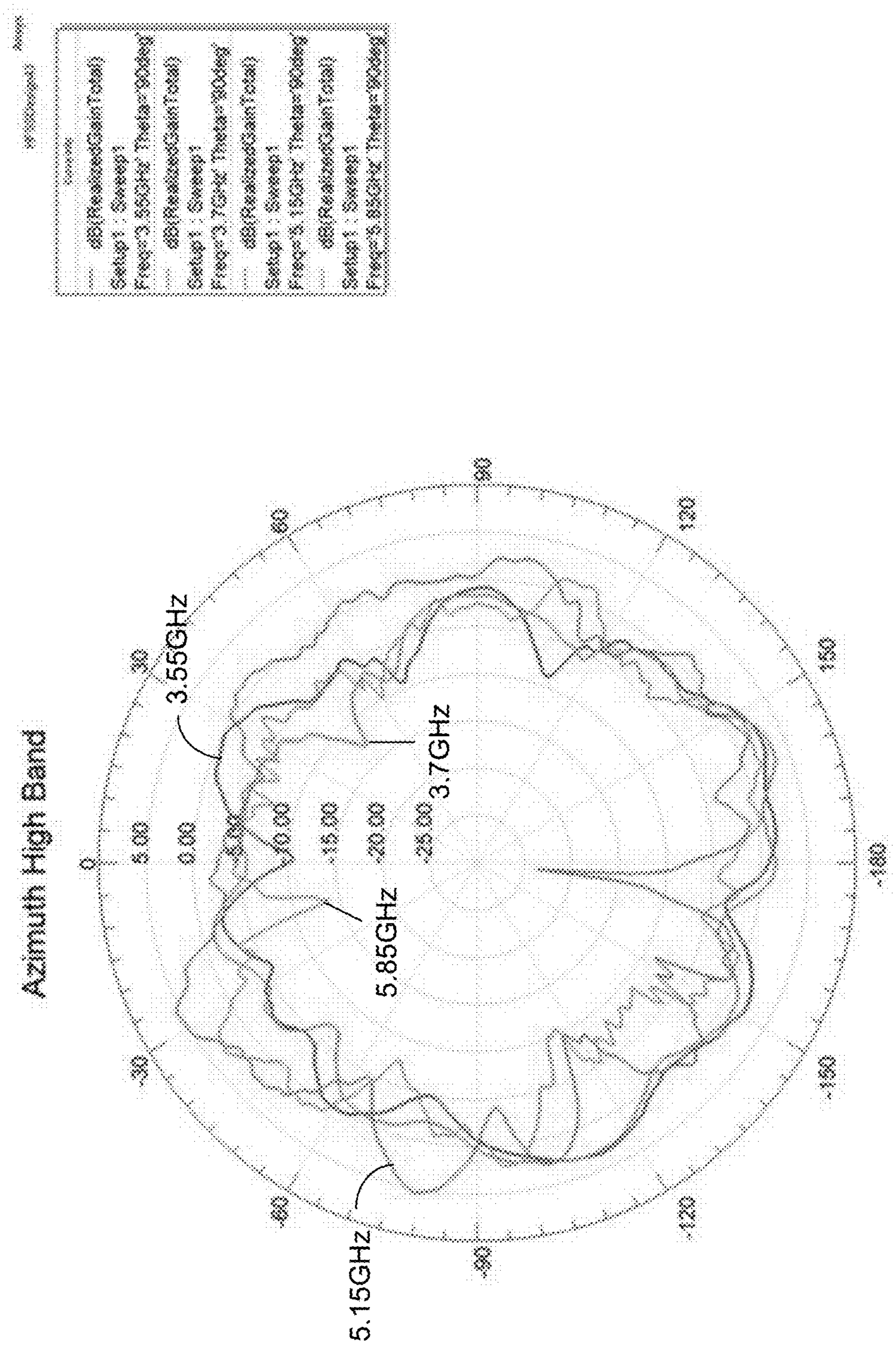
Figure 13H:
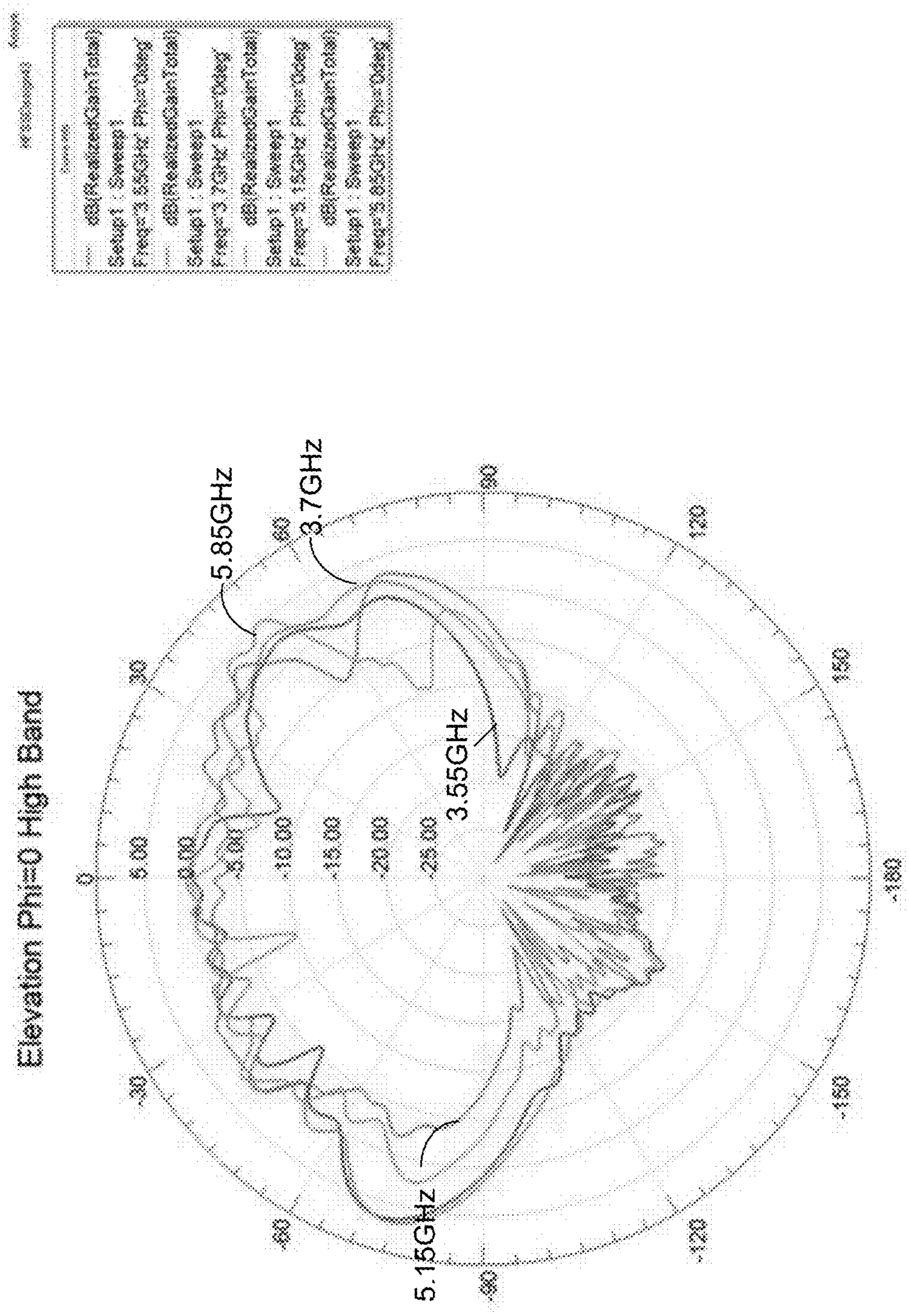
Figure 13I:
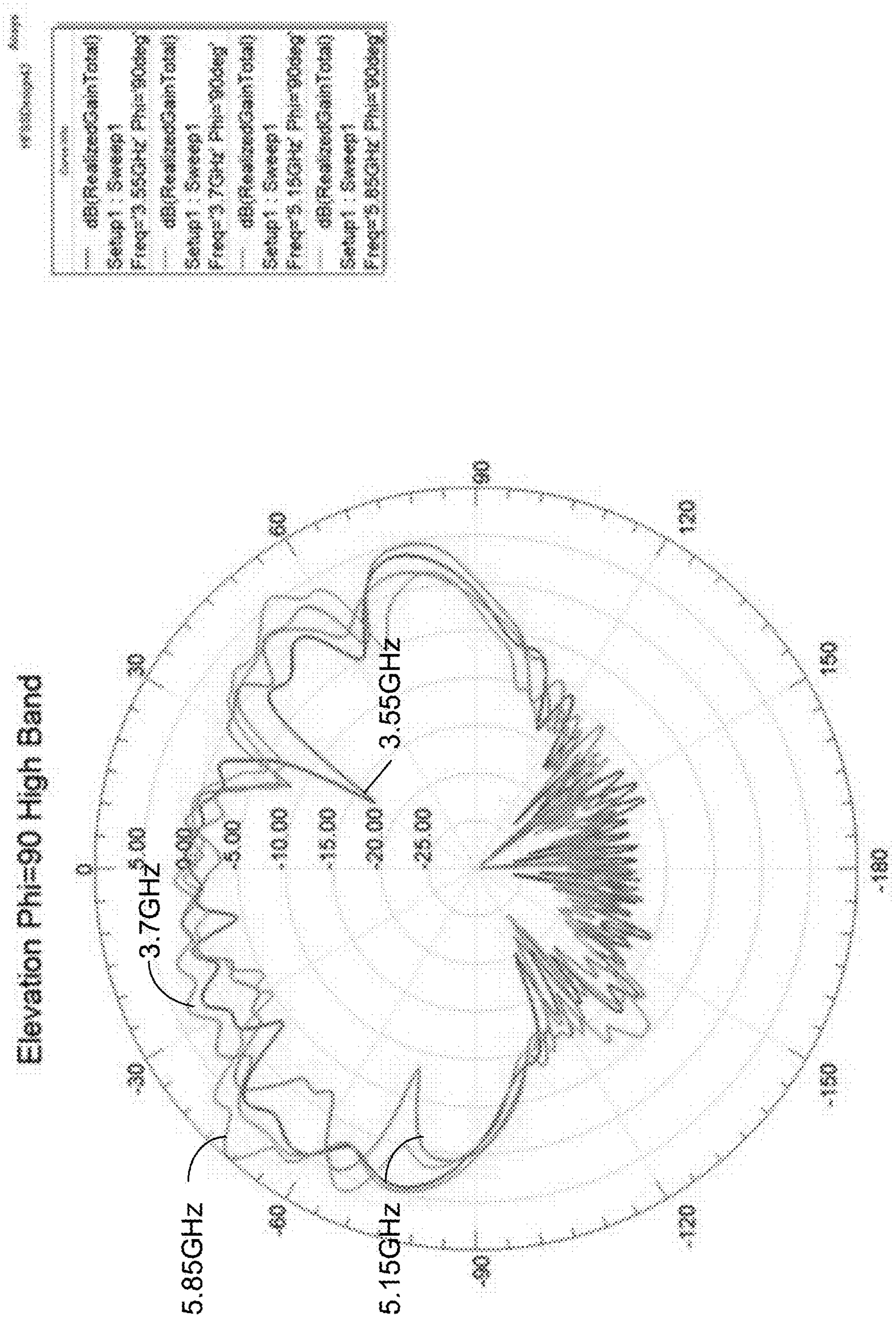

FIGS. 13G-13I illustrate the antenna elements producing radiation patterns across a high frequency band. The high frequency band can include frequencies between 3.55 GHz and 5.85 GHz. As shown in FIG. 13G, for example, the plurality of antennas can include the first set of antenna elements, the second set of antenna elements, or both the first set and the second set. In some examples, the radiation patterns can include an azimuth radiation pattern and an elevation radiation pattern. For example, the azimuth radiation pattern can include measured transmitting characteristics of the second set of antennas across the high frequency band. In this example, the azimuth radiation pattern can include transmitting characteristics at a theta of 90-degrees. The azimuth radiation pattern can be a graphical depiction of the performance of the second set of antennas across the high frequency band. In some examples, the azimuth radiation pattern of the second set of antennas across the high frequency band can include a measurement of a realized gain above −5 dBi. In this manner, the second set of antennas operating simultaneously can achieve the realized gain above −5 dBi.

As shown in FIGS. 13H and 13I, for example, the plurality of antennas can include the first set, the second set of antenna elements, or both the first set and the second set of antenna elements. In some examples, the radiation patterns can include an elevation radiation pattern. The elevation radiation patterns disclosed herein are made in individual coordinate systems for each antenna. The elevation radiation pattern can include measured transmitting characteristics of the second set of antennas across the high frequency band. In this example, the elevation radiation pattern can include transmitting characteristics at a phi of 0-degrees (e.g., in FIG. 13H) and 90-degrees (e.g., in FIG. 13I). The elevation radiation pattern can be a graphical depiction of the performance of the second set of antennas across the high frequency band. In some examples, the elevation radiation pattern of the second set of antennas across the high frequency band can include a measurement of a realized gain above −15 dBi. In this manner, the second set of antennas operating simultaneously can achieve the realized gain above −15 dBi.

Figure 14A:
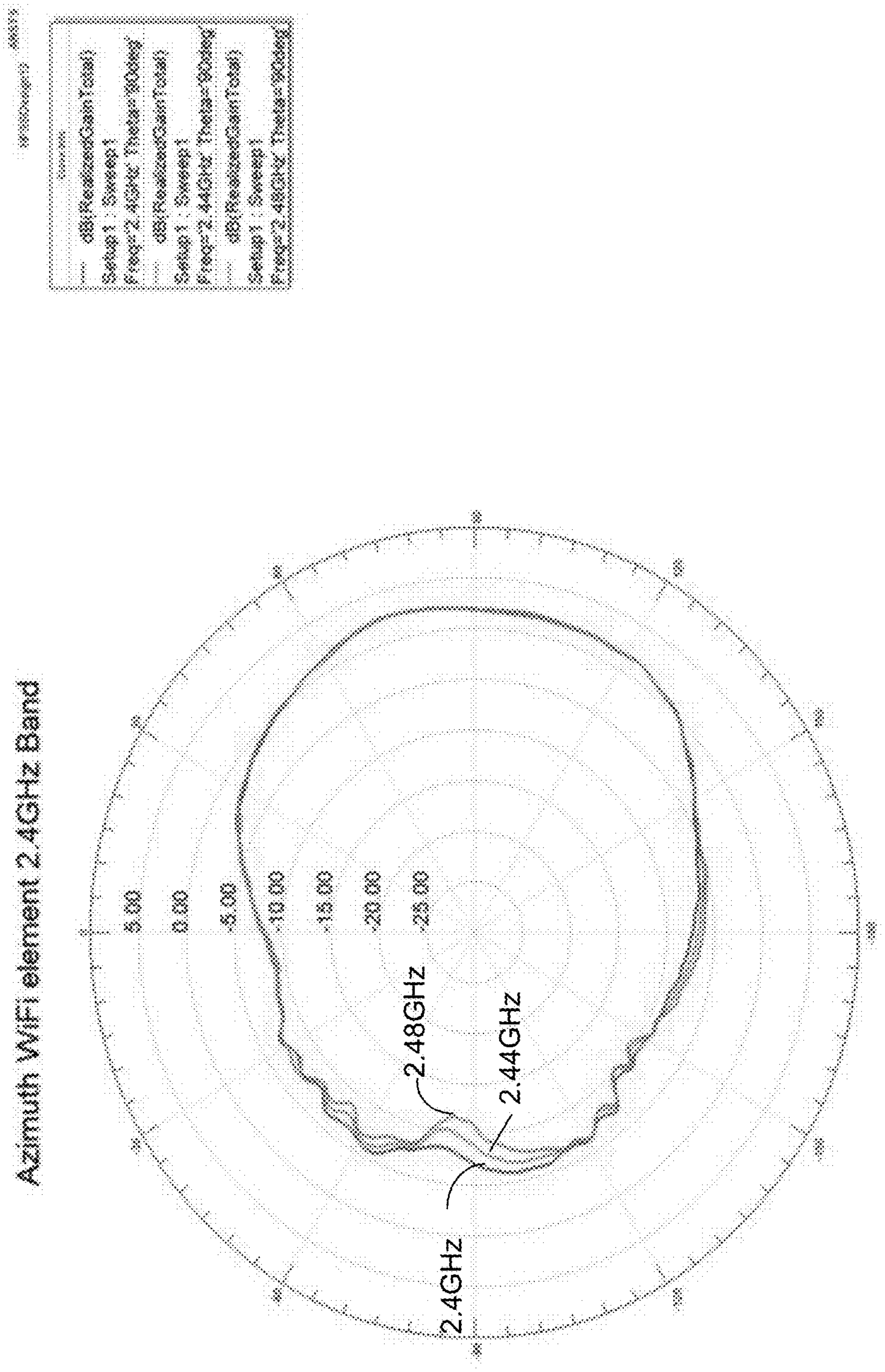
FIGS. 14A-14C illustrate representative radiation patterns for a plurality of antennas, in accordance with some aspects of this disclosure.
Figure 14B:
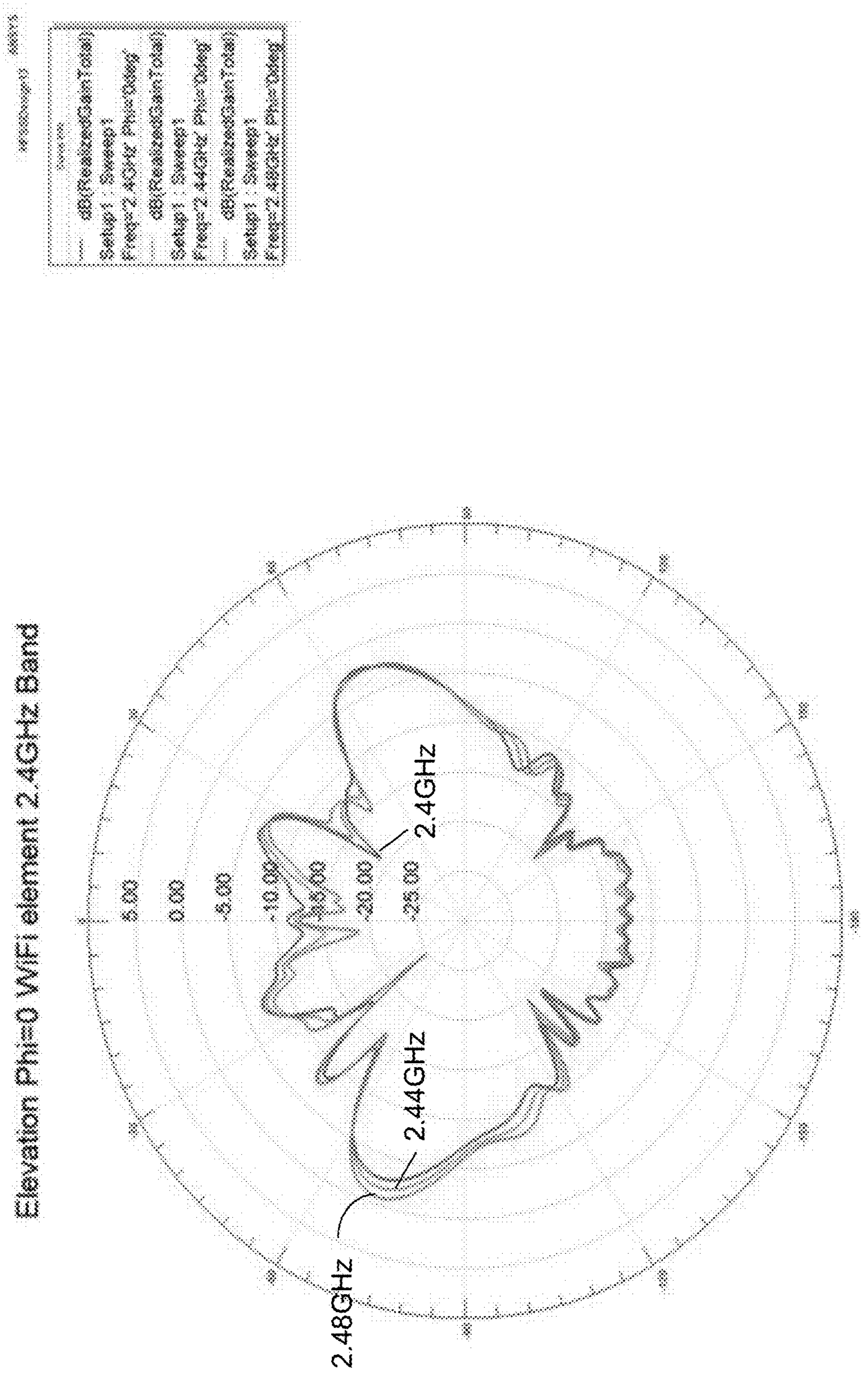
Figure 14C:
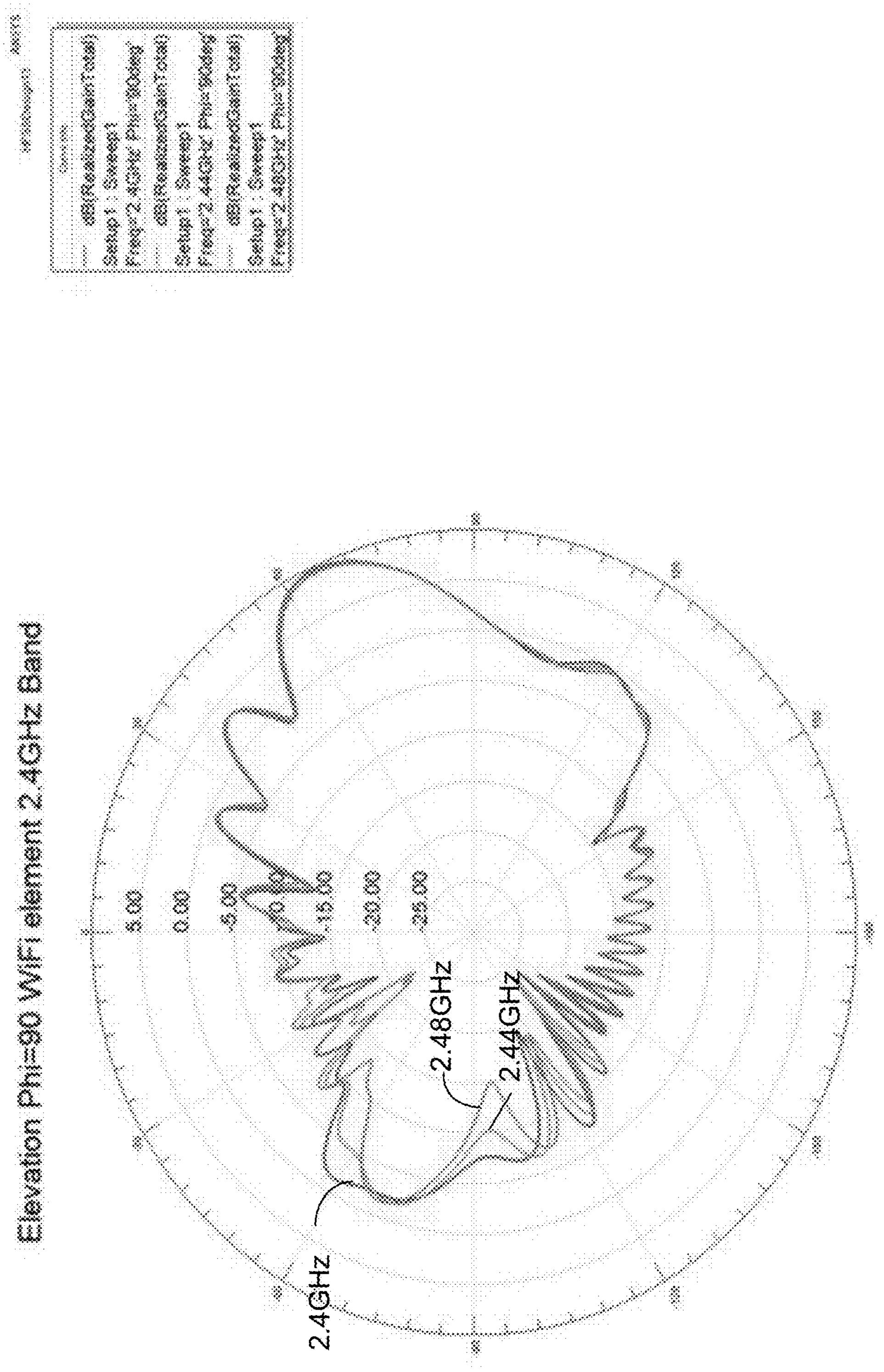

FIGS. 14A-14C illustrate radiation patterns for a plurality of antennas (e.g., antenna elements of the WiFi radiator portions 121 in FIGS. 2A and 2B). FIGS. 14A-14C illustrate the antenna elements producing radiation patterns across a low frequency WiFi band. The low frequency WiFi band can include frequencies between 2.4 GHz and 2.48 GHz.

As shown in FIG. 14A, for example, the plurality of antennas can include a set of WiFi antennas. In some examples, the radiation patterns can include an azimuth radiation pattern and an elevation radiation pattern. For example, the azimuth radiation pattern can include measured transmitting characteristics of the set of WiFi antennas across the low frequency WiFi band. In this example, the azimuth radiation pattern can include transmitting characteristics at a theta of 90-degrees. The azimuth radiation pattern can be a graphical depiction of the performance of the set of WiFi antennas across the low frequency WiFi band. In some examples, the azimuth radiation pattern of the set of WiFi antennas across the low frequency WiFi band can include a measurement of a realized gain above −10 dBi. In this manner, the set of WiFi antennas operating simultaneously can achieve the realized gain above −10 dBi.

As shown in FIGS. 14B and 14C, for example, the plurality of antennas can include the set of WiFi antennas. In some examples, the radiation patterns can include an elevation radiation pattern. The elevation radiation patterns disclosed herein are made in individual coordinate systems for each antenna. The elevation radiation pattern can include measured transmitting characteristics of the set of WiFi antennas across the low frequency WiFi band. In this example, the elevation radiation pattern can include transmitting characteristics at a phi of 0-degrees (e.g., in FIG. 14B) and 90-degrees (e.g., in FIG. 14C). The elevation radiation pattern can be a graphical depiction of the performance of the set of WiFi antennas across the low frequency WiFi band. In some examples, the elevation radiation pattern of the set of WiFi antennas across the low frequency WiFi band can include a measurement of a realized gain above −15 dBi. In this manner, the set of WiFi antennas operating simultaneously can achieve the realized gain above −15 dBi.

Figure 15A:
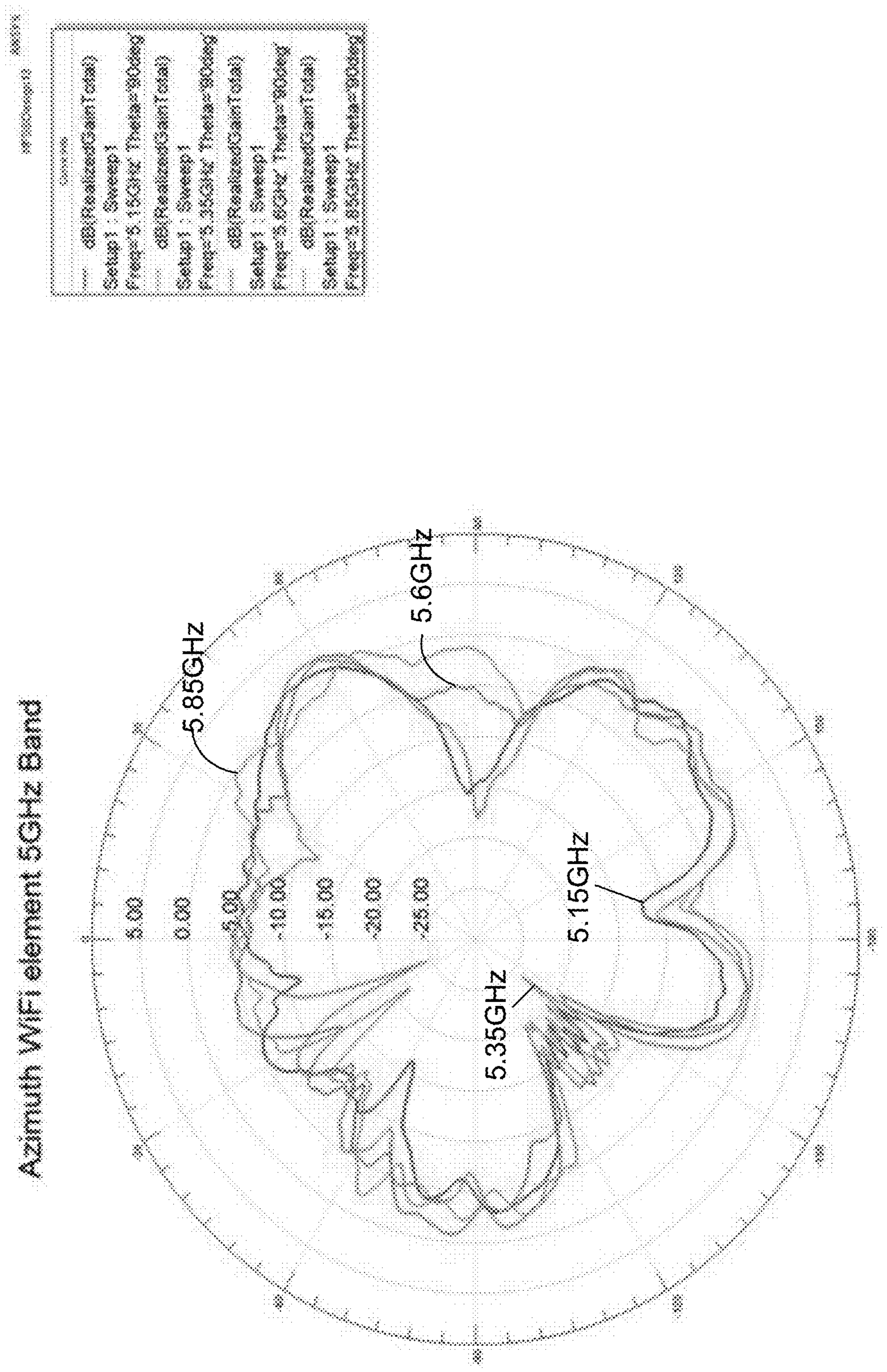
FIGS. 15A-15C illustrate representative radiation patterns for a plurality of antennas, in accordance with some aspects of this disclosure.
Figure 15B:
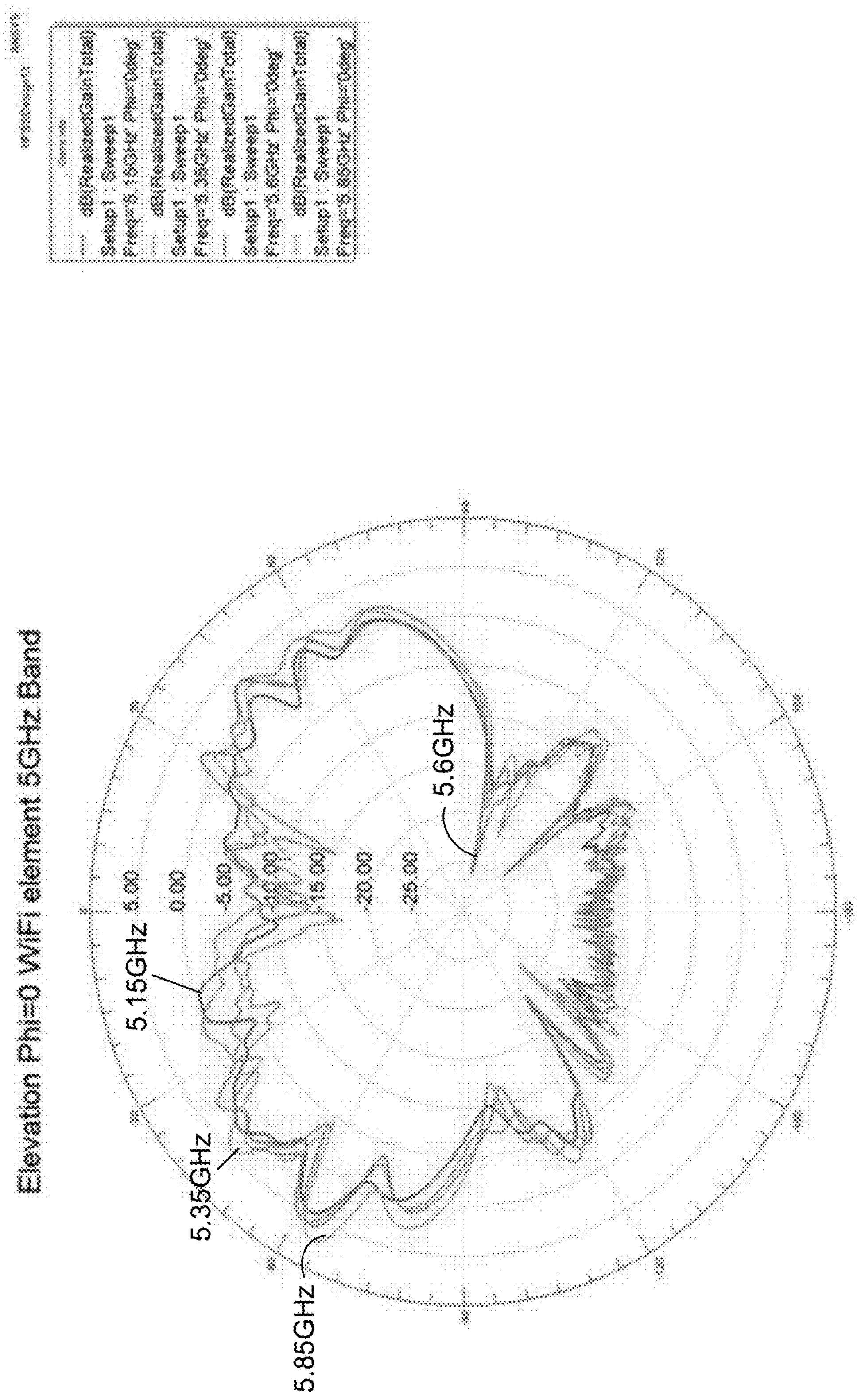
Figure 15C:
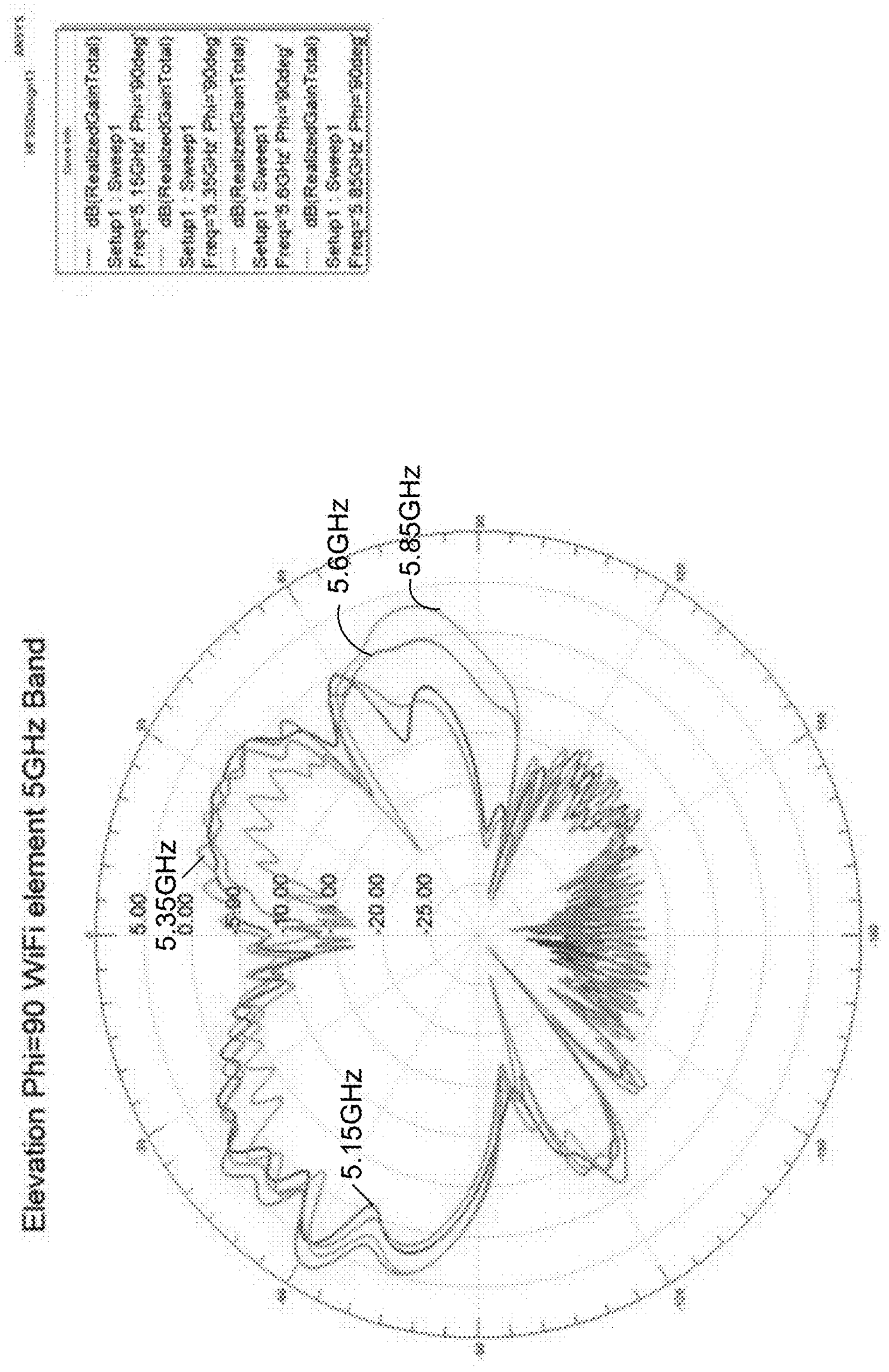

FIGS. 15A-15C illustrate radiation patterns for a plurality of antennas (e.g., antenna elements of the WiFi radiator portions 121 in FIGS. 2A and 2B). FIGS. 15A-15C illustrate the antenna elements producing radiation patterns across a high frequency WiFi band. The high frequency WiFi band can include frequencies between 5.15 GHz and 5.85 GHz.

As shown in FIG. 15A, for example, the plurality of antennas can include a set of WiFi antennas. In some examples, the radiation patterns can include an azimuth radiation pattern and an elevation radiation pattern. For example, the azimuth radiation pattern can include measured transmitting characteristics of the set of WiFi antennas across the high frequency WiFi band. In this example, the azimuth radiation pattern can include transmitting characteristics at a theta of 90-degrees. The azimuth radiation pattern can be a graphical depiction of the performance of the set of WiFi antennas across the high frequency WiFi band. In some examples, the azimuth radiation pattern of the set of WiFi antennas across the high frequency WiFi band can include a measurement of a realized gain above −10 dBi. In this manner, the set of WiFi antennas operating simultaneously can achieve the realized gain above −10 dBi.

As shown in FIGS. 15B and 15C, for example, the plurality of antennas can include the set of WiFi antennas. In some examples, the radiation patterns can include an elevation radiation pattern. The elevation radiation patterns disclosed herein are made in individual coordinate systems for each antenna. The elevation radiation pattern can include measured transmitting characteristics of the set of WiFi antennas across the high frequency WiFi band. In this example, the elevation radiation pattern can include transmitting characteristics at a phi of 120-degrees (e.g., in FIG. 15B) and 30-degrees (e.g., in FIG. 15C). The elevation radiation pattern can be a graphical depiction of the performance of the set of WiFi antennas across the high frequency WiFi band. In some examples, the elevation radiation pattern of the set of WiFi antennas across the high frequency WiFi band can include a measurement of a realized gain above −15 dBi. In this manner, the set of WiFi antennas operating simultaneously can achieve the realized gain above −15 dBi.

Figure 16A:
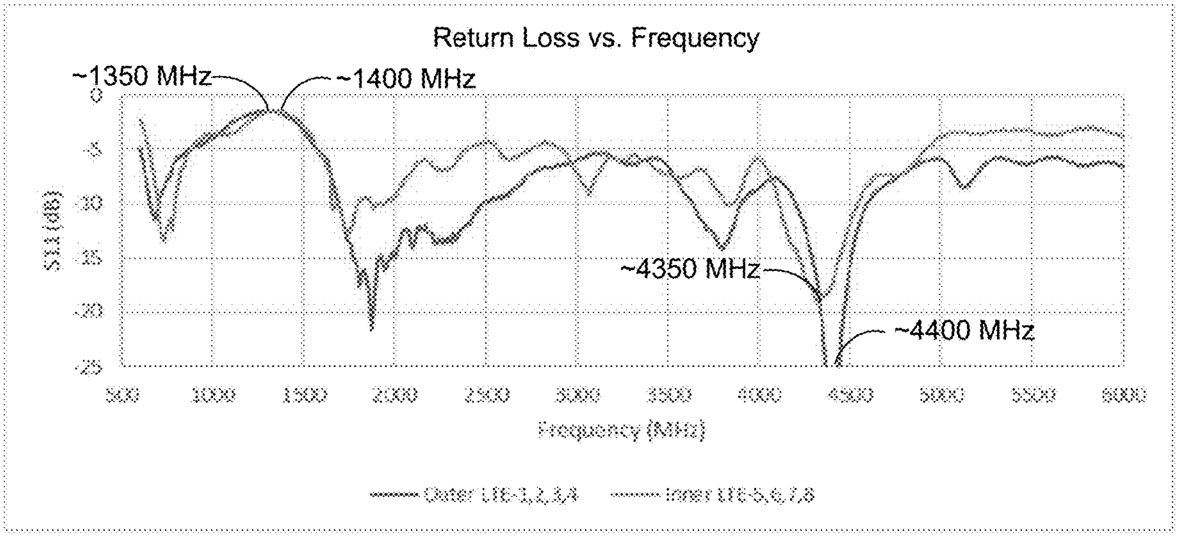
FIGS. 16A-16B illustrate return loss and isolation for a plurality of antennas, in accordance with some aspects of this disclosure.
Figure 16B:
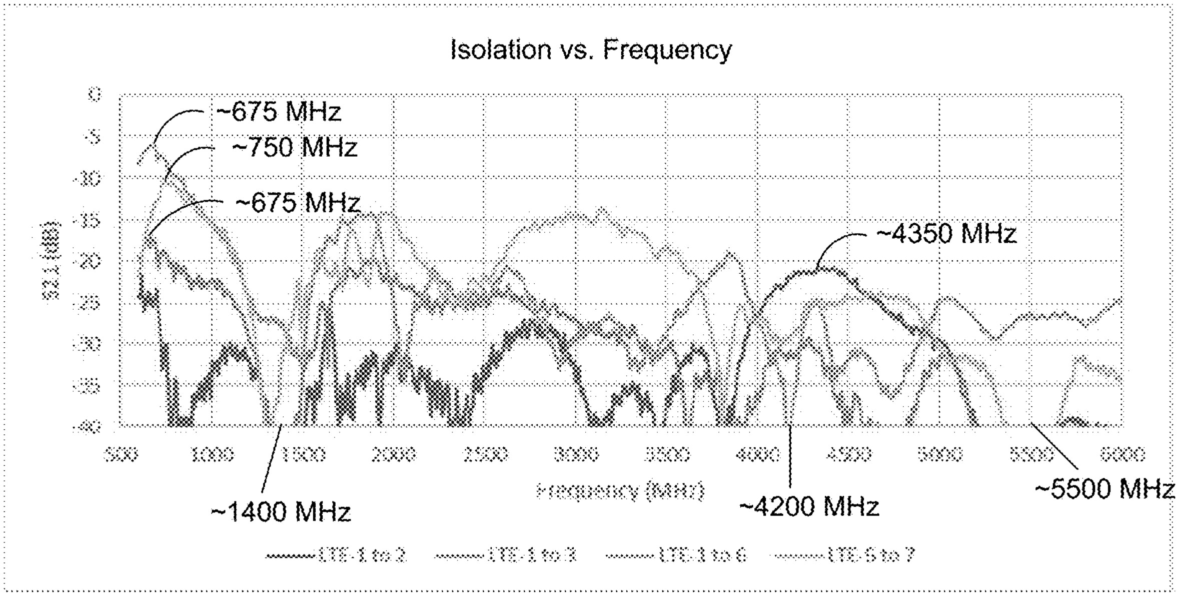

FIGS. 16A-16B illustrate return losses and isolations for a plurality of antennas (e.g., antenna elements of the multi-element multi-band antenna 102 in FIGS. 2A and 2B). FIG. 16A illustrates the antenna elements producing a return loss across a frequency spectrum. The frequency spectrum can include frequencies between 500 MHz and 6000 MHz. As shown in FIG. 16A, for example, the plurality of antennas can include outer LTE elements 1,2,3,4, and inner LTE elements 5,6,7,8. In some examples, the antennas can be in a configuration disclosed herein. In some examples, the return loss can include measured values of power transferred between ports (or terminals). As shown in FIG. 16A, for example, the power reflected into a first port can be depicted as S11. For example, the outer LTE elements 1,2,3,4 can include a peak return loss at approximately 1350 MHz. In some examples, the peak return loss for the outer LTE elements 1,2,3,4 can include a value above −5 dB. The outer LTE elements 1,2,3,4 can include a minimum return loss at approximately 4400 MHz. In some examples, the minimum return loss for the outer LTE elements 1,2,3,4 can include a value below −25 dB. The inner LTE elements 5,6,7,8 can include a peak return loss at approximately 1400 MHz. In some examples, the peak return loss for the inner LTE elements 5,6,7,8 can include a value above −5 dB. The inner LTE elements 5,6,7,8 can include a minimum return loss at approximately 4350 MHz. In some examples, the minimum return loss for the inner LTE elements 5,6,7,8 can include a value below −15 dB.

FIG. 16B illustrates antenna elements producing an isolation across a frequency spectrum. As shown in FIG. 16B, for example, the plurality of antennas can include elements LTE-1 to -2, LTE-1 to -3, LTE-1 to -6, and LTE-5 to -7. In some examples, the antennas can be in a configuration disclosed herein. In some examples, the return loss can include measured values of power transferred between ports (or terminals). As shown in FIG. 16B, for example, the power transferred from a second port to a first port can be depicted as S21. The elements LTE-1 to -2 can include a peak isolation at approximately 4350 MHz. In some examples, the peak isolation for the elements LTE-1 to -2 elements can include a value above −25 dB. The elements LTE-1 to -2 can include a minimum isolation at approximately 1400 MHz. In some examples, the minimum isolation for the elements LTE-1 to -2 elements can include a value below −40 dB. The elements LTE-1 to -3 can include a peak isolation at approximately 675 MHz. In some examples, the peak isolation for the elements LTE-1 to -3 elements can include a value above −20 dB. The elements LTE-1 to -3 can include a minimum isolation at approximately 1400 MHz. In some examples, the minimum isolation for the elements LTE-1 to -3 elements can include a value below −40 dB. The elements LTE-1 to-6 can include a peak isolation at approximately 675 MHz. In some examples, the peak isolation for the elements LTE-1 to -6 elements can include a value above −10 dB. The elements LTE-1 to -6 can include a minimum isolation at approximately 4200 MHz. In some examples, the minimum isolation for the elements LTE-1 to -6 elements can include a value below −40 dB. The elements LTE-5 to -7 can include a peak isolation at approximately 750 MHz. In some examples, the peak isolation for the elements LTE-5 to -7 elements can include a value above −15 dB. The elements LTE-5 to -7 can include a minimum isolation at approximately 5500 MHz. In some examples, the minimum isolation for the LTE-5 to -7 elements can include a value below −40 dB.

Figure 17A:
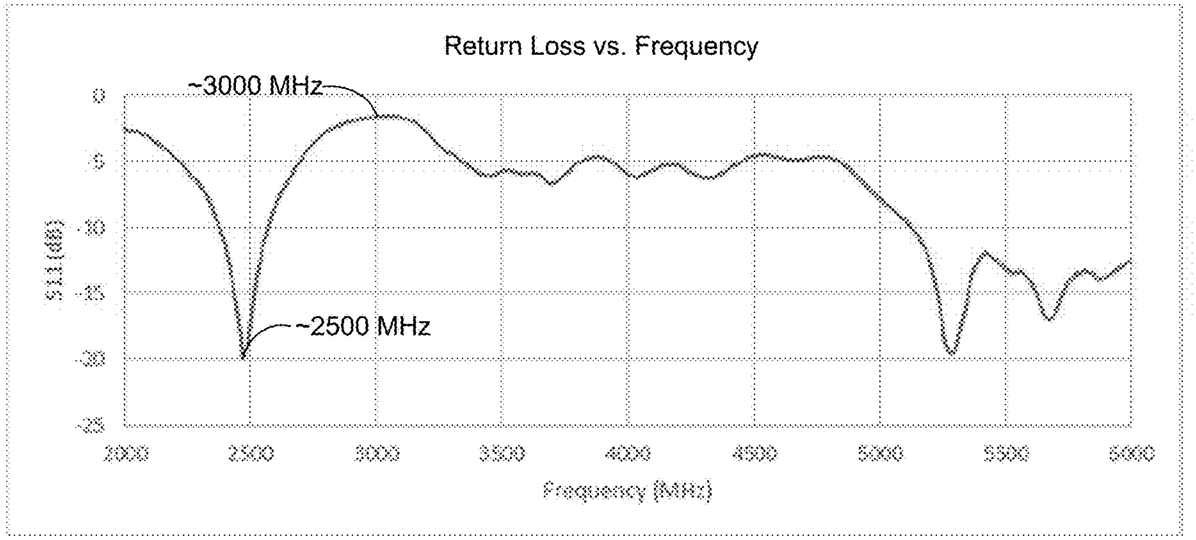
FIGS. 17A-17B illustrate return loss and isolation for a plurality of antennas, in accordance with some aspects of this disclosure.
Figure 17B:
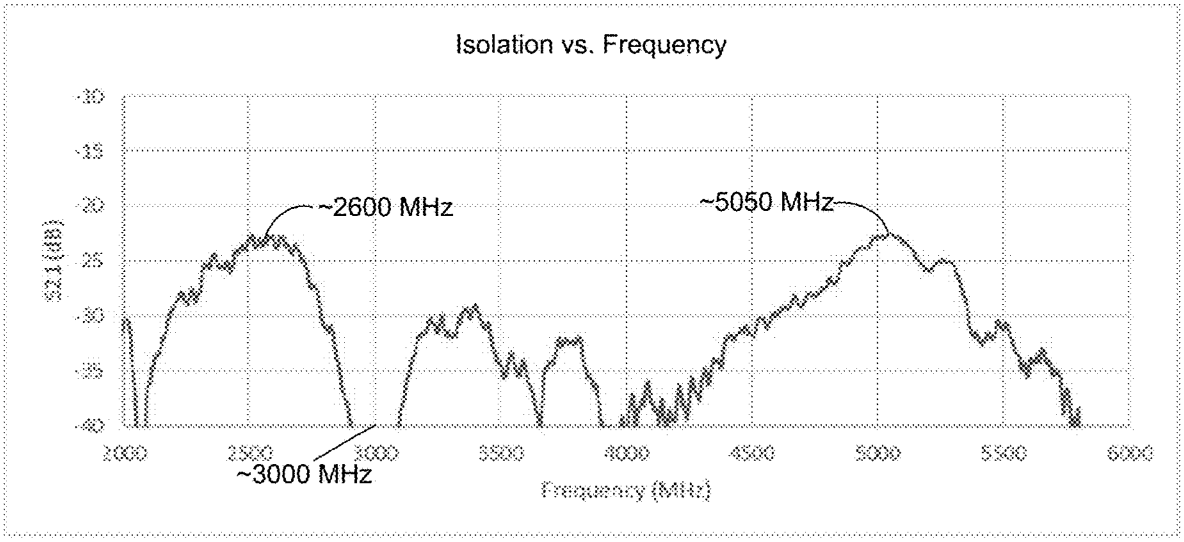

FIGS. 17A-17B illustrate return losses and isolations for a plurality of antennas (e.g., antenna elements of the WiFi radiator portions 121 in FIGS. 2A and 2B). FIG. 17A illustrates the antenna elements producing a return loss across a frequency spectrum. The frequency spectrum can include frequencies between 2000 MHz and 6000 MHz. As shown in FIG. 17A, for example, the plurality of antennas can include at least one WiFi antenna. In some examples, the antennas can be in a configuration disclosed herein. In some examples, the return loss can include measured values of power transferred between ports (or terminals). As shown in FIG. 17A, for example, the power reflected into a first port can be depicted as S11. For example, the antennas can include a peak return loss at approximately 3000 MHz. In some examples, the peak return loss for the antennas can include a value above −5 dB. The antennas can include a minimum return loss at approximately 2500 MHz. In some examples, the minimum return loss for the antennas can include a value below −15 dB.

FIG. 17B illustrates antenna elements producing an isolation across a frequency spectrum. As shown in FIG. 17B, for example, the plurality of antennas can include at least one WiFi antenna. In some examples, the antennas can be in a configuration disclosed herein. In some examples, the return loss can include measured values of power transferred between ports (or terminals). As shown in FIG. 17B, for example, the power transferred from a second port to a first port can be depicted as S21. The antennas can include a peak isolation at approximately 2600 MHz and/or at approximately 5050 MHz. In some examples, the peak isolation for the antennas can include a value above −25 dB. The antennas can include a minimum isolation at approximately 3000 MHz. In some examples, the minimum isolation for the antennas can include a value below −40 dB.

Example Clauses

Various examples of systems relating to an antenna system are found in the following clauses:

Clause 1. An antenna assembly comprising: an internal ground plane; a base PCB positioned above the internal ground plane, the base PCB including a plurality of individual ground planes spaced circumferentially about a center of the base PCB, the plurality of individual ground planes electrically connected to the internal ground plane; and a plurality of antennas, each antenna of the plurality of antennas electrically connected to an individual ground plane of the plurality of individual ground planes, the plurality of antennas comprising: a plurality of multi-band antennas; and one or more WiFi antennas.

Clause 2. The antenna assembly of Clause 1, further comprising an antenna base portion, the antenna base portion configured to support the base PCB and the plurality of antennas, wherein the internal ground plane forms at least a portion of an internal surface of the antenna base portion.

Clause 3. The antenna assembly of Clause 2, wherein the antenna base portion includes a plurality of ribs, the plurality of ribs extending from the internal surface, wherein the base PCB is supported by the plurality of ribs.

Clause 4. The antenna assembly of any of Clauses 1-3, further comprising a plurality of conductive structures, each conductive structure of the plurality of conductive structures positioned between an individual ground plane of the plurality of individual ground planes and the internal ground plane, the plurality of conductive structures configured to electrically connect the plurality of individual ground planes and the internal ground plane.

Clause 5. The antenna assembly of Clause 4, wherein each conductive structure of the plurality of conductive structures comprises a non-conductive base material covered by a conductive material.

Clause 6. The antenna assembly of any of Clauses 1-5, wherein the plurality of multi-band antennas comprises: one or more first multi-band antennas; and one or more second multi-band antennas, wherein the one or more first multi-band antennas have a first orientation being directed towards the center of the base PCB, wherein the one or more second multi-band antennas have a second orientation being directed away from the center of the base PCB.

Clause 7. The antenna assembly of Clause 6, wherein the one or more first multi-band antennas are evenly spaced circumferentially about a center of the base PCB, wherein the one or more second multi-band antennas evenly spaced circumferentially about a center of the base PCB.

Clause 8. The antenna assembly of Clause 6 or Clause 7, wherein the one or more first multi-band antennas are radially inward of the one or more second multi-band antennas.

Clause 9. The antenna assembly of any of Clauses 6-8, wherein each WiFi antenna of the one or more WiFi antennas is positioned between at least two multi-band antennas.

Clause 10. The antenna assembly of any of Clauses 1-9, wherein each multi-band antenna of the plurality of multi-band antennas comprises: a feeding portion; a grounding portion; an upright low band radiation portion; a second low band radiation portion; and a high band radiation portion.

Clause 11. The antenna assembly of Clause 10, wherein the second low band radiation portion is not-coplanar with the upright low band radiation portion.

Clause 12. The antenna assembly of Clause 10, wherein the second low band radiation portion is coplanar with the upright low band radiation portion.

Clause 13. The antenna assembly of any of Clauses 10-12, wherein the high band radiation portion comprises two arms coupled to a base of the upright low band radiation portion.

Clause 14. The antenna assembly of any of Clauses 10-12, wherein the high band radiation portion comprises a single arm coupled to a base of the upright low band radiation portion.

Clause 15. The antenna assembly of any of Clauses 10-12, wherein the high band radiation portion comprises a plurality of arms coupled to a base of the upright low band radiation portion.

Clause 16. The antenna assembly of any of Clauses 1-15, further comprising a GPS antenna.

Clause 17. The antenna assembly of any of Clauses 1-16, wherein the plurality of multi-band antennas comprises eight multi-band antennas and the one or more WiFi antennas comprises four WiFi antennas.

Clause 18. An antenna assembly comprising: an internal ground plane; a base PCB positioned above the internal ground plane and electrically connected to the internal ground plane; and a plurality of antennas, each antenna of the plurality of antennas electrically connected to the base PCB, wherein the plurality of antennas are configured to: generate at least one azimuth radiation pattern and at least one elevation radiation pattern that are above a realized gain for the plurality of antennas, wherein the azimuth radiation pattern and the elevation radiation pattern correspond to a frequency band, wherein the realized gain is between −8 decibels with respect to an isotropic radiator (dBi) and −4 dBi; and reduce radio frequency interference between the plurality of antennas.

Clause 19. The antenna assembly of Clause 18, wherein the base PCB comprises a plurality of individual ground planes spaced circumferentially about a center of the base PCB.

Clause 20. The antenna assembly of Clause 19, wherein each antenna of the plurality of antennas are electrically connected to an individual ground plane of the plurality of individual ground planes.

Clause 21. The antenna assembly of any of Clauses 18-20, wherein the plurality of antennas comprises a first set of antennas and a second set of antennas.

Clause 22. The antenna assembly of Clause 21, wherein the first set of antennas is configured to produce radio frequency signals for a first radio frequency carrier.

Clause 23. The antenna assembly of Clause 22, wherein the first set of antennas comprises a first set of MIMO antennas.

Clause 24. The antenna assembly of any of Clauses 21-23, wherein the second set of antennas is configured to produce radio frequency signals for a second radio frequency carrier.

Clause 25. The antenna assembly of Clause 24, wherein the second set of antennas comprises a second set of MIMO antennas.

Clause 26. The antenna assembly of any of Clauses 21-25, wherein an azimuth radiation pattern of the first set of antennas across a low frequency band is above −10 dBi.

Clause 27. The antenna assembly of any of Clauses 21-26, wherein an elevation radiation pattern of the first set of antennas across a low frequency band is above −15 dBi.

Clause 28. The antenna assembly of any of Clauses 21-27, wherein an azimuth radiation pattern of the first set of antennas across a mid frequency band is above −10 dBi.

Clause 29. The antenna assembly of any of Clauses 21-28, wherein an elevation radiation pattern of the first set of antennas across a mid frequency band is above −15 dBi.

Clause 30. The antenna assembly of any of Clauses 21-29, wherein an azimuth radiation pattern of the first set of antennas across a high frequency band is above −10 dBi.

Clause 31. The antenna assembly of any of Clauses 21-30, wherein an elevation radiation pattern of the first set of antennas across a high frequency band is above −15 dBi.

Clause 32. The antenna assembly of any of Clauses 21-31, wherein an azimuth radiation pattern of the second set of antennas across a low frequency band is above −10 dBi.

Clause 33. The antenna assembly of any of Clauses 21-32, wherein an elevation radiation pattern of the second set of antennas across a low frequency band is above −15 dBi.

Clause 34. The antenna assembly of any of Clauses 21-33, wherein an azimuth radiation pattern of the second set of antennas across a mid frequency band is above −10 dBi.

Clause 35. The antenna assembly of any of Clauses 21-34, wherein an elevation radiation pattern of the second set of antennas across a mid frequency band is above −20 dBi.

Clause 36. The antenna assembly of any of Clauses 21-35, wherein an azimuth radiation pattern of the second set of antennas across a high frequency band is above −5 dBi.

Clause 37. The antenna assembly of any of Clauses 21-36, wherein an elevation radiation pattern of the second set of antennas across a high frequency band is above −15 dBi.

Clause 38. The antenna assembly of any of Clauses 18-37, wherein the plurality of antennas comprises a set of WiFi antennas.

Clause 39. The antenna assembly of Clause 38, wherein an azimuth radiation pattern of the set of WiFi antennas across a low frequency WiFi band is above −10 dBi.

Clause 40. The antenna assembly of any of Clauses 38-39, wherein an elevation radiation pattern of the set of WiFi antennas across a low frequency WiFi band is above −15 dBi.

Clause 41. The antenna assembly of any of Clauses 38-40, wherein an azimuth radiation pattern of the set of WiFi antennas across a high frequency WiFi band is above −10 dBi.

Clause 42. The antenna assembly of any of Clauses 38-41, wherein an elevation radiation pattern of the set of WiFi antennas across a high frequency WiFi band is above −15 dBi.

Additional Considerations and Terminology

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations, and may be defined by claims as presented herein or as presented in the future.

Conditional language, such as “can,” “could,” “might,” or “may,” unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list. Likewise the term “and/or” in reference to a list of two or more items, covers all of the following interpretations of the word: any one of the items in the list, all of the items in the list, and any combination of the items in the list. Further, the term “each,” as used herein, in addition to having its ordinary meaning, can mean any subset of a set of elements to which the term “each” is applied. Additionally, the words “herein,” “above,” “below,” and words of similar import, when used in this application, refer to this application as a whole and not to any particular portions of this application.

Conjunctive language such as the phrase “at least one of X, Y, and Z,” unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms “approximately,” “about,” “generally,” and “substantially” as used herein represent a value, amount, or characteristic close to the stated value, amount, or characteristic that still performs a desired function or achieves a desired result. For example, the terms “approximately”, “about”, “generally,” and “substantially” may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. An antenna assembly comprising:
an internal ground plane;
a base PCB positioned above the internal ground plane, the base PCB including a plurality of individual ground planes spaced circumferentially about a center of the base PCB, the plurality of individual ground planes electrically connected to the internal ground plane; and
a plurality of antennas, each antenna of the plurality of antennas electrically connected to an individual ground plane of the plurality of individual ground planes, the plurality of antennas comprising:
a plurality of multi-band antennas; and
one or more WiFi antennas.

2. The antenna assembly of claim 1, further comprising an antenna base portion, the antenna base portion configured to support the base PCB and the plurality of antennas, wherein the internal ground plane forms at least a portion of an internal surface of the antenna base portion.

3. The antenna assembly of claim 1, further comprising a plurality of conductive structures, each conductive structure of the plurality of conductive structures positioned between an individual ground plane of the plurality of individual ground planes and the internal ground plane, the plurality of conductive structures configured to electrically connect the plurality of individual ground planes and the internal ground plane.

4. The antenna assembly of claim 3, wherein each conductive structure of the plurality of conductive structures comprises a non-conductive base material covered by a conductive material.

5. The antenna assembly of claim 1, wherein the plurality of multi-band antennas comprises:
one or more first multi-band antennas; and
one or more second multi-band antennas, wherein the one or more first multi-band antennas have a first orientation being directed towards the center of the base PCB, wherein the one or more second multi-band antennas have a second orientation being directed away from the center of the base PCB.

6. The antenna assembly of claim 5, wherein the one or more first multi-band antennas are evenly spaced circumferentially about the center of the base PCB, wherein the one or more second multi-band antennas are evenly spaced circumferentially about the center of the base PCB.

7. The antenna assembly of claim 5, wherein each WiFi antenna of the one or more WiFi antennas is positioned between at least two multi-band antennas.

8. The antenna assembly of claim 1, wherein each multi-band antenna of the plurality of multi-band antennas comprises:
a feeding portion;
a grounding portion;
an upright low band radiation portion;
a second low band radiation portion; and
a high band radiation portion.

9. The antenna assembly of claim 8, wherein the second low band radiation portion is not-coplanar with the upright low band radiation portion.

10. The antenna assembly of claim 8, wherein the high band radiation portion comprises two arms coupled to a base of the upright low band radiation portion.

11. An antenna assembly comprising:
an internal ground plane;
a base PCB positioned above the internal ground plane and electrically connected to the internal ground plane, the base PCB comprising a plurality of individual ground planes spaced circumferentially about a center of the base PCB; and
a plurality of antennas, each antenna of the plurality of antennas electrically connected to the base PCB, wherein the plurality of antennas are configured to:
generate at least one azimuth radiation pattern and at least one elevation radiation pattern that are above a realized gain for the plurality of antennas, wherein the at least one azimuth radiation pattern and the at least one elevation radiation pattern correspond to a frequency band, wherein the realized gain is between-8 decibels with respect to an isotropic radiator (dBi) and-4 dBi; and
reduce radio frequency interference between the plurality of antennas.

12. The antenna assembly of claim 11, wherein each antenna of the plurality of antennas is electrically connected to an individual ground plane of the plurality of individual ground planes.

13. An antenna assembly comprising:
an internal ground plane;
a base PCB positioned above the internal ground plane and electrically connected to the internal ground plane; and
a plurality of antennas comprising a first set of antennas and a second set of antennas, each antenna of the plurality of antennas electrically connected to the base PCB, wherein the plurality of antennas are configured to:
generate at least one azimuth radiation pattern and at least one elevation radiation pattern that are above a realized gain for the plurality of antennas, wherein the at least one azimuth radiation pattern and the at least one elevation radiation pattern correspond to a frequency band, wherein the realized gain is between-8 decibels with respect to an isotropic radiator (dBi) and-4 dBi; and
reduce radio frequency interference between the plurality of antennas.

14. The antenna assembly of claim 13, wherein the first set of antennas is configured to produce radio frequency signals for a first radio frequency carrier and the second set of antennas is configured to produce radio frequency signals for a second radio frequency carrier.

15. The antenna assembly of claim 14, wherein the first set of antennas comprises a first set of MIMO antennas and the second set of antennas comprises a second set of MIMO antennas.

16. The antenna assembly of claim 13, wherein an azimuth radiation pattern of at least one of the first set of antennas and the second set of antennas across a low frequency band is above-10 dBi.

17. The antenna assembly of claim 13, wherein an elevation radiation pattern of at least one of the first set of antennas and the second set of antennas across a low frequency band is above-15 dBi.

18. The antenna assembly of claim 13, wherein an azimuth radiation pattern of at least one of the first set of antennas and the second set of antennas across a mid frequency band is above-10 dBi.

19. The antenna assembly of claim 13, wherein an elevation radiation pattern of at least one of the first set of antennas and the second set of antennas across a mid frequency band is above-15 dBi.

20. The antenna assembly of claim 13, wherein an azimuth radiation pattern of at least one of the first set of antennas and the second set of antennas across a high frequency band is above-10 dBi.

21. The antenna assembly of claim 13, wherein an elevation radiation pattern of at least one of the first set of antennas and the second set of antennas across a high frequency band is above-15 dBi.

* * * * *